United States Patent [19]

Ishida et al.

[11] Patent Number: 5,053,800
[45] Date of Patent: Oct. 1, 1991

[54] AUTOMATIC FOCUS DETECTING APPARATUS

[75] Inventors: Tokuji Ishida; Masataka Hamada; Toshio Norita; Masayuki Ueyama; Katsumi Kozakai; Hiroshi Ootsuka; Hideo Kajita; Kenji Ishibashi, all of Osaka, Japan

[73] Assignee: Minolta Camera Kabushiki Kaisha, Osaka, Japan

[21] Appl. No.: 462,478

[22] Filed: Jan. 9, 1990

Related U.S. Application Data

[62] Division of Ser. No. 299,656, Jan. 23, 1989, Pat. No. 4,935,765.

[30] Foreign Application Priority Data

| Jan. 21, 1988 | [JP] | Japan | 63-11616 |
| Jan. 21, 1988 | [JP] | Japan | 63-11617 |
| Jan. 21, 1988 | [JP] | Japan | 63-11618 |
| Jan. 21, 1988 | [JP] | Japan | 63-11619 |
| Jan. 21, 1988 | [JP] | Japan | 63-11620 |
| Jan. 21, 1988 | [JP] | Japan | 63-11621 |
| Jan. 21, 1988 | [JP] | Japan | 63-11622 |
| Jan. 21, 1988 | [JP] | Japan | 63-11623 |
| Jan. 27, 1988 | [JP] | Japan | 63-17939 |
| May 13, 1988 | [JP] | Japan | 63-117440 |
| May 14, 1988 | [JP] | Japan | 63-117325 |
| May 14, 1988 | [JP] | Japan | 63-117326 |
| May 14, 1988 | [JP] | Japan | 63-117328 |
| May 14, 1988 | [JP] | Japan | 63-117827 |

[51] Int. Cl.$^5$ .................. G03B 13/36; G02B 7/28
[52] U.S. Cl. ...................... 354/402; 250/201.2
[58] Field of Search ............... 354/400, 402, 403, 406, 354/407, 408; 250/201.2, 201.4, 201.6, 201.7, 201.8

[56] References Cited

U.S. PATENT DOCUMENTS

| 4,303,321 | 12/1981 | Enomoto et al. | 354/25 |
| 4,416,523 | 11/1983 | Kawabata | 354/25 |
| 4,792,668 | 12/1988 | Akashi et al. | 250/201 |

FOREIGN PATENT DOCUMENTS 59-48719  3/1984  Japan .
62-133411  6/1987  Japan .

Primary Examiner—W. B. Perkey
Attorney, Agent, or Firm—Burns, Doane, Swecker & Mathis

[57] ABSTRACT

An improved focus detecting apparatus comprises a photographic lens, a focus detecting device for detecting the focusing condition of the photographic lens and a lens driving means for driving the photographic lens based on the focusing condition detected, and the photographic lens is driven, in advance, to a focusing position where a frequently used magnification rate determined in accordance with the focal length of said photographic lens is attained, and then driven to an in-focus position.

6 Claims, 35 Drawing Sheets

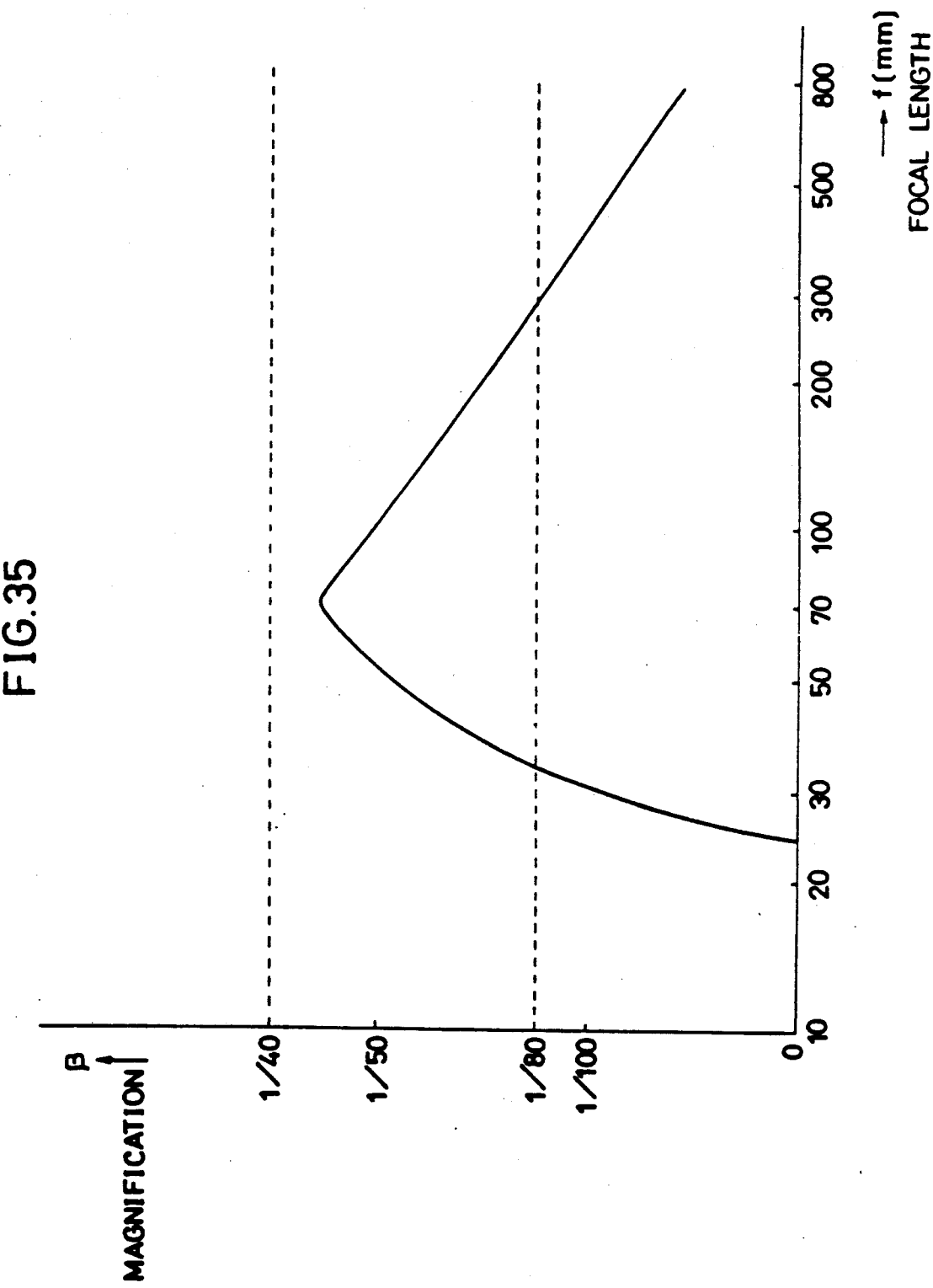

AUTOMATIC FOCUS DETECTING APPARATUS

This application is a divisional, of application Ser. No. 07/299,656, filed Jan. 23, 1989 now U.S. Pat. No. 4,935,765.

BACKGROUND OF THE INVENTION

1. Field of the Invention

The present invention relates to an automatic focus detecting apparatus of a lens interchangeable type camera and, more specifically, to an improvement of an automatic focus detecting apparatus employed for a single lens reflex camera.

2. Description of Related Art

Conventionally, in an automatic focus adjusting apparatus which detects a focus condition of a photographic lens to drive the lens to an in-focus position, the lens is sometimes initially set at an intermediate focusing position for every photographing operation in order to shorten the time required for driving the lens to the in-focus position after the focus detection (U.S. Pat. No. 4,265,528). However, in the prior art, the initial stop position of the lens was not determined to enhance the capability or the possibility of focus detection, so that the possibility of focus detection was low.

Meanwhile, in the automatic focus adjusting apparatus which detects the focus detection of the photographic lens to drive the lens to the in-focus position, if the focus detection is impossible, an operation of searching a lens position at which the focus detection is possible while driving the lens (the operation is called low contrast scanning) has been proposed (see Japanese Patent Laying-Open Gazette No. 182411/1984).

However, the low contrast scanning requires long period of time for the focus detection.

SUMMARY OF THE INVENTION

Therefore, one object of the present invention is to determine an initial stopping position of the lens so as to enhance the possibility of focus detection in a focus detecting apparatus.

Another object of the present invention is to shorten the time required for the focus detection and to improve the possibility of focus detection in a focus detecting apparatus.

A further object of the present invention is to determine the initial position of the lens where the possibility of focus detection is enhanced corresponding to the lens employed in a focus detecting apparatus.

A still further object of the present invention is to enhance the possibility of in-focus even when a particular interchangeable lens is attached in a focus detecting apparatus.

A still further object of the present invention is to provide a close-up lens or a macro lens in which the possibility of in-focus is high, in a lens interchangeable type camera having automatic focus apparatus.

A still further object of the present invention is to determine the initial stopping position of the lens in accordance with magnification rate by the lens in a focus detecting apparatus.

The above described objects of the present invention can be attained by a focus detecting apparatus comprising: a photographic lens; focus detecting device for receiving a light from an object to be photographed through the photographic lens and detecting a focus condition of the photographic lens; a manually operable member, the focus detecting device starting the focus detection in response to manual operation to the operable member; first driving device for forcibly driving the photographic lens to a predetermined position, the predetermined position being varied based on an optical state of the photographic lens; second driving device for driving the photographic lens based on the focusing condition detected by the focus detecting device and admitting device for admitting the lens drive by the second driving device after the lens drive by the first driving device.

Since the focus detecting apparatus of the present invention comprises the above described components, frequently used lens position for respective lenses have been found based on the data of actual use. In the automatic focus detection, the lens is set in advance at the stopping position defined corresponding to the lens before the start of measurement. Therefore, the initial stopping position of the lens can be determined so as to enhance the possibility of focus detection in the focus detecting apparatus.

In another aspect, the focus detecting apparatus of the present invention comprises, a photographic lens; focus detecting device for receiving a light from an object through the photographic lens and detecting a focus condition of the photographic lens; a manually operable member, the focus detecting device starting the focus detection in response to manual operation to the operable member; first driving device for forcibly driving the photographic lens to a predetermined position; second driving device for driving the photographic lens based on the focusing condition detected by the focus detecting device; and admitting device for admitting the lens drive by the second driving device after the lens drive by the first driving device. The relation between the photographing magnification rate and the initial stopping position of the lens is found based on the data of actual use. The initial position of the lens is changed corresponding to the photographing magnification rate based on the fact that the initial stopping position of the lens is closely related to the photographing magnification rate. Consequently, the possibility in focus detection by the focus detecting apparatus with above components can be enhanced in the focus detecting apparatus, and the time required for focus detection can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 35 illustrates the operation of the third embodiment.

DESCRIPTION OF THE PREFERRED EMBODIMENTS

(1) First Embodiment

Figure 1:
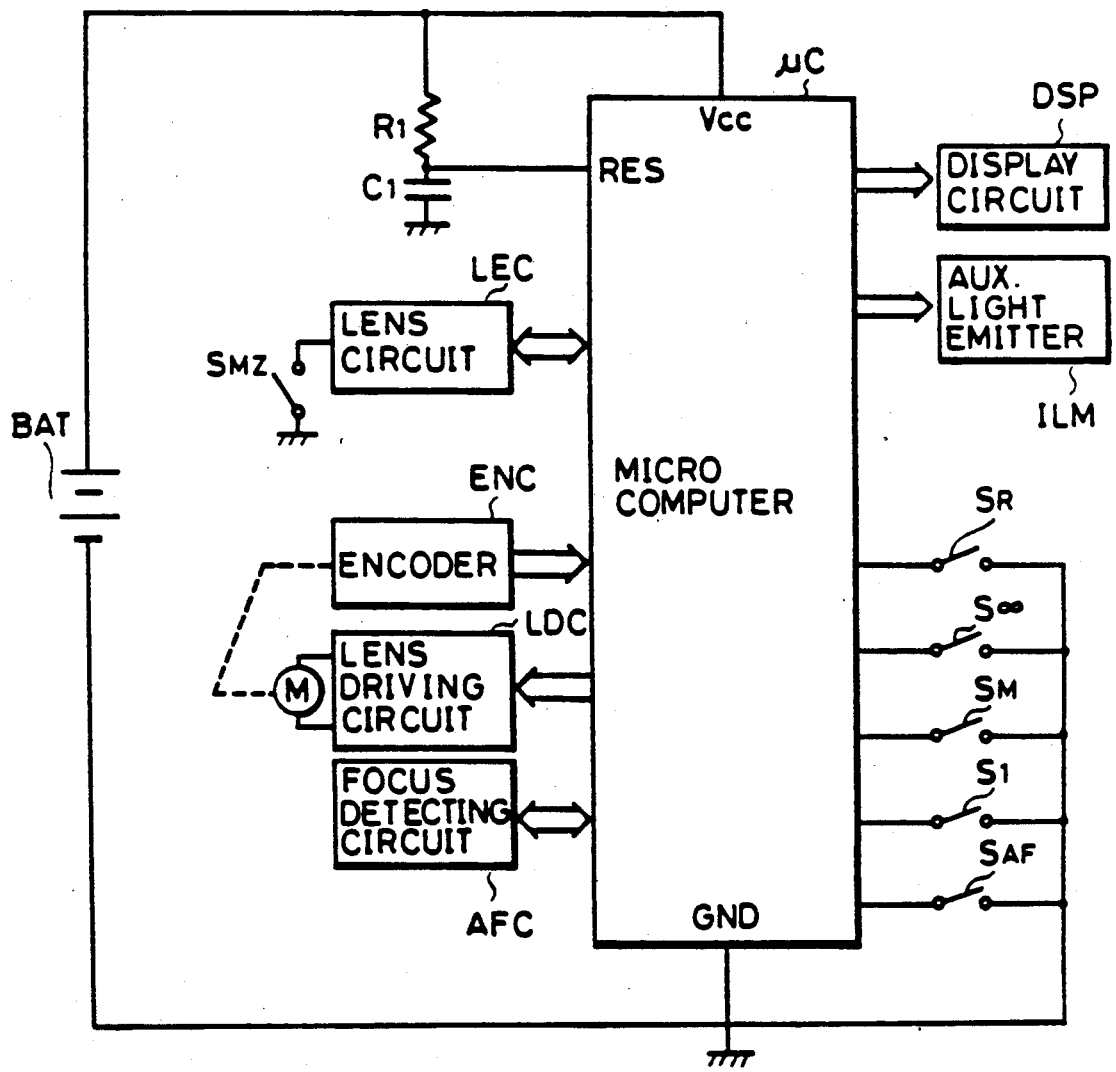
FIG. 1 is a block circuit diagram showing a first embodiment of the present invention.

FIG. 1 is a block diagram showing a focus detecting circuit structure of a camera as the first embodiment of the present invention. Portions which are not directly related to focus detecting operations are omitted. With reference to FIG. 1, a focus detecting circuit according to the invention comprises a microcomputer μC which carries out arithmetic operations and sequential control for focus adjustment, a lens circuit LEC which is provided in an exchangeable lens unit and transmits information peculiar to the exchangeable lens unit to the microcomputer μC, a focus detecting circuit AFC for photo-electrically converting light reflected from an object to be photographed and passed through the said lens unit into signal representing received light, with the signal being converted into digital signal to be outputted to the microcomputer μC, a display circuit DSP for displaying attainment of an in-focus state of the lens and incapability of focus detection, an auxiliary light emitting apparatus ILM for illuminating the object to be photographed with an auxiliary light for facilitating focus detection, a motor M for driving a focusing lens of the exchangeable lens unit moving the lens forward and rearward under control of a lens driving circuit LDC, and an encoder ENC for detecting amount of rotation of the motor M with outputting pulses to the microcomputer μC in accordance with the prescribed amount of rotation of the motor M.

The lens driving circuit LDC receives a signal of the motor driving speed, a signal of motor driving direction and a control signal for stopping the motor from the microcomputer μC and drives the motor M based on these signals.

The microcomputer μC contains a lens position counter $N_L$ to find, as an absolute amount, how much the lens is moved forward from an infinite focusing position where the lens is moved rearmost. The contents of the lens position counter $N_L$ is reset at 0 in response to an internal instruction when the lens is moved rearward to reach the infinite focusing position. The contents of the counter is incremented in accordance with pulses from the encoder ENC with the lens being moved forward and is decremented in accordance with the pulses from the encoder ENC with the lens being moved rearward. When the lens is moved forward to reach the closest focusing position, the contents of the lens position counter $N_L$ becomes $N_L = N_{max}$. The maximum amount of forward movement $N_{max}$ is different in every lens, and it is inputted to the microcomputer μC as information peculiar to the lens unit from the lens circuit LEC.

In the lens circuit LEC, information $REV_{max}$ representing the number of rotation of a rotation shaft (not shown) for driving focus adjustment lens in the lens unit (the shaft on the lens unit side which is coupled to a rotation shaft (not shown) of a camera body is stored. In the camera body, the said maximum amount of forward movement $N_{max}$ is calculated based on a reduction ratio of a decelerating mechanism (not shown) arranged between the motor M and the rotation shaft of the camera body and on the number of pulses from the encoder ENC per one rotation of the motor M. For example, when the reduction ratio is 1/20, the number of pulses from the encoder ENC is 20 per one rotation, and $REV_{max}$ is 3, then $N_{max}$ will be $20 \times 20 \times 3 = 1,200$.

A battery BAT supplies power to the microcomputer μC and other circuits. A time constant circuit comprising a series circuit of a resistor R1 and a capacitor C1 is connected to both ends of the battery BAT, and a node between the resistor R1 and the capacitor C1 is connected to a power-on-reset terminal RES of the microcomputer μC. When the battery BAT is loaded, a power supply voltage is applied between supply terminal Vcc and the ground terminal GND of the microcomputer μC, so that the microcomputer μC is activated. However, the microcomputer μC does not start operation until the charging voltage of the capacitor C1, that is, the voltage applied to the reset terminal RES of the microcomputer, reaches a prescribed level. When the voltage of the capacitor C1 reaches the prescribed level, the microcomputer μC is reset to start the operation from the step #5 (see FIG. 2), which will be described later.

When a reset switch $S_R$ is turned ON, the lens is reset to be driven at an initial position. An infinite focusing position detecting switch $S\infty$ is turned ON when the lens is moved rearward to reach the infinite focusing position. A main switch $S_M$ is turned ON to permit the camera operation. A preparatory switch S1 is normally turned ON at a first stroke of a shutter release button (not shown). When an AF mode switch $S_{AF}$ is ON, an automatic focus mode is selected in which the lens is automatically driven to an in-focus position based on the result of focus detection. When this switch $S_{AF}$ is OFF, a manual focus mode is selected in which only an indication of in-focus or out-of-focus is displayed based on the result of focus detection and the lens is not driven. A macro zone switch $S_{MZ}$ is opened when the zoom operation ring is set from normal zooming zone to a macro zone for macro focusing in a lens for zooming having macro focusing mechanism. In such macro lens for zooming employed in the present embodiment, the automatic focusing mode is unavailable when the zoom operation ring is set at the macro zone. Therefore, in order to give this information to the microcomputer μC, the lens circuit LEC outputs a signal SMZ indicating the macro zone to the microcomputer μC.

The focus adjustment operation of the camera will be described in the following with reference to flow charts. In response to the power-on-reset, the microcomputer μC executes the program following the step #5 shown in FIG. 2. First, all flags are reset in #5. Then, whether the main switch $S_M$ is ON or not is checked in #10. If the main switch $S_M$ is not ON, the checking of the step #10 is repeated until it is turned ON. If the main switch $S_M$ is ON, a subroutine of calculating the lens initial position (FIG. 8) is executed in #15, a subroutine of ∞ rearward movement (FIG. 9) is carried out in #20, a subroutine of setting lens initial position (FIG. 10) is carried out in #25, and whether the main switch $S_M$ is OFF or not is checked in #30. If the main switch $S_M$ is OFF, then the subroutine of ∞ rearward movement is carried out in #35, and the flow returns to #10. If the main switch $S_M$ is not OFF in #30, the flow proceeds to #45.

Figure 8:
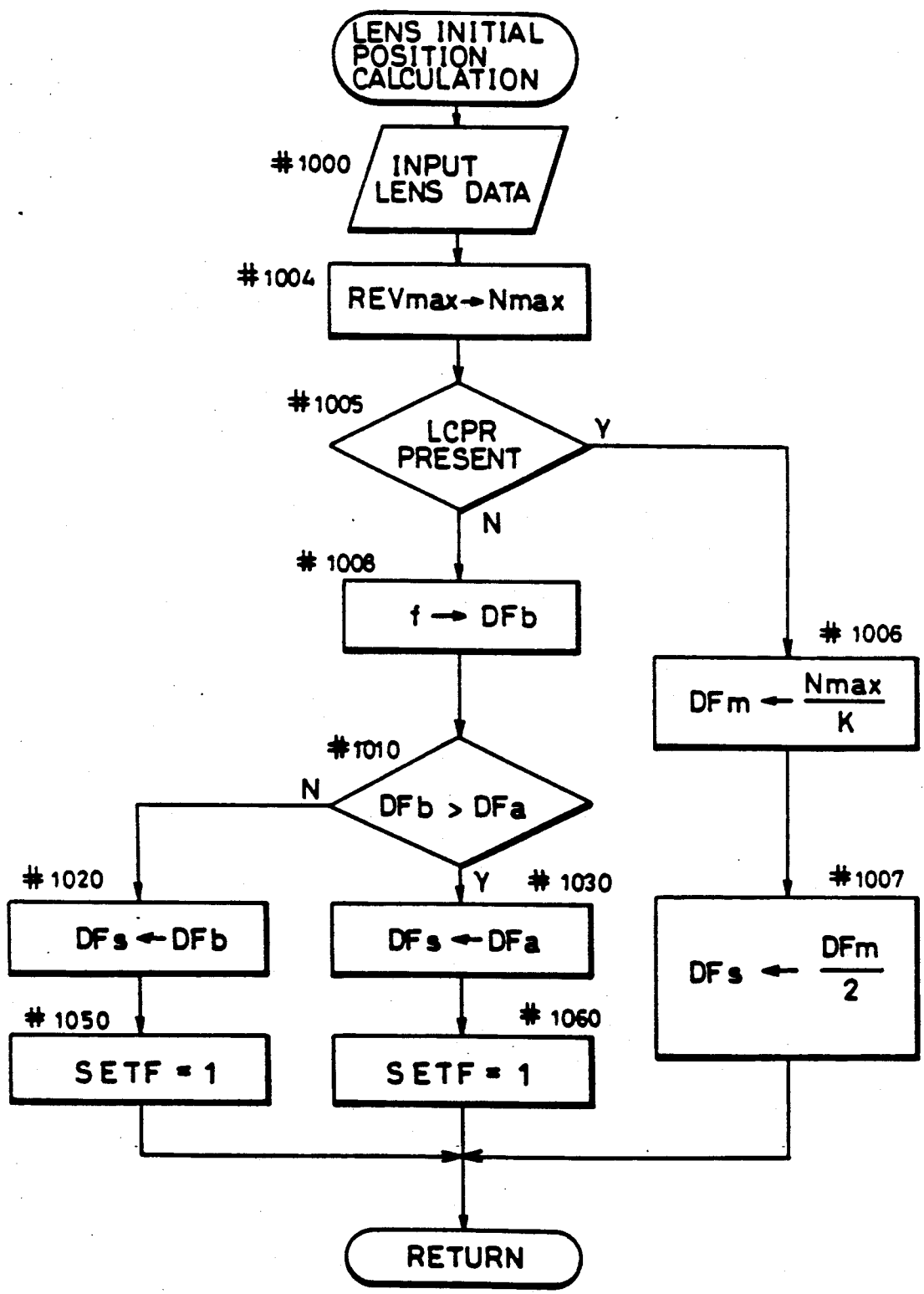

FIG. 8 is a flow chart showing the subroutine of calculating the lens initial position. When this subroutine is called, the lens data are inputted from the lens circuit LEC at the step #1,000. A lens attachment signal ICP, the macro zone signal SMZ, a macro lens attachment signal LCPR indicating that a macro lens having a magnification larger than 1, i.e., enabling life-size shot, is attached, the maximum number of rotation REVmax of the focus adjusting lens driving shaft, the focal length f, a conversion coefficient K, and so on are inputted to the microcomputer μC. The coefficient K is for converting the defocus amount DF into the amount N of driving the focus adjusting lens.

Table 1 shows addresses of a data ROM in the lens circuit LEC, the bits in the address and the information allotted to each of the bits. As is shown in the table 1, 8 bit data $b_0$ to $b_7$ are stored in addresses $00_H$ to $03_H$, respectively. The lens attachment signal ICP is stored at the address $00_H$. The signal is constituted by, for example, the data of "10101010". The macro zone signal SMZ is allotted to the least significant bit $b_0$ of the address $01_H$. When $b_0=1$, it is the macro zone, and when $b_0=0$, it is not the macro zone. In the remaining 7 bits $b_1$ to $b_7$ of the address $01_H$, the data of the focal length f is stored in logarithmic compression. A macro lens signal LCPR for the magnification larger than 1 is allotted to the least significant bit $b_0$ of the address $02_H$. When $b_0=1$, a macro lens for a magnification larger than 1 is employed, and if $b_0=0$, the macro lens for a magnification larger than 1 is not employed. The number of rotation $REV_{max}$ of the focus adjusting lens driving shaft is stored in the remaining 7 bits $b_1$ to $b_7$ of the address $02_H$. The coefficient K is stored in the address $03_H$.

In the step #1004, the maximum amount of forward movement $N_{max}$ is calculated in the above described manner based on the maximum number of rotation $REV_{max}$. Presence of the macro lens attachment signal LCPR is determined in #1005. When it is determined that the macro lens for a magnification larger than 1 is attached in the step #1005, the maximum defocus amount $DF_m=N_{max}/K$ is calculated based on the maximum amount of forward movement $N_{max}$ in #1006. The maximum defocus amount $DF_m$ is an amount of defocus ranging from the closest focusing position to the infinite focusing position of the focus adjusting lens. In #1007, the amount of defocus $DF_s$ for setting the lens initial position is selected to be $DF_m/2$, and the flow returns to the step at which the subroutine was called. The maximum defocus amount $DF_m$ in association with the macro lenses for magnification larger than 1 may be stored in a memory in the camera body.

When it is determined that the macro lens for the magnification larger than 1 is not attached in the step #1005, the defocus amount $DF_b$ is determined in #1008. The defocus amount $DF_b$ is an amount of defocus from the infinite focusing position to the lens position $N_b$ determined in accordance with the focal length f. In this embodiment, the lens position $N_b$ predetermined in each focal length in consideration of the frequently used magnification β is read from the ROM table.

Table 2 shows relation between the magnification β frequently used for a specific focal length, an amount of defocus $DF_b$ corresponding to the lens position $N_b$ determined in accordance with the magnification β, and the maximum defocus amount $DF_m$. The reference character $DF_a$ represents a defocus amount ensuring the focus detection by the structure of the focus detecting circuit AFC, and the range ensuring the focus detection will be $2DF_a$.

In the step #1010, whether $DF_b > DF_a$ or not is checked. If $DF_b > DF_a$ in #1010, the defocus amount $DF_s$ for setting the lens initial position is set at $DF_a$ in #1030, the lens position set flag SETF is set at 1 in #1060, and the flow returns to the step in which this subroutine was called. If $DF_b \leq DF_a$ in #1010, the defocus amount $DF_s$ for setting the lens initial position is set at $DF_b$, the lens position set flag SETF is set at 1 in #1050, and the flow returns to the step in which this subroutine was called.

TABLE 1

| CONTENTS IN LENS ROM |||||||||
| DATA CONTENT |||||||||
| ADDRESS | $b_0$ | $b_1$ | $b_2$ | $b_3$ | $b_4$ | $b_5$ | $b_6$ | $b_7$ |
| --- | --- | --- | --- | --- | --- | --- | --- | --- |
| $00_H$ | | LENS ATTACHMENT SIGNAL |||||||
| $01_H$ | SMZ | INFORMATION OF FOCAL LENGTH |||||||
| $02_H$ | LCPR | MAX ROTATION NUMBER $REV_{max}$ |||||||
| $03_H$ | | CONVERSION COEFFICIENT |||||||

In the table, SMZ = 1: macro zone
SMZ = 0: not macro zone
LCPR = 1: macro lens for magnification larger than 1
LCPR = 0: not macro lens for magnification larger than 1

TABLE 2

| FOCAL LENGTH [mm] | FREQUENT MAGNIFICATION | $DF_b$ [mm] | $2DF_a$ [mm] | $DF_m$ [mm] |
| --- | --- | --- | --- | --- |
| ~16 | 1/∞ | 0 | 15 | 2.4 |
| ~28 | 1/∞ | 0 | 15 | 3.8 |
| ~35 | 1/40 | 0.9 | 15 | 6.0 |
| ~50 | 1/40 | 1.1 | 15 | 7.5 |
| ~100 | 1/40 | 2.5 | 15 | 11.8 |
| ~135 | 1/40 | 3.4 | 15 | 13.9* |
| ~210 | 1/40 | 5 | 15 | 68.0** |
| ~300 | 1/60 | 5 | 15 | 112.9*** |
| ~600 | 1/60 | 10 | 15 | 72.8 |
| ~1200 | 1/100 | 12 | 15 | 194.3 |

Figure 11A:
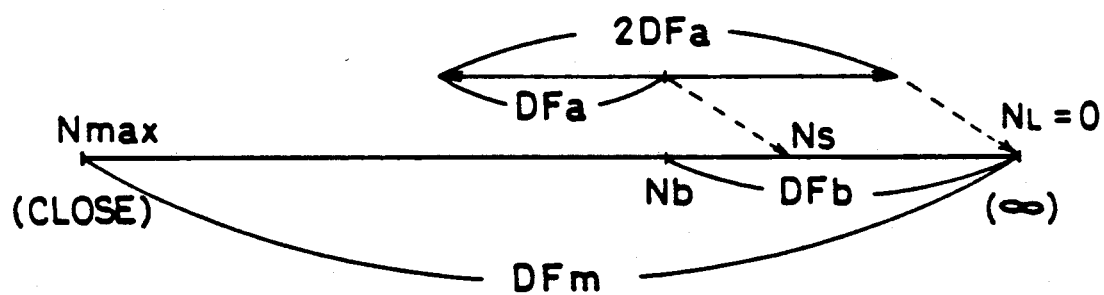
FIGS. 11A, 11B, 12 illustrate the operation of the first embodiment.
Figure 11B:
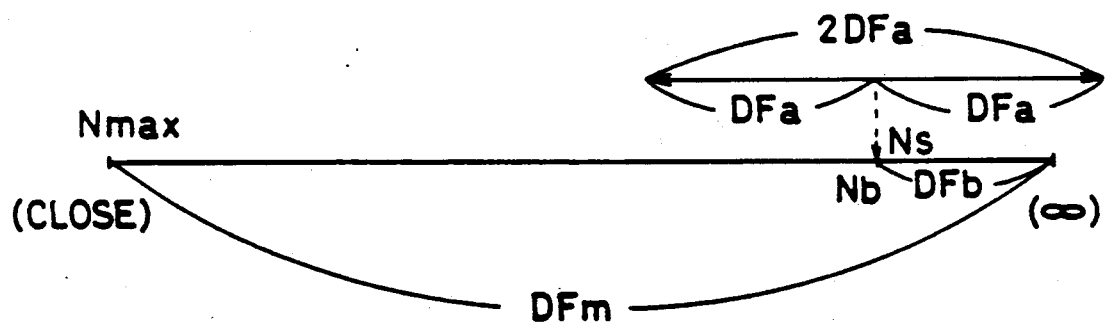

In the table, * represents data when the focal length of the lens for zooming of 28 to 135 mm is at 135 mm
**represents the data when the focal length of the lens for zooming of 70 to 210 mm is at 210 mm
***represents the data when the focal length of the lens for zooming of 75 to 300 mm is at 300 mm FIG. 11A and 11B illustrate the idea of the steps #1010 to #1030. FIG. 11A shows a case in which the defocus amount $DF_b$ from the lens position $N_b$ determined in consideration of the magnification β to the infinite focusing position is larger than $DF_a$ in which the focus detection is possible. In this case, $DF_s=DF_a$. Therefore, at the lens initial position $N_S=DF_S \times K$, the infinite focusing position is included in the range $2DF_a$ in which the focus detection is possible, and when the focus detection is incapable, the lens scanning may be carried out only in the direction of forward movement of the lens. FIG. 12B shows a case in which the defocus amount $DF_b$ from the lens position $N_b$ determined in consideration of the magnification β to the infinite focusing position is smaller than the defocus amount $DF_a$ in which the focus detection is possible and in this case, $DF_S=DF_b$. In this case also, at the lens initial position $N_S-DF_s \times K$, the infinite focusing distance is included in the range $2Df_a$ in which the focus detection is possible, and therefore, when the focus detection is incapable, lens scanning may be carried out only in the direction of forward movement of the lens.

Figure 12:
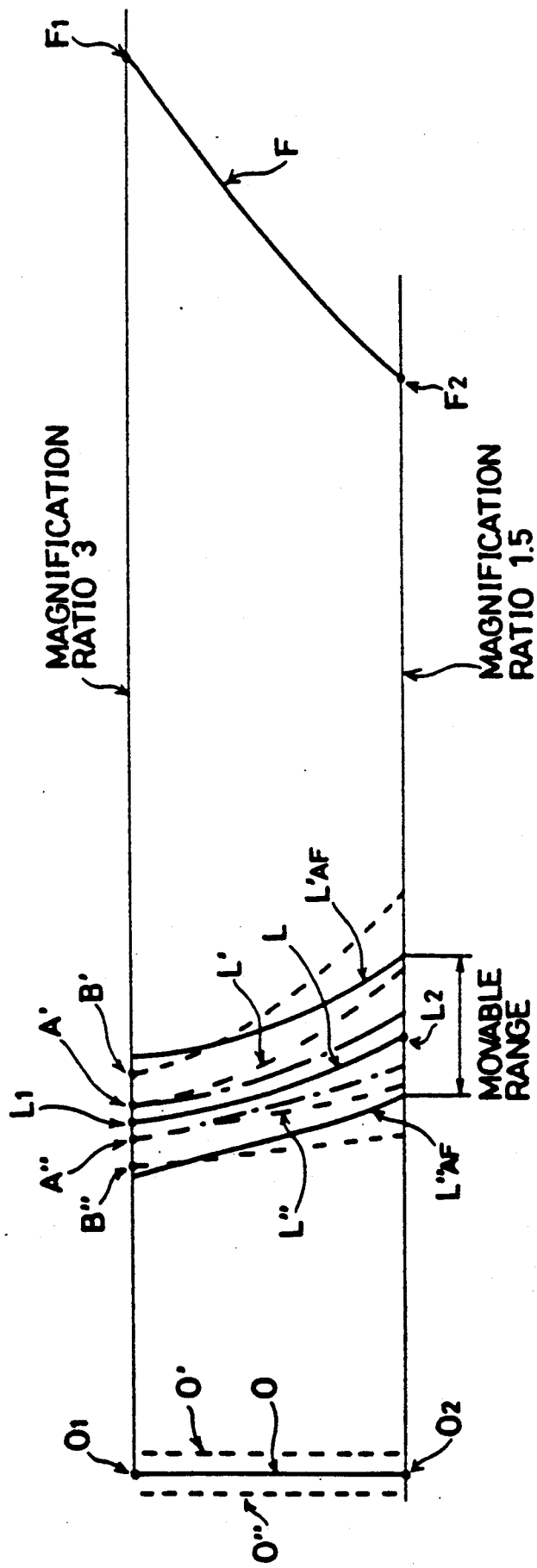

FIG. 12 illustrates the idea of the steps #1004 to #1007. In the FIGURE, the relations of the positions of the object O, lens L and the film surface for F are shown in a case where the focusing is carried out in a magnification range larger than 1 (e.g., 1.5 to 3 times larger). Namely, when the magnification ratio is 3, the lens is brought into in-focus position when the object lens and film surface are positioned at points $O_1$, $L_1$ and $F_1$, respectively. When the magnification ratio is 1.5, it is brought into in-focus position when the object, lens and film surface are at the points $O_2$, $L_2$ $F_2$, respectively. When the magnification ratio is ranges from 1.5 to 3, the lens is brought into in-focus position when the object, the lens and film surface are on the tracks represented by the solid lines O, L, and F, respectively.

Figure 13:
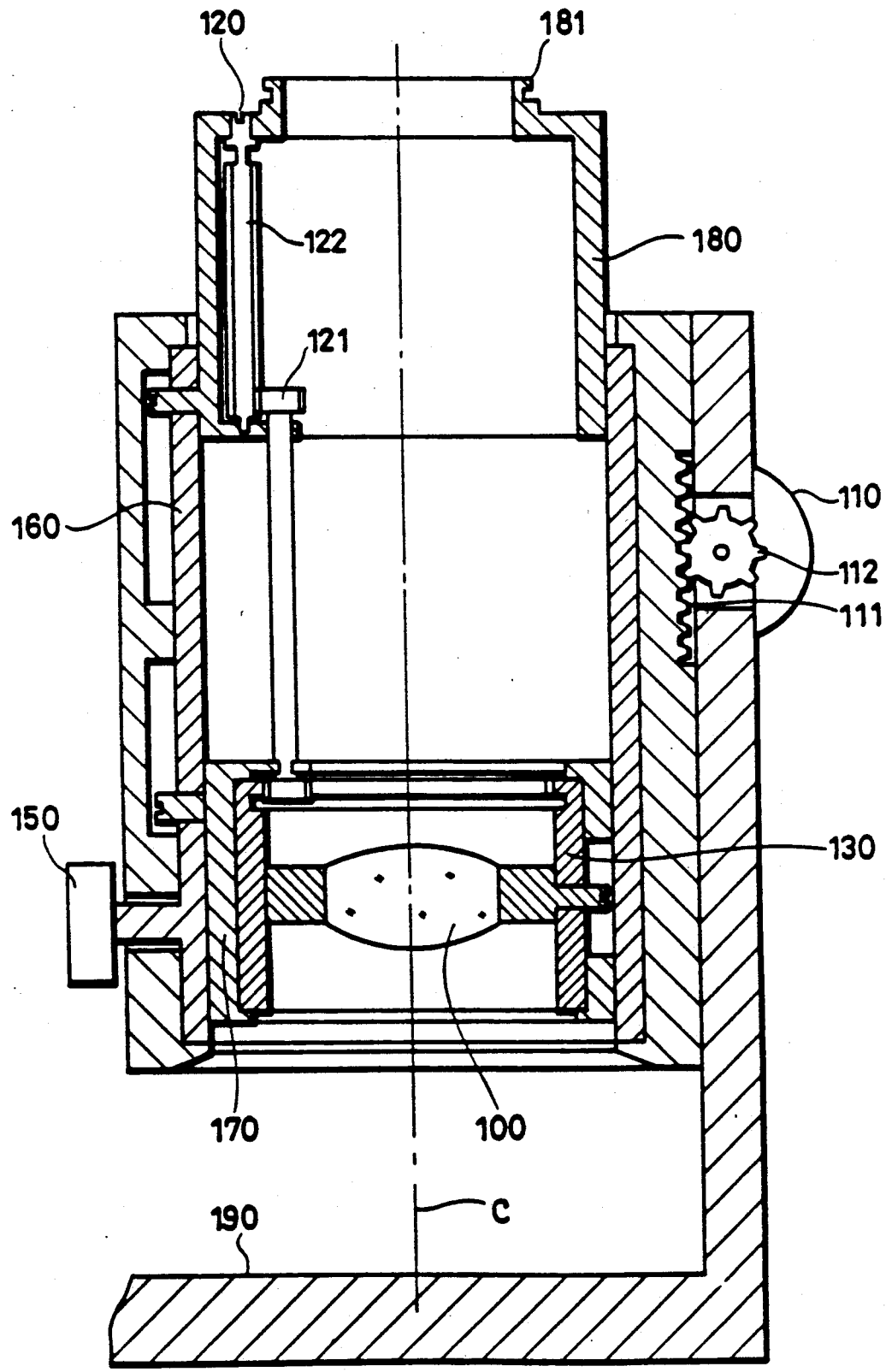
FIG. 13 is a cross sectional view of an apparatus for life-size magnification employed in the first embodiment.

FIG. 13 is a cross sectional view of a macro/close-up photographing apparatus in which the magnification can be easily changed while maintaining the above described relation. When a cam ring 160 for changing magnification is rotated about the optical axis c by means of a magnification adjustment knob 150, a lens moving frame 170 and a camera moving frame 180 are moved along the optical axis c. The shape of the cam ring 160 is designed such that the amounts of these movements maintain the relation between the lens position and the film surface shown by the solid lines L and F in FIG. 12. If the object is on the point on the line O of FIG. 12, the magnification can be changed only by the above described operation while maintaining the in-focus state. By rotating a focus rough adjustment knob 110, the lens 100 and the camera body move up or down in association with the table 190 on which the object is placed by means of a rack 111 and a pinion 112, whereby the adjustment is carried out such that the object is placed on a point corresponding to the solid line O of FIG. 12. The lens 100 can be moved by a prescribed amount the vertical direction in association with a reference position in the lens moving frame 170 by the movement of the focus adjustment cam ring 130. The reference position means a position on the solid line L of FIG. 12. A focus adjustment cam ring 130 is linked to a rotation shaft 120 through gears 121 and 122. The shaft 120 is fit in a rotation shaft in the camera body whose mounting portion mounts the macro photographing apparatus by a bayonet 181, and is rotary driven by a motor in the camera body. If the focus adjustment by the focus rough adjustment knob 110 is not perfect, the lens 100 can be brought in-focus position by being driven in the direction of the optical axis by means of rotating the focus adjusting can ring 130 through the shaft 120 and the gears 121 and 122 by using a known automatic focus adjustment mechanism contained in the camera body.

In FIG. 12, if the object is placed not on a point on the solid line O but on a position on the dotted line O' (or O'') as a result of rough adjustment of focus by the focus rough adjustment knob 110, the position of the lens 100 for focusing on the film surface F will be a position on the dotted line L' (or L''). If automatic focus adjustment is carried out with the magnification ratio being 3, the lens is brought into in-focus position when the lens is positioned at the point A' (or A''). Thereafter, when the magnification is changed by the rotation of the magnification adjusting knob 150, the lens 100 moves along a track shown by a chain dotted line from the point A' (or A'') by means of the magnification cam ring 160. The position of the lens is deflected from the dotted line L' (or L'') for focusing, and therefore the in-focus state cannot be maintained. However, since the difference between the position of the object shown by the dotted line O' (or O'') and the position of the object shown by the solid line O is small, the defocus amount is also small, and therefore the lens is easily brought into in-focus position by automatic focusing after the change of magnification.

On the contrary, when the lens 100 is not on the reference position shown by the solid line L but on a point A' (or A'') when the focus rough adjustment knob 110 is operated, and even if the lens is brought into in-focus position by the operation of the focus rough adjustment knob 110, it will be out-of-focus after the magnification is changed as in the above described case, since the position of the object is set at the position O' (or O'').

Additionally, When the lens 100 is on a point B' (or B'') near the border of the range (between the solid lines $L_{AF}$ and $L_{AF'}$) in which the lens is movable up and down from the reference position shown by the solid line L and when the lens 100 is brought into in-focus position by the operation of the focus rough adjustments knob 110 on the side of high magnification, then the deflection of the lens 100 on the low magnification side from the reference position (the track shown by the solid line L) for focusing becomes large as shown by the track of the dotted line extending from the point B' (or B''), and the track exceeds the movable range of the lens 100 between the solid lines $L_{AF}$ and $L_{AF'}$. In this case, after the magnification is changed to the low magnification side, the lens 100 cannot be moved in-focus position. Therefore, the rough adjustment must be carried out again.

As is apparent from the foregoing, when the focus rough adjustment knob 110 is to be operated, the lens 100 must be previously set on the reference position. In addition, in automatic focus adjustment, there must be a movable range of a prescribed amount upward and downward from the reference position. Therefore, in the present embodiment, when a macro lens for a magnification larger than 1 is attached, the defocus amount $DF_s$ of the lens initial position is selected to be a half of the maximum defocus amount $DF_m$.

Figure 9:
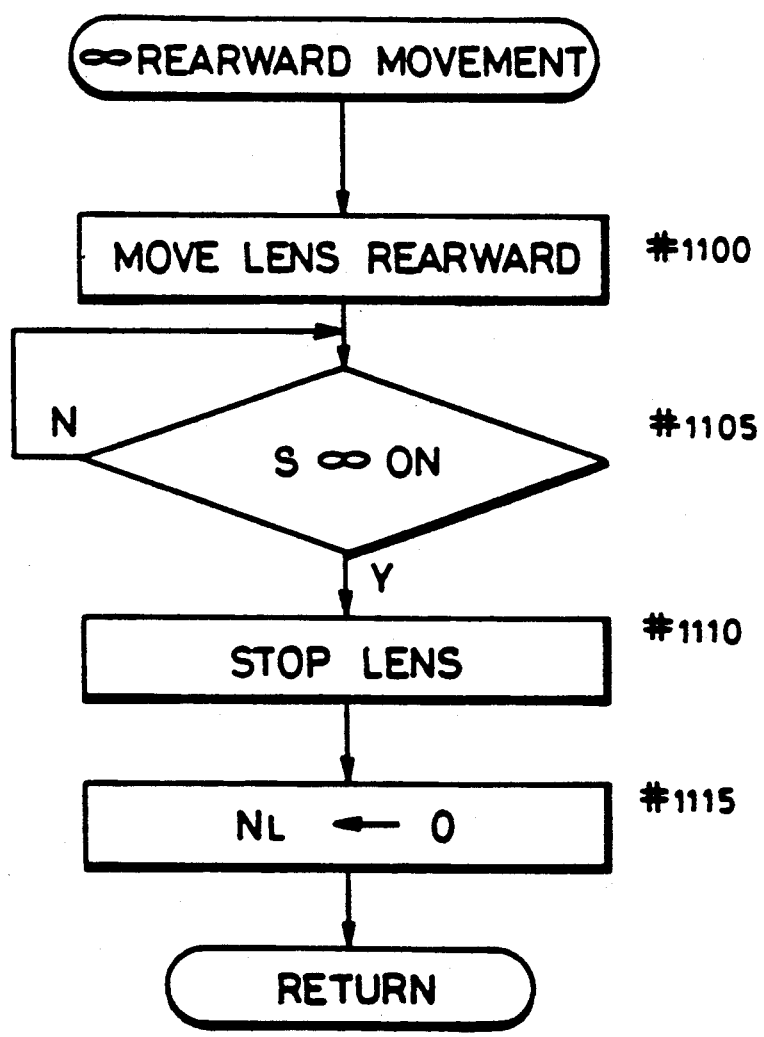

FIG. 9 is a flow chart showing the ∞ rearward movement subroutine. When this subroutine is called, the rearward movement of the lens is started in #1100 and whether the infinite focusing position detection switch S∞ is ON or not is checked in #1105. If the switch S∞ is not ON in #1105, the checking operation of #1105 is repeated until the switch S∞ is turned ON. When the lens is moved rearward to reach the infinite focusing position and the switch S∞ is turned ON in #1105, the rearward movement of the lens is stopped in #1110, the contents of the lens position counter $N_L$ is reset in #1115, and the flow returns to the step in which this subroutine was called.

Figure 10:
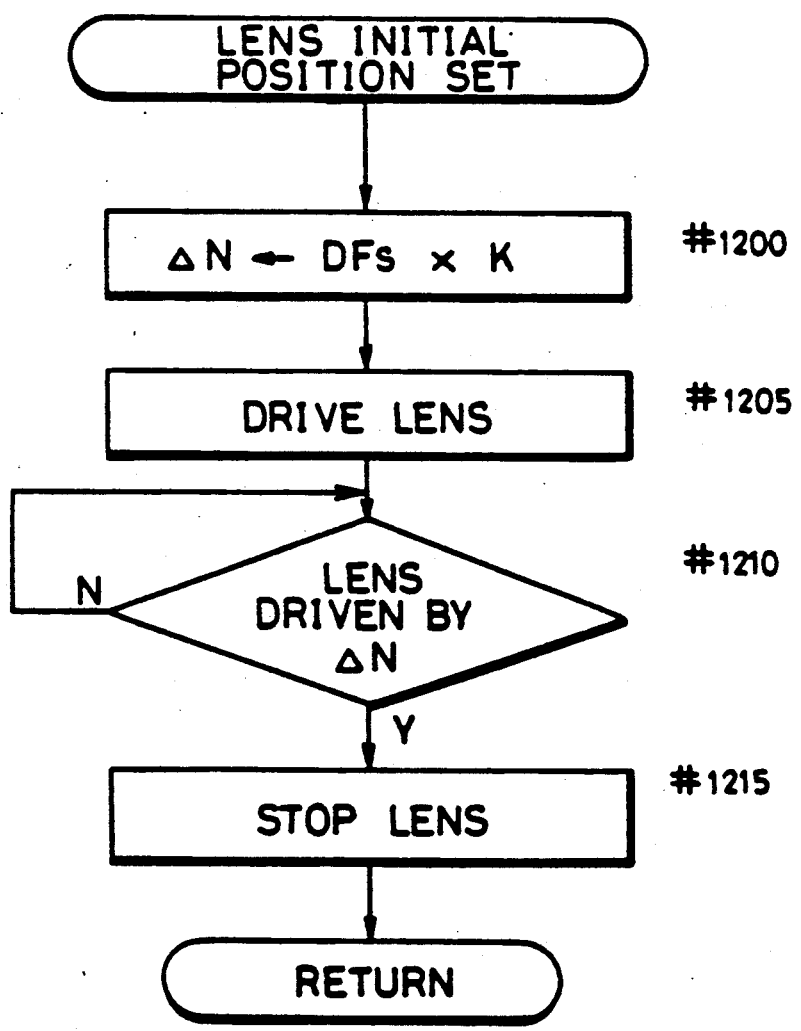

FIG. 10 is a flow chart showing a subroutine of setting the lens initial position. When this subroutine is called, the amount of driving lens $\Delta N = DF_S \times K$ from the infinite focusing position is calculated by multiplying the defocus amount $DF_s$ for setting the lens initial position by the coefficient K in #1200, and the forward movement of the lens is started in #1205. Whether the lens driving amount has reached $\Delta N$ or not is checked in #1210. If the lens driving amount has not yet reached $\Delta N$ in #1210, the checking operation of #1210 is repeated until the lens driving amount reaches $\Delta N$. If the lens driving amount reaches $\Delta N$ in #1210, the driving of the lens is stopped in #1215, and the flow returns to the step where this subroutine was called.

Figure 2:
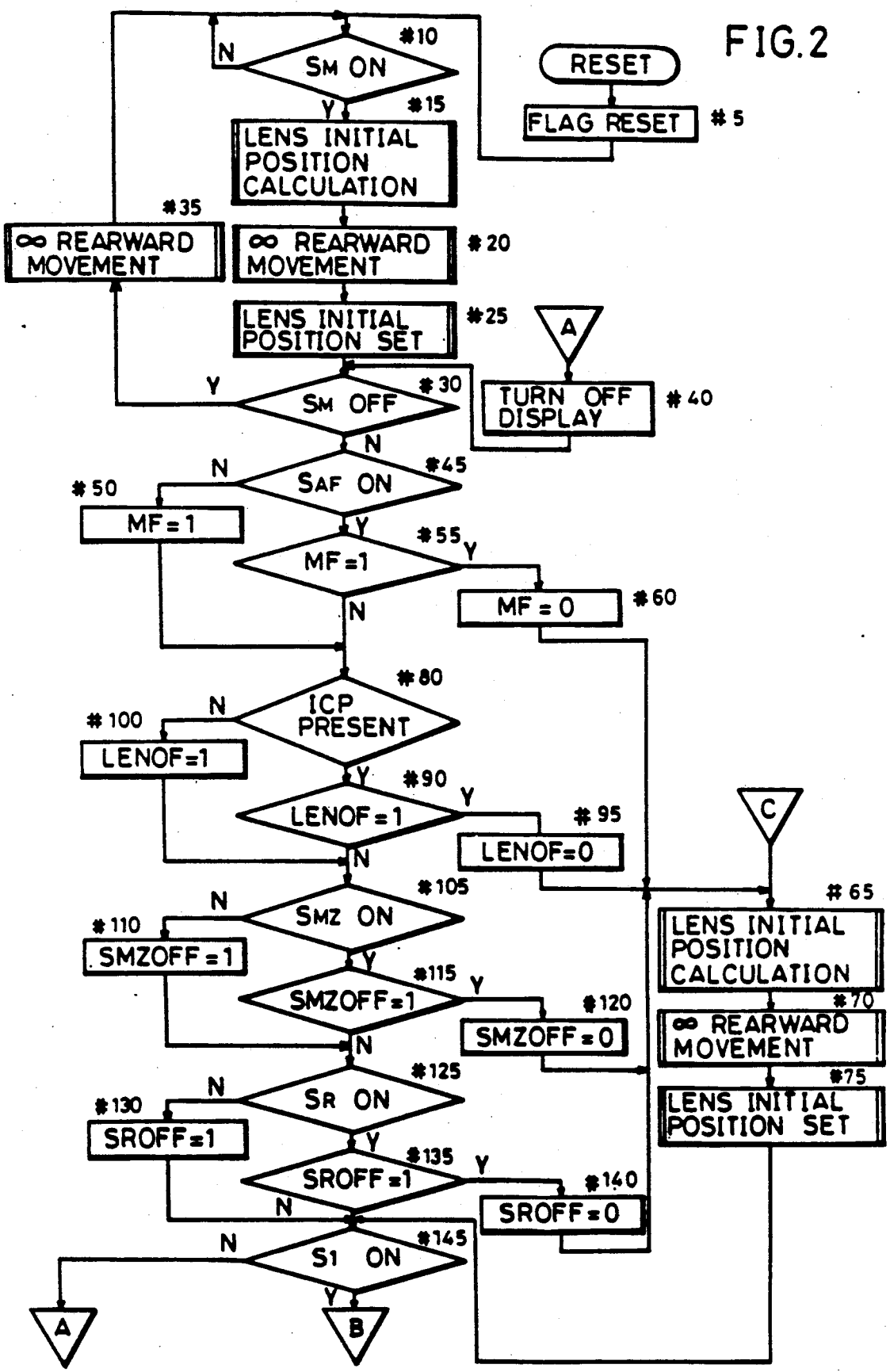
FIGS. 2 to 10 are flow charts showing the operation of the first embodiment.

Returning to the flow of FIG. 2, whether the AF mode switch $S_{AF}$ is ON or not is determined in #45. If the AF mode switch $S_{AF}$ is not ON in #45, then a flag MF indicating a manual focus mode is set at 1 in #50, and the flow proceeds to #80. If the AF mode switch $S_{AF}$ is ON in #45, whether the flag MF is 1 or not is checked in #55. If MF=1 in #55, it means that the switch $S_{AF}$ is just turned ON, so that the flag MF is set at 0 in #60, and the flow proceeds to #65. In the steps #65 to #75, the subroutines of calculating the lens initial position, the ∞ rearward movement and of setting the lens initial position are carried out, and thereafter the flow proceeds to #145. If MF is not 1 in #55, it means that the switch $S_{AF}$ has been ON, so that the flow proceeds to #80.

In the step #80, presence of the lens attachment signal ICP is determined. If it is determined that the lens is not attached in #80, then the flag LENOF indicating that the lens is not attached is set at 1 in #100, and the flow proceeds to #105. When it is determined that the lens is attached in #80, then whether the flag LENOF is 1 or not is checked in #90. If LENOF=1 in #90, it means that the lens is just attached, so that the flag LENOF is set at 0 in #95, the lens initial position is set in the steps #65 to #75 and the flow proceeds to #145. When LENOF is not 1 in #90, it means that the lens has been attached, and the flow proceeds to #105.

In the step #105, whether the macro zone switch $S_{MZ}$ is ON or not, namely, if the lens for zooming is in the macro zone or not is determined. If the macro zone switch $S_{MZ}$ is not ON in #105, namely, if the lens for zooming is in the macro zone, then the flag SMZOFF indicating that the macro zone switch $S_{MZ}$ is OFF is set at 1 in #110, and the flow proceeds to #125. If the macro zone switch $S_{MZ}$ is ON in #105, then whether the flag SMZOFF is 1 or not is checked in #115. If SMZOFF=1 in #115, it means that the macro zone switch $S_{MZ}$ is just turned ON, so that the flag SMZOFF is set at 0 in #120, then the lens initial position is set in #65 to #75, and the flow proceeds #145. If SMZOFF is not 1 in #115, it means that the macro zone switch $S_{MZ}$ has been ON, and the flow proceeds to #125.

In the step #125, whether the reset switch $S_R$ is ON or not is determined. If the reset switch $S_R$ is not ON in #125, a flag SROFF indicating that the reset switch $S_R$ is OFF is set at 1 in #130 and the flow proceeds to #145. If the reset switch $S_R$ is ON in #125, then, whether the flag SROFF is 1 or not is checked in #135. If SROFF=1 in #135, it means that the reset switch $S_R$ is just turned ON, so that the flag SROFF is set at 0 in #140, then the lens initial position is set in the steps #65 to #75, and the flow proceeds to #145. If SROFF is not 1 in #135, it means that the reset switch $S_R$ has been ON and the lens has already been set at the initial position, so that the setting of the lens initial position in the steps #65 to #75 is not carried out and the flow proceeds to #145.

Therefore, after the lens initial position is set (#15 to #25) immediately after the turning on of the main switch $S_M$, the setting of the lens initial position is carried out only in the following cases, namely, immediately after the turning ON of the AF mode switch $S_{AF}$, immediately after mounting of the lens, immediately the turning ON of the macro zone switch $S_{MZ}$, immediately after the turning ON of the reset switch $S_R$, when the focus detection is incapable even by the low contrast scanning, which will be described later, with the preparatory switch Sl being turned OFF and turned ON again (see step #155). The setting of the lens initial position is not carried out except the above mentioned cases. Therefore, when there is a high possibility that the lens may be brought into in-focus position with the position of the lens being near the last position, for example, when a similar picture is to be taken, or when a plurality of frames of the same picture are to be taken continuously, the setting of the lens initial position is not carried out. Accordingly, compared with the case in which the setting of the lens initial position is carried out at every focus detecting operation, the power consumption can be reduced and the time required for focus adjustment can be reduced.

Figure 3:
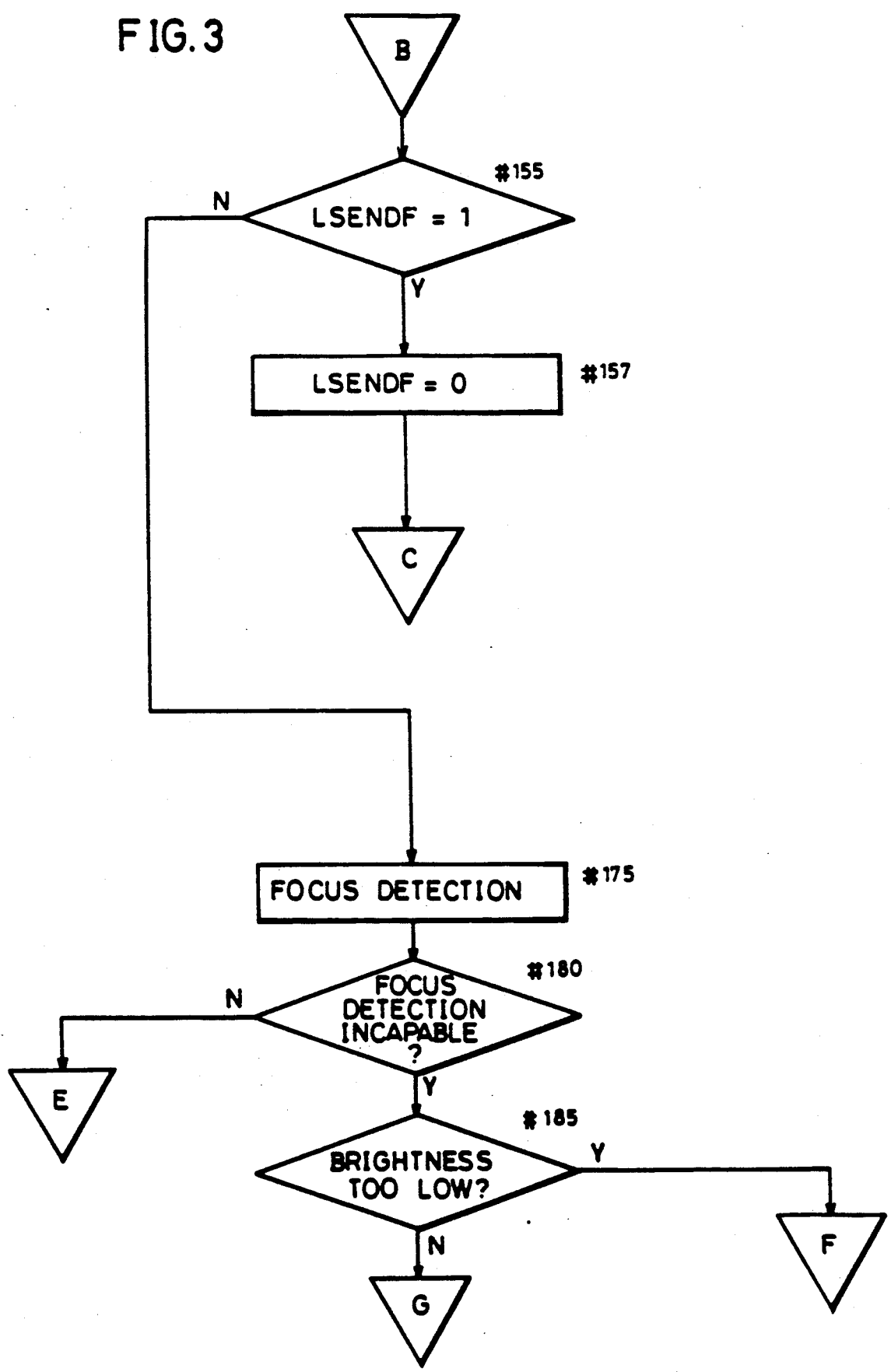

In the step #145, whether the preparatory switch Sl is ON or not is determined. If the preparatory switch Sl is not ON, then, all displays are turned off in #40 and the flow returns to #30. Thereafter, the states of the main switch $S_M$, the AF mode switch $S_{AF}$, the lens attachment signal ICP, the macro zone switch $S_{MZ}$, the reset switch $S_R$ and the preparatory switch Sl are monitored through a loop circulating #30, #45, #80, #105, #125 and #145. If the main switch $S_M$ is turned OFF in this loop, then ∞ rearward movement (#35) is carried out as described above to standby until the main switch $S_M$ is again turned ON (#10). If any one of the switches $S_{AF}$, $S_{MZ}$ and $S_R$ is turned ON or if the lens is attached in the loop, the setting of the lens initial position is carried out (#65 to #75) at each time. In this manner, the camera is standing by the turning ON of the preparatory switch Sl and when the preparatory switch Sl is turned ON in #145, the flow proceeds to #155 (FIG. 3) to start focus detecting operation.

Figure 4:
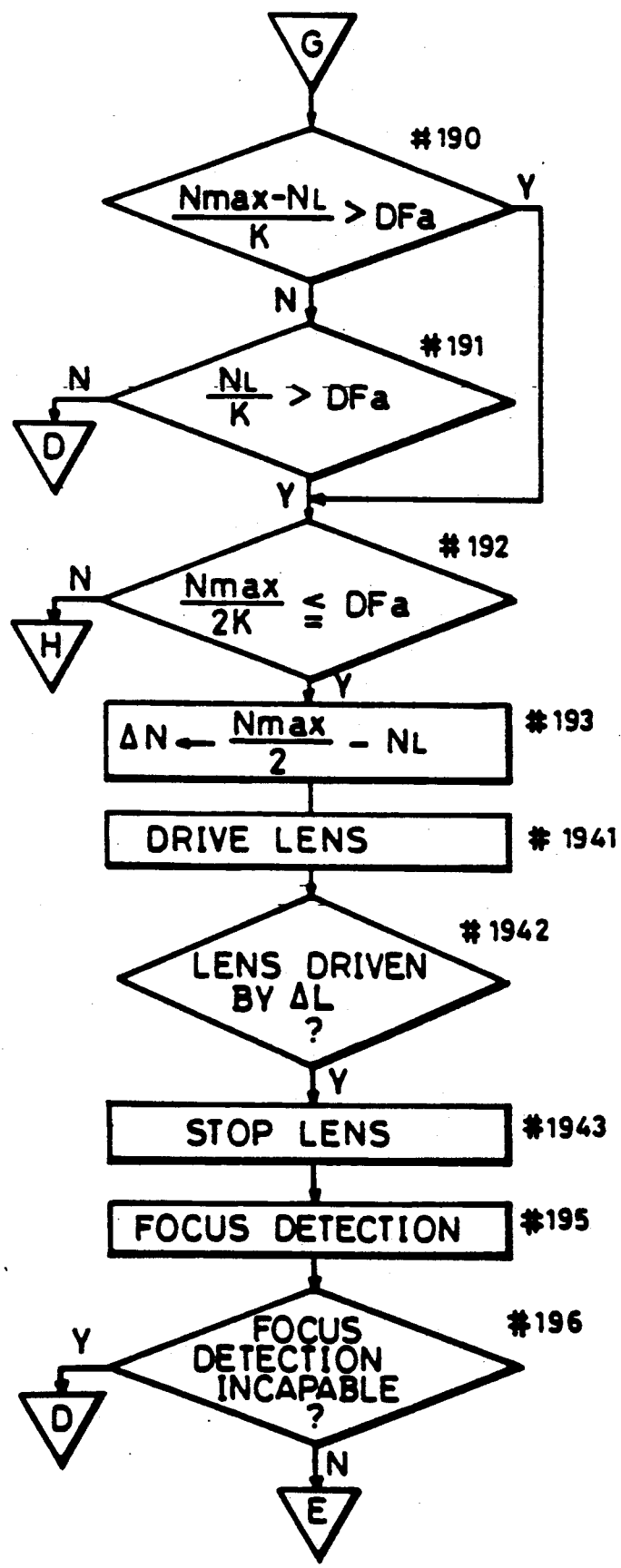

In the step #155, whether the low contrast scan end flag LSENDF is 1 or not is checked. Since the LSENDF is 0 at first, the focus detecting operation is carried out in #175 and the capability of the focus detection is checked in #180. If the focus detecting operation is incapable in #180, then, the flow proceeds to #285 (FIG. 7) to check whether the lens is in in-focus position or not. If the focus detecting operation is incapable in #180, whether the brightness is too low to enable focus detection or not is determined in #185. If it is determined that the brightness is low in #185, then the flow proceeds to #330 (FIG. 7) to emit an auxiliary light. If it is determined that the brightness is not low in #185, then whether the following conditions is satisfied or not is checked in #190 and #191 (FIG. 4).

$$(N_{max}-N_L)/K > DF_a$$

$$\text{or } N_L/K > DF_a \tag{1}$$

Figure 6:
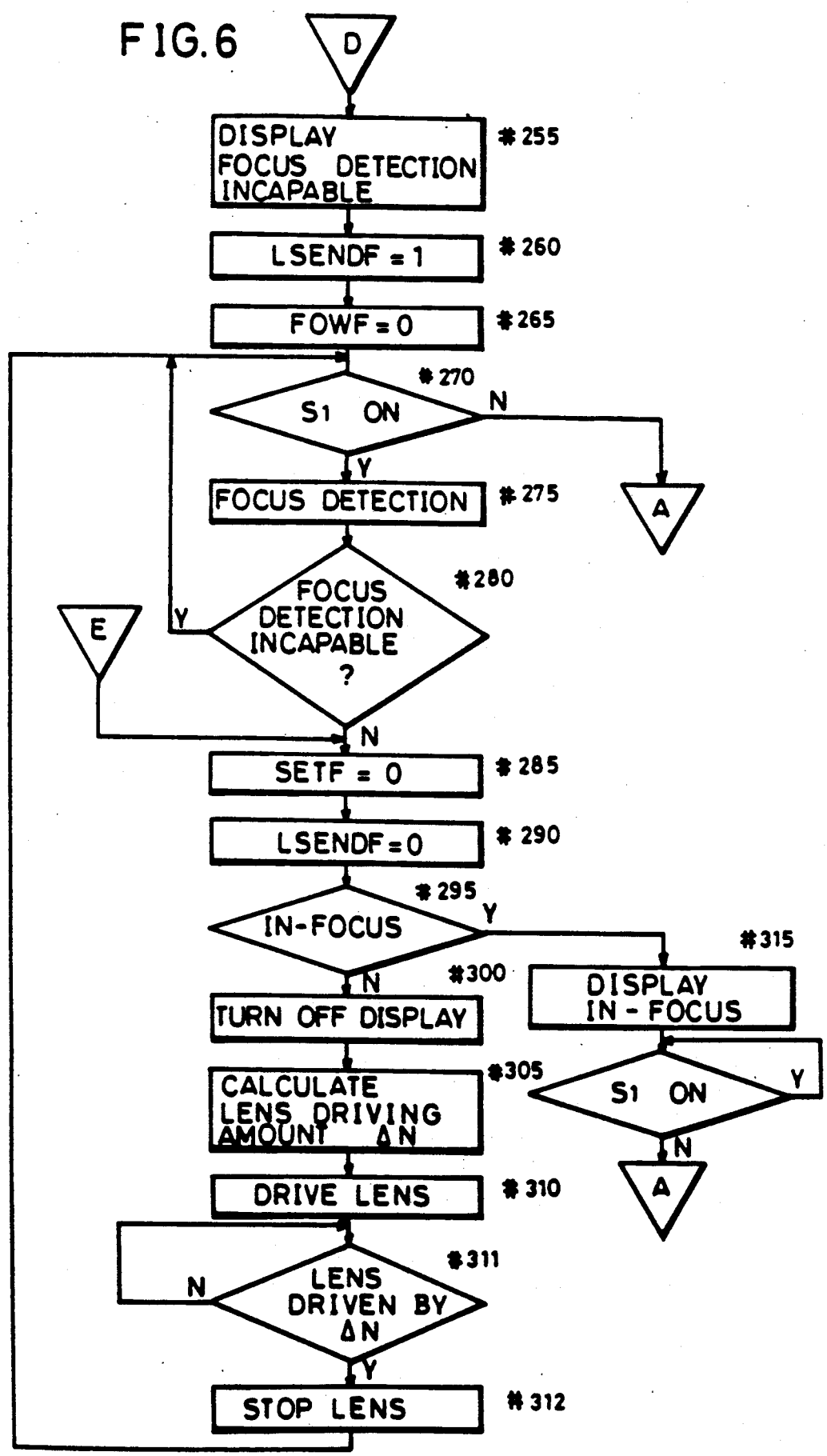

If it is determined that the condition (1) is not satisfied in the steps #190 and #191, it means that the entire focusing range of the lens is included in the range $2DF_a$ in which the focus detection is possible. The fact that the focus detection was incapable regardless of the above described fact means that the low contrast scanning is useless, since the capability of focus detection cannot be obtained even by the low contrast scanning (in which the focus detecting operation is carried out with the lens being driven to search a lens position capable of focus detection). Accordingly, the flow proceeds to #255 (see FIG. 6) without executing the low contrast scanning, to display the incapability of focus detection.

If it is determined that the condition (1) is satisfied in the step #190 or #191, then whether the condition $$N_{max}/2K \leq DF_a \qquad (2)$$

is satisfied or not is determined in #192. Now, $N_{max}/2K$ represents a defocus amount ($DF_m/2$) from the intermediate position to the extreme end position of the lens, and it is determined dependent on the lens attached. $2DF_a$ represents a defocus amount in which the focus detection is possible defined by the structure of the focus detecting circuit AFC as described above, which is a constant of the camera body. If the condition (2) is satisfied in #192, and if the lens is at the intermediate position, then the entire focusing range of $N_{max}/K$ of the lens is included in the range $2 DF_a$ in which the focus detection is possible, so that there is no need of low contrast scanning. Accordingly, the lens driving amount $N = N_{max}/2 - N_L$ is calculated in #193 to move the lens to the intermediate position $N_{max}/2$, and the lens is driven in #1941. Whether the lens driving amount reached N or not is determined in #1942. If it has not yet reached $\Delta N$ in #1942, then the determining operation of #1942 is repeated until the lens driving amount reaches $\Delta N$. If the lens driving amount reaches $\Delta N$ in #1942, then the driving of the lens is stopped in #1943, the focus detection is carried out in #195, and whether the focus detection is capable or not is determined in #196. If it is determined that the focus detection was is incapable in #196, then there is no possibility of successful focus detection even when the low contrast scanning is carried out, and therefore the low contrast scanning is useless. Consequently, the flow proceeds to #255 (FIG. 6) without executing low contrast scanning to display the incapability of focus detection. If the focus detection is capable, then the flow proceeds to #285 (FIG. 6) to determine whether the lens is in in-focus position or not.

Figure 5:
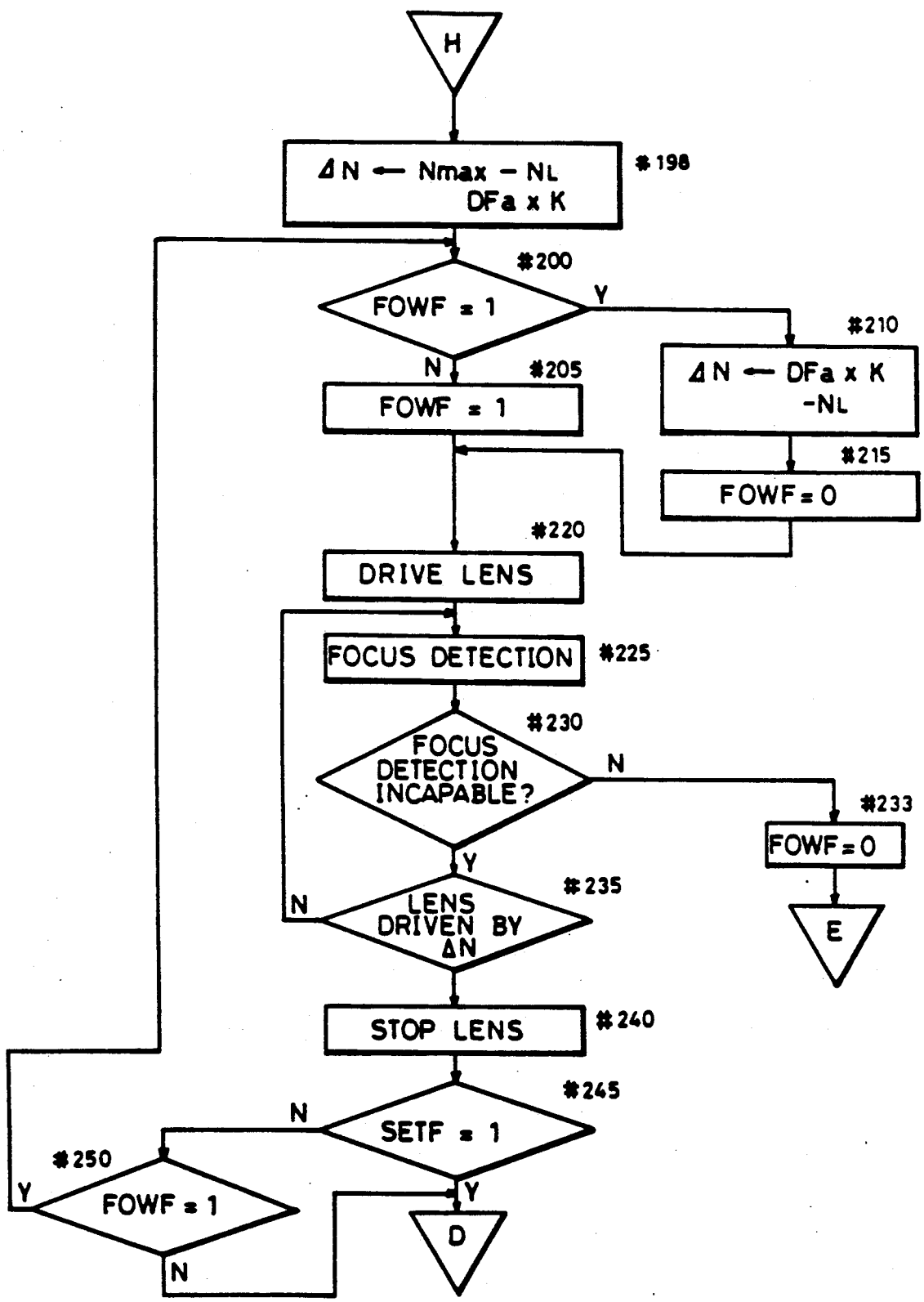

If the condition 2 is not satisfied in #192, then the entire focusing range $N_{max}/K$ cannot be included in the range $2DF_a$ in which the focus detection is possible no matter where the lens is positioned. Therefore, in that case, the low contrast scanning is inevitably carried out. However, the time required for low contrast scanning is reduced by limiting the range of the low contrast scanning as small as possible. Namely, in #198 (FIG. 5), the amount of a scanning in the forward direction is calculated as $\Delta N = N_{max} - N_L - DF_a \times K$. The reason for this is that the closest focusing position $N_{max}$ can be included in the range $2DF_a$ in which the focus detection is possible only by moving forward the lens by the distance of $DF_a \times K$, and there is no need of moving the lens forward to the closest focusing position $N_{max}$. Thereafter, whether the flag FOWF is 1 or not is determined in #200 to check the direction of scanning. The flag FOWF indicates that the scanning is carried out in the forward direction. When the low contrast scanning is carried out at the first time, the flag FOWF has been reset and therefore FOWF is not at 1. Therefore, the flow first proceeds to #205 in which the FOWF is set at 1, and then the flow proceeds to #220. In #220, a signal is outputted to the lens driving circuit LDC for driving the lens in the forward direction, the focus detecting operation is carried out in #225 and whether the focus detection is capable or not is determined in #230. If the focus detection is capable in #230, the flag FOWF is reset in #233, and the flow proceeds to #285 (FIG. 6) to determine whether the lens is in in-focus position or not. If the focus detection is incapable in #230, then whether the lens driving amount reached N or not is checked in #235. If the lens driving amount has not yet reached $\Delta N$ in #235, then the flow returns to #225 and whether the focus detection is capable or not is determined while driving the lens in the forward direction. If it is determined that the lens driving amount reached $\Delta N$ in #235, then the driving of the lens is stopped in #240, and whether the lens position set flag SETF is 1 or not is determined in #245. If SETF=1 in #245, it means that the focus detection is impossible in the entire range of focusing of the lens even if the scanning of the rearward direction is carried out, so that the flow proceeds to #255 (FIG. 6) to display the incapability of focus detection. If the SETF is not 1 in #245, then whether the flag FOWF is 1 or not is determined in #250. If FOWF=1 in #250, it means that the lens position at which the focus detection is possible could not be found by the scanning in the forward direction. Therefore, the flow returns to #200 to carry out the scanning in the rearward direction. If FOWF=1 in #200, it means that the scanning in the forward direction has been done, and therefore the scanning amount in the rearward direction is calculated as $\Delta N = DF_a \times K - N_L$ in #210. The reason for this is that the infinite focusing position can be included in the range $2DF_a$ in which the focus detection is possible by the rearward movement by the distance of $DF_a \times K$, and there is no need to move the lens rearward to the infinite focusing position. In #215, the flag FOWF is set at 0 to indicate that the scanning is in the rearward direction, and the flow proceeds to #220. In #220, a signal is outputted to the lens driving circuit LDC to drive the lens in the rearward direction, and the flow again proceeds to #250 through #225 to #245. Since FOWF is not 1 at this time, the flow does not return to #200 but proceeds to #255 (FIG. 6). Namely, the fact that FOWF is not 1 in #250 means that the lens position at which the focus detection is possible could not be found out neither by the scanning in the forward direction nor by the scanning in the rearward direction. Therefore, the flow proceeds to #255 to indicate the incapability of focus detection. If the focus detection becomes possible in #230 during the scanning in the rearward direction, then the flag FOWF is reset in #233 and the flow proceeds to #285 (FIG. 6) to determine whether the lens is in in-focus position or not.

After the incapability of the focus detection is displayed in #255 (FIG. 6), the low contrast scanning end flag LSENDF is set at 1 in #260. This flag indicates that the lens position at which the focus direction is possible could not be found by the low contrast scanning. Meanwhile, if the focus detection was incapable even though the entire range of focusing of the lens was included in the range $2DF_a$ of focus detection (more specifically, if the flow proceeds from #191 or #196 to #255), then the flag LSENDF is set at 1 in #260, although the low contrast scanning was not carried out. The reason for this is that there is no possibility of finding the lens position at which the focus detection is possible even if the low contrast scanning is carried out. Thereafter, the flag FOWF indicating the scanning direction is set at 0 in #256 and whether the preparatory switch S1 is ON or not is determined in #270. If the preparatory switch S1 is not ON in #270, then all displays are turned off in #40 and the flow returns to #30. If the preparatory switch S1 is ON in #270, then the focus detection is carried out in #275, and whether the focus detection is capable or not is determined in #280. If it is determined that the focus detection is incapable in. #280, the flow returns to #270. If the focus detection is capable in #280, then the lens position set flag SETF is set at 0 in #285, the low contrast scanning end flag LSENDF is set at 0 in #290, and whether the lens is in in-focus position or not is determined in #295. If it is determined that the lens is out-of-focus position in #295, then the flow proceeds to #300 to turn off the in-focus display and the focus detection incapable display, the lens driving amount $\Delta N = DF \times K$ is calculated based on the defocus amount DF in #305, and the driving of the lens is started in #310. In #311, whether the lens driving amount reached $\Delta N$ or not is determined. If the lens driving amount has not yet reached $\Delta N$ in #311, then the checking operation of #311 is repeated until the lens driving amount reaches $\Delta N$. When the lens driving amount reached $\Delta$ in #311, the driving of the lens is stopped in #312 and the flow returns to #270. If the preparatory switch S1 is ON in #270, the focus detection is carried out in #275, the flow proceeds to #280 to #290, and whether the lens is in in-focus position or not is again determined in #295. Since the lens is being driven toward the in focus position in the above described steps #305 and #310, there is a high possibility that the camera is brought into in-focus position. If it is determined that the lens is brought into in-focus position in #295, then the in-focus display is carried out in #315, and whether the preparatory switch S1 is ON or not is determined in #320. If the preparatory switch S1 is ON in #320, then the determining operation of #320 is repeated until the preparatory switch S1 is turned off, namely, the camera enters the focus-lock state. Although it is not related to the present invention, in a camera having a focus priority mode, the shutter release operation is carried out when the shutter release is permitted in this focus-lock state and the shutter release button (not shown) is further pressed beyond the first stroke to a second stroke. If the preparatory switch S1 is turned off in #320, then the displays are turned off in #40 and the flow returns to #30. Namely, if the preparatory switch S1 is turned off, the above described focus-lock state is released.

When the preparatory switch S1 is turned OFF and thereafter it is turned ON again, sometimes the LSENDF is determined to be 1 in #155. This corresponds to a case in which the focus detection was carried out with the preparatory switch S1 being ON but the focus detection was incapable and the lens position at which the focus detection was possible could not be found by the low contrast scanning, or a case in which there is no possibility of finding the lens position at which the focus detection is possible even by the low contrast scanning. In such a case, the flag LSENDF is set at 0 in #157, the setting of lens initial position of #65 to #75 is carried out and the flow proceeds to #145. The flow proceeds to #157 only when the preparatory switch S1 is once turned off and thereafter turned on. The lens initial position is set on this occasion from the following reasons. Namely, when the low contrast scanning end flag LSENDF is 1, the object to be photographed may not exist near the present lens position, and when the low contrast scanning was actually done, the lens position is near the infinite focusing position or the closest focusing position, and the lens must be returned to an appropriate position.

Figure 7:
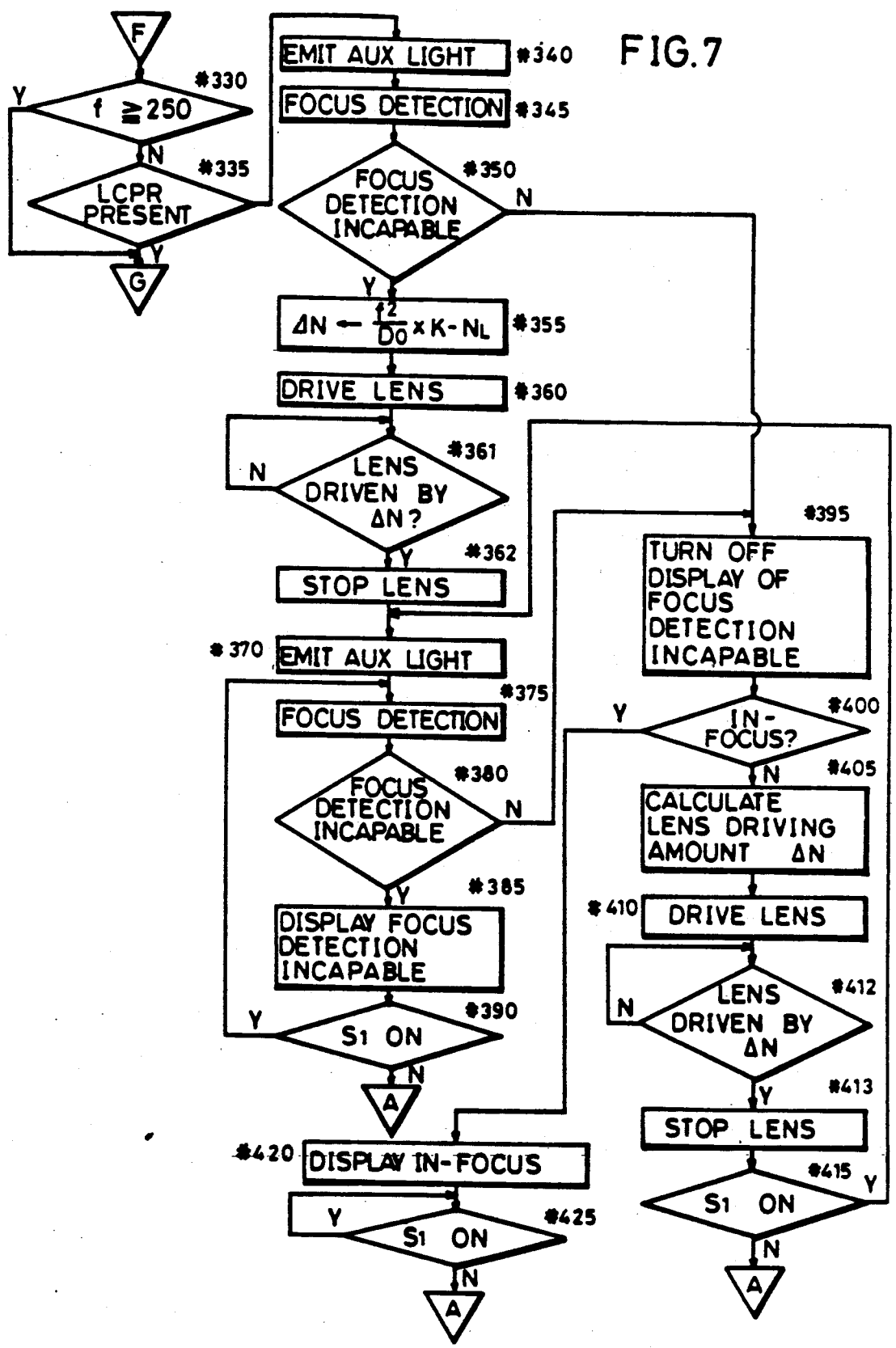

If the flow passes through the step #330 of FIG. 7, it has been determined that the brightness is low and the focus detection is impossible in the steps #185 and #180 (FIG. 3), so that the auxiliary light must be emitted. However, sometimes the auxiliary light is useless, and so whether the auxiliary light should be emitted or not is determined in the steps #330 and #335.

Now, the auxiliary light emitting apparatus ILM shown in FIG. 1 usually comprises a light emitting diode externally attached to a camera body above the photographic lens or internally provided in front of the camera body and an optical system for projecting light. Meanwhile, the focus detecting circuit AFC comprises an optical system for detecting focus condition of the TTL phase difference detecting method, with the optical axis thereof being in coincidence with the optical axis of the photographic lens. Therefore, the range of the luminous flux of the optical system for projecting auxiliary light and the range of luminous flux for detecting the focus condition have a parallax and, beyond a prescribed photographic distance which changes dependent on the angle of view, the range of luminous flux for detecting the focus condition is completely included in the range of luminous flux of the optical system for projecting auxiliary light. This distance is the lower border of the range in which the auxiliary light can illuminate the object to enable focus detection. The auxiliary light is useless for an object nearer than the distance. If a tele-photo lens is attached to the camera, sometimes the auxiliary light becomes useless, because the auxiliary light is eclipsed by the lens barrel and the object is not fully illuminated by the auxiliary light. The lower border of the range in which the auxiliary light can illuminate the object to enable focus detection can be made small by employing the auxiliary light system of the TTL method. However, the upper limit of the range in which the illumination of the auxiliary light enables focus detection cannot be made very large, since the reach of the auxiliary light is about 10 m at the most.

Therefore, in #330, whether the focal length f of the lens is no less than 250 mm or not is determined, and if $f \geq 250$ in #330, it is determined that the auxiliary light may be eclipsed by the long lens barrel, and therefore the proceeds to #190 (FIG. 4) to determine whether the low contrast scanning is necessary or not. When a telephoto lens is used, the object to be photographed is, in most case, at a distant, so that the prohibition of auxiliary light emission is not a serious problem. If f is smaller than 250 in #330, then presence of a signal LCPR or not is determined, which signal indicating the attachment of a macro lens for a magnification larger than 1. If it is determined that the macro lens for a magnification larger than 1 is attached in #335, then it is determined that the object is nearer than the lower border of the range in which the auxiliary light enables focus detection, and therefore the auxiliary light is not emitted and the flow proceeds to #190 (FIG. 4) to determine whether the low contrast scanning is necessary or not. If it is determined that the macro lens is not attached in #335, then the auxiliary light is projected in #340, the focus detection is carried out in #345 and whether the focus detection is capable or not is determined in #350. The auxiliary light is emitted for a prescribed time period at each focus detecting operation.

If the focus detection is capable in #350, then the flow proceeds to #395. If the focus detection is incapable in #350 then the lens driving amount $\Delta N = (f^2/D_0) \times K - N_L$ is calculated in #355 in order to set the lens position at an intermediate distance (for example 4 m) in the range in which the auxiliary light enables focus detection or at a distance (for example 3 m) $D_0$ at which objects are often placed, and the driving of the lens is started in #360. In #361, whether the lens driving amount reached ΔN or not is determined. If the lens driving amount has not yet reached ΔN in #361, then the determining operation of #361 is repeated until the lens driving amount reaches ΔN. When the lens driving amount reaches ΔN in #361, the driving of the lens is stopped in #362. The auxiliary light is emitted in #370, focus detecting operation is carried out in #375, and whether the focus detection is capable or not is determined in #380. If the focus detection is capable in #380, then the flow proceeds to #395. If the focus detection is incapable in #380, incapability of focus detection is displayed in #385, and whether the preparatory switch Sl is ON or not is determined in #390. If it is determined that the preparatory switch Sl is ON in #390, then the flow returns to #375. If the preparatory switch Sl is not ON in #390, then the displays are turned off in #40 and the flow returns to #30.

In #395, the display of incapability of focus detection is turned off and whether the lens is brought into in-focus position or not is determined in #400. If the lens is in in-focus position in #400, then the in focus display is carried out in #420, and whether the preparatory switch Sl is ON or not is determined in #425. If the preparatory switch Sl is ON in #425, then the operation of #425 is repeated until the preparatory switch Sl becomes OFF. If the preparatory switch Sl becomes OFF in #425, then the displays are turned off in #40 and the flow returns to #30. If the lens is in out-of-focus position in #400, then the lens driving amount ΔN=DF×K is calculated based on the defocus amount DF in #405, and the drive of the lens is started in #410. In #412, whether the lens driving amount reached ΔN or not is determined. If the lens driving amount has not yet reached ΔN in #412, then the checking operation of #412 is repeated until the lens driving amount reaches ΔN. If the lens driving amount reaches ΔN in #412, then the driving of the lens is stopped in #413 and whether the preparatory switch Sl is ON or not is determined in #415. If the preparatory switch Sl is ON in #415, then the flow returns to #370. If it is OFF, then the displays are turned off in #40 and the flow returns to #30.

In association with the above described subroutine (see FIG. 8) for calculating the position of the lens, the algorithm for determining the amount $DF_b$ of defocus (#1008), frequently used magnification rates $\beta$ are previously set in accordance with the information of the focal length f. The amount of defocus $DF_b$ from the lens position $N_b$ corresponding to the distance for the said magnification rate $\beta$ to the infinite focusing position is calculated in advance to be stored in an ROM table (see Table 1). This enables selection of a prescribed defocus amount $DF_b$ for a lens whose focal length is in a prescribed range. For example $DF_{b=1.1}$ mm when 35 mm<f ≦50 mm and $DF_{b=2.5}$ mm when 50 mm<f≦100 mm.

Figure 14:
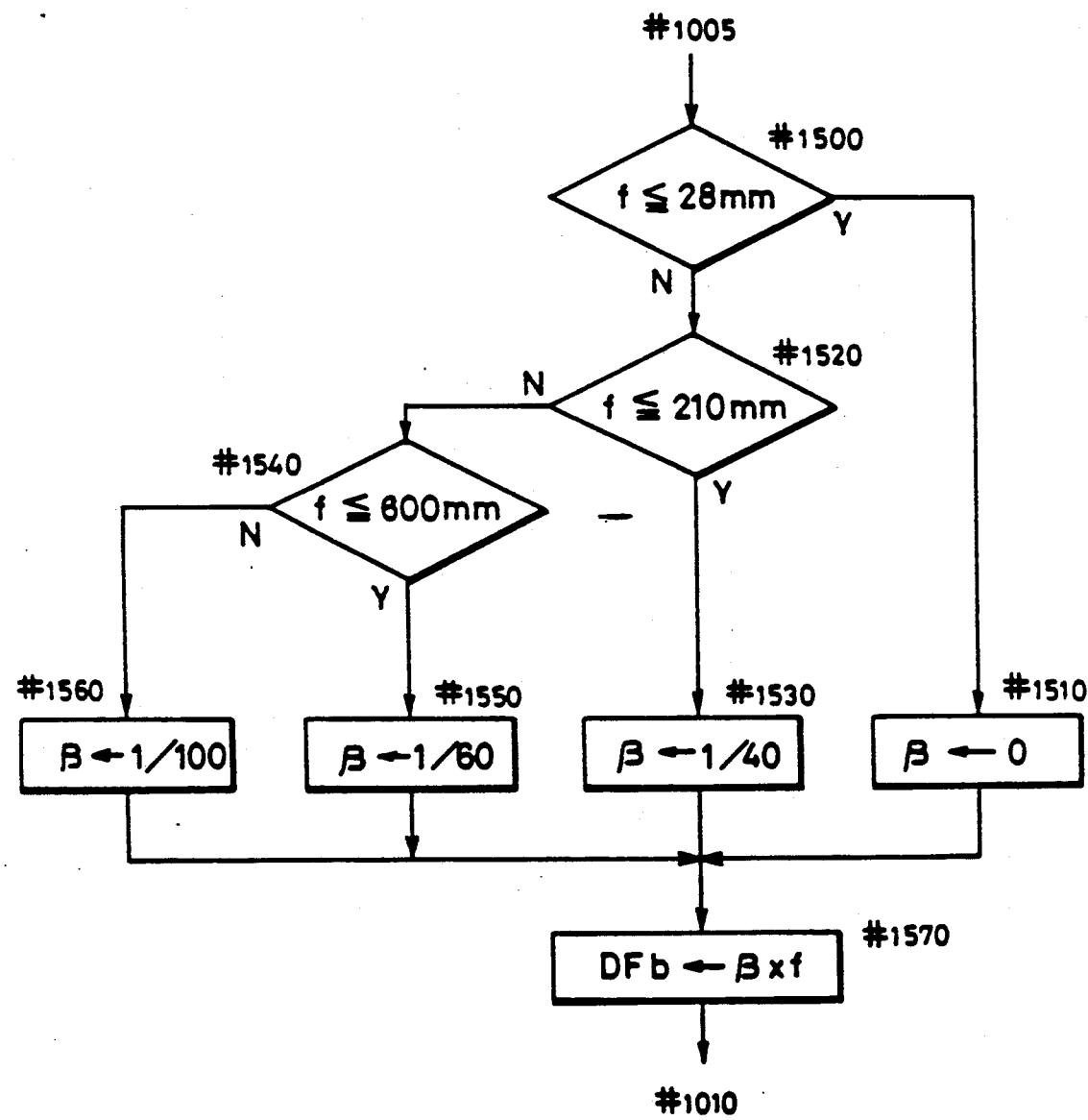
FIG. 14 is a flow chart showing a modification of the algorithm corresponding to FIG. 8 of the first embodiment.

FIG. 14 is a flow chart showing one modification of the algorithm corresponding to FIG. 8 of the first embodiment. In the step #1500, whether the focal length f is larger than 28 mm or not is determined. If it is determined that f≦28 mm in #1500, the magnification rate $\beta$ is selected to be 0 in #1510 and the flow proceeds to #1570. If it is determined that f>28 mm in #1500, whether it is larger than 210 mm or not is determined in #1520. If it is determined that f≦210 mm in #1520, the magnification rate $\beta$ is selected to be (1/40) in #1530 and the flow proceeds to #1570. If f>210 mm in #1520, whether the focal length f is larger than 600 mm or not is determined in #1540. If it is determined that f≦600 mm in #1540, the magnification rate $\beta$ is selected to be (1/60) in #1550 and the flow proceeds to #1570. If f>600 mm in #1540, the magnification rate $\beta$ is selected to be (1/100) in #1560 and the flow proceeds to #1570. In the step #1570, the amount $DF_b$ of forward movement of the lens from the infinite position to the lens position $N_b$ is calculated by multiplying the magnification rate $\beta$ by the focal length f. In the algorithm shown in FIG. 14, the defocus amount $DF_b$ calculated by multiplying the magnification rate $\beta=(1/40)$ by the focal length f is selected when the focal length f is in the range of 35 mm to 105 mm. More specifically, the lens is initially set at a position where the magnification rate of (1/40) is provided.

(2) Second Embodiment

Following is a second embodiment of the present invention. The second embodiment is a partial modification of the first embodiment. Therefore, modified portion will be described in detail in the following. The only difference between the block diagram of the first embodiment and that of the second embodiment is that the closest position detecting switch $S_N$ is added to the microcomputer μC. Therefore, the block diagram of the second embodiment is omitted.

The focus adjustment operation of the second embodiment of the present invention will be described in the following with reference to flow charts. In response to the power-on-reset, the microcomputer μC executes the program following the step #2005 shown in FIG. 15. First, all flags are reset in #2005. Then, whether the main switch $S_M$ is ON or not is checked in #2010. If the main switch $S_M$ is not ON, the checking of the step #2010 is repeated until it is turned ON. If the main switch $S_M$ is ON, a subroutine of calculating the lens initial position (FIG. 19) is executed in #2015, a subroutine of ∞ rearward movement (FIG. 20) is carried out in #2020, a subroutine of setting lens initial position (FIG. 11) is carried out in #2025, and whether the main switch $S_M$ is OFF or not is checked in #2030. If the main switch $S_M$ is OFF, then the subroutine of ∞ rearward movement is carried out in #2035, and the flow returns to #2010. If the main switch $S_M$ is not OFF in #2030, the flow proceeds to #2045.

Figure 19:
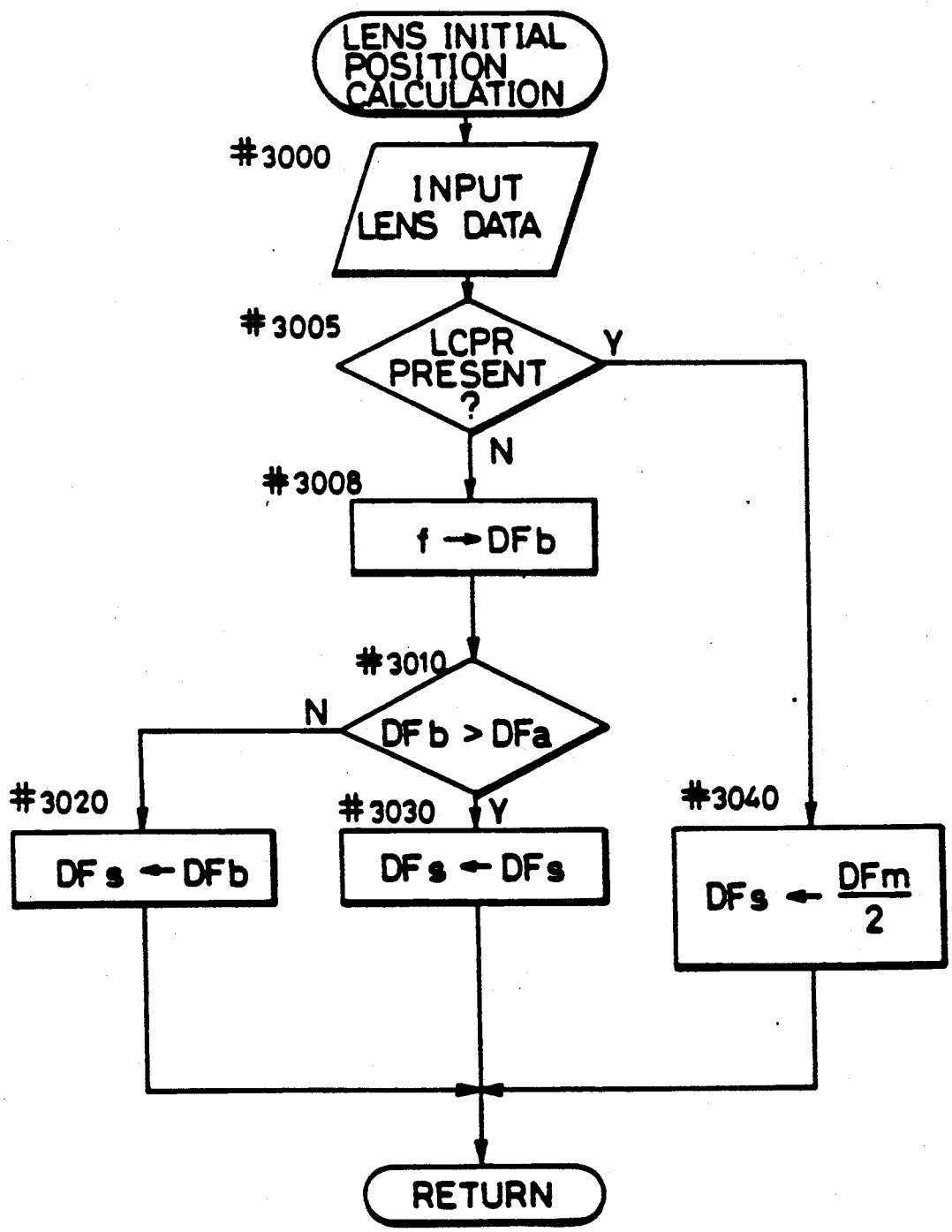

FIG. 19 is a flow chart showing the subroutine of calculating the lens initial position, which corresponds to FIG. 8 of the first embodiment. In the second embodiment, maximum amount of the forward movement $N_{max}$, which is calculated in the camera body based on the data $REV_{max}$ transmitted from the lens circuit LEC in the first embodiment, is directly transmitted to the camera body from the lens circuit LEC. Therefore, step #1004 in FIG. 8 is omitted in FIG. 19. When this subroutine is called, the lens data are inputted from the lens circuit LEC at the step #3,000. A lens attachment signal ICP, the macro zone signal SMZ, a macro lens attachment signal LCPR indicating that a macro lens having a magnification larger than 1, i.e., enabling life-size shot, is attached, maximum amount of the forward movement $N_{max}$, the focal length f, a conversion coefficient K, and so on are inputted to the microcomputer μC. The coefficient K is for converting the defocus amount DF into the amount ΔN of driving the focus adjusting lens. Presence of the macro lens attachment signal LCPR is determined in #3005. When it is determined that the macro lens for a magnification larger than 1 is attached in the step #3005, the amount of defocus $DF_s$ for setting the lens initial position is selected to be $DF_m/2$ in #1040, and then the flow returns to the step at which the subroutine was called.

When it is determined that the macro lens for the magnification larger than 1 is not attached in the step #3005, the defocus amount $DF_b$ is determined from the ROM table shown in Table 2 in #3008.

In the step #3010, whether $DF_b>DF_a$ or not is checked. If $DF_b>DF_a$ in #1010, the defocus amount $DF_s$ for setting the lens initial position is set at $DF_a$ in #3030, the lens position set flag SETF is set at 1 in #3060, and the flow returns to the step in which this subroutine was called. If $DF_b \leq DF_a$ in #3010, the defocus amount $DF_s$ for setting the lens initial position is set at $DF_b$, and the flow returns to the step in which this subroutine was called.

Figure 20:
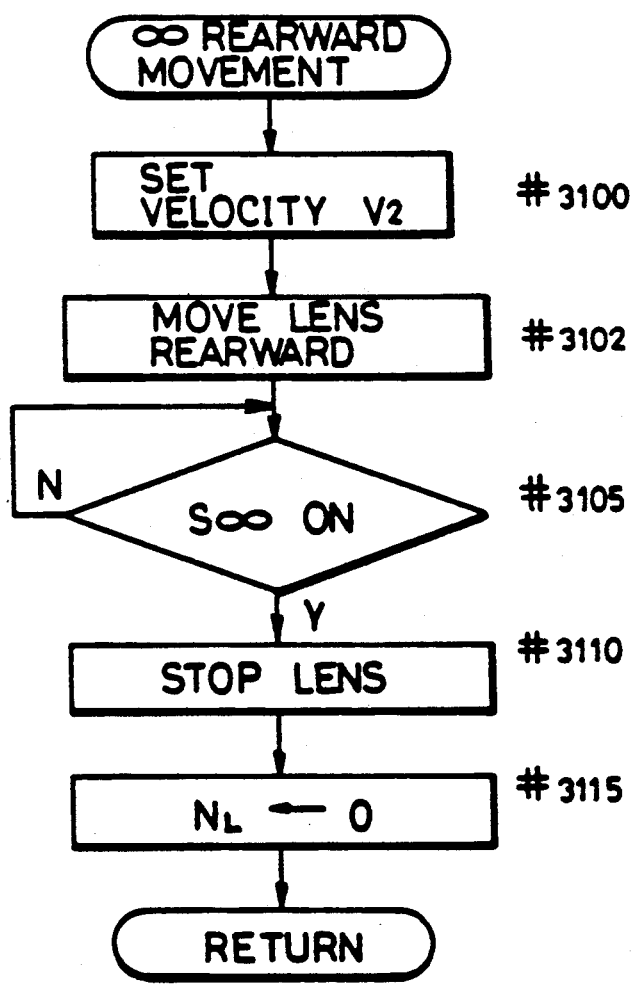

FIG. 20 is a flow chart showing the ∞ rearward movement subroutine. When this subroutine is called, the velocity of driving the lens is selected to be V2 in the step #3100 and the rearward movement of the lens is started in #3102 and whether the infinite focusing position detection switch S∞ is ON or not is checked in #3105. If the switch S∞ is not ON in #3105, the checking operation of #3105 is repeated until the switch S∞ is turned ON. When the lens is moved rearward to reach the infinite focusing position and the switch S∞ is turned ON in #3105, the rearward movement of the lens is stopped in #3110, the contents of the lens position counter $N_L$ is reset in #3115, and the flow returns to the step in which this subroutine was called.

A flow chart showing a subroutine of setting the lens initial position of the second embodiment is omitted, since it is the same as one of the first embodiment (FIG. 10).

Figure 15:
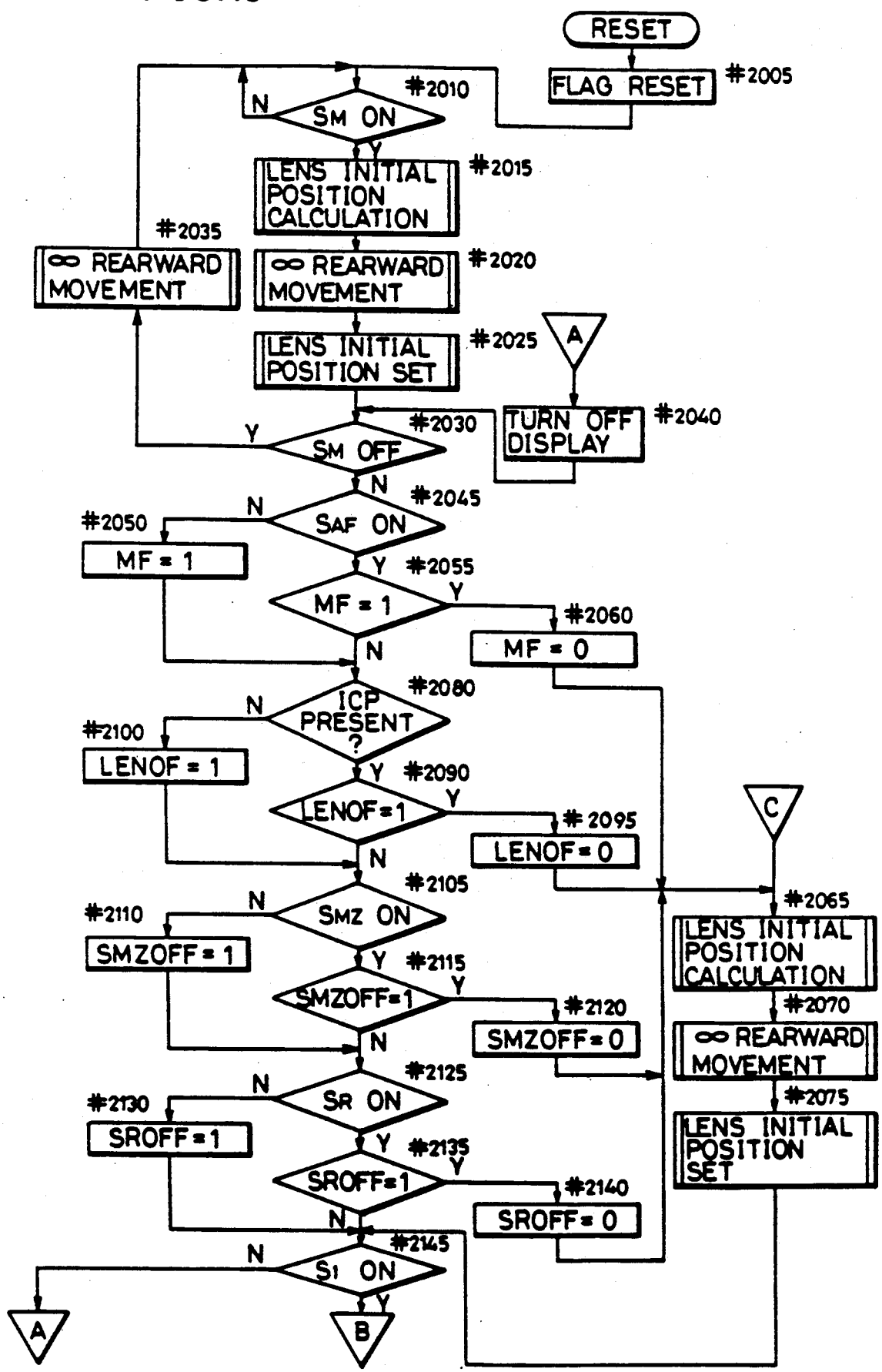
FIG. 15 to 20, 22 and 23 are flow charts showing the operation of the second embodiment.

Returning to the flow of FIG. 15, whether the AF mode switch $S_{AF}$ is ON or not is determined in #2045. If the AF mode switch $S_{AF}$ is not ON in #2045, then a flag MF indicating a manual focus mode is set at 1 in #2050, and the flow proceeds to #2080. If the AF mode switch $S_{AF}$ is ON in #2045; whether the flag MF is 1 or not is checked in #2055. If MF=1 in #2055, it means that the switch $S_{AF}$ is just turned ON, so that the flag MF is set at 0 in #2060, and the flow proceeds to #2065. In the steps #2065 to #2075, the subroutines of calculating the lens initial position, the ∞ rearward movement and of setting the lens initial position are carried out, and thereafter the flow proceeds to #2145. If MF is not 1 in #2055, it means that the switch $S_{AF}$ has been ON, so that the flow proceeds to #2080.

In the step #2080, presence of the lens attachment signal ICP is determined. If it is determined that the lens is not attached in #2080, then the flag LENOF indicating that the lens is not attached is set at 1 in #2100, and the flow proceeds to #2105. When it is determined that the lens is attached in #2080, then whether the flag LENOF is 1 or not is checked in #2090. If LENOF=1 in #2090, it means that the lens is just attached, so that the flag LENOF is set at 0 in #2095, the lens initial position is set in the steps #2065 to #2075 and the flow proceeds to #2145. When LENOF is not 1 in #2090, it means that the lens has been attached, and the flow proceeds to #2105.

In the step #2105, whether the macro zone switch $S_{MZ}$ is ON or not, namely, if the lens for zooming is in the macro zone or not is determined. If the macro zone switch $S_{MZ}$ is not ON in #2105, namely, if the lens for zooming is in the macro zone, then the flag SMZOFF indicating that the macro zone switch $S_{MZ}$ is OFF is set at 1 in #2110, and the flow proceeds to #2125. If the macro zone switch $S_{MZ}$ is ON in #2105, then whether the flag SMZOFF is 1 or not is checked in #2115. If SMZOFF=1 in #2115, it means that the macro zone switch $S_{MZ}$ is just turned ON, so that the flag SMZOFF is set at 0 in #2120, then the lens initial position is set in #2065 to #2075, and the flow proceeds #2145. If SMZOFF is not 1 in #2115, it means that the macro zone switch $S_{MZ}$ has been ON, and the flow proceeds to #2125.

In the step #2125, whether the reset switch $S_R$ is ON or not is determined. If the reset switch $S_R$ is not ON in #2125, a flag SROFF indicating that the reset switch $S_R$ is OFF is set at 1 in #2130 and the flow proceeds to #2145. If the reset switch $S_R$ is ON in #2125, then, whether the flag SROFF is 1 or not is checked in #2135. If SROFF=1 in #2135, it means that the reset switch $S_R$ is just turned ON, so that the flag SROFF is set at 0 in #2140, then the lens initial position is set in the steps #2065 to #2075, and the flow proceeds to #2145. If SROFF is not 1 in #2135, it means that the reset switch $S_R$ has been ON and the lens has already been set at the initial position, so that the setting of the lens initial position in the steps #2065 to #2075 is not carried out and the flow proceeds to #2145.

Figure 16:
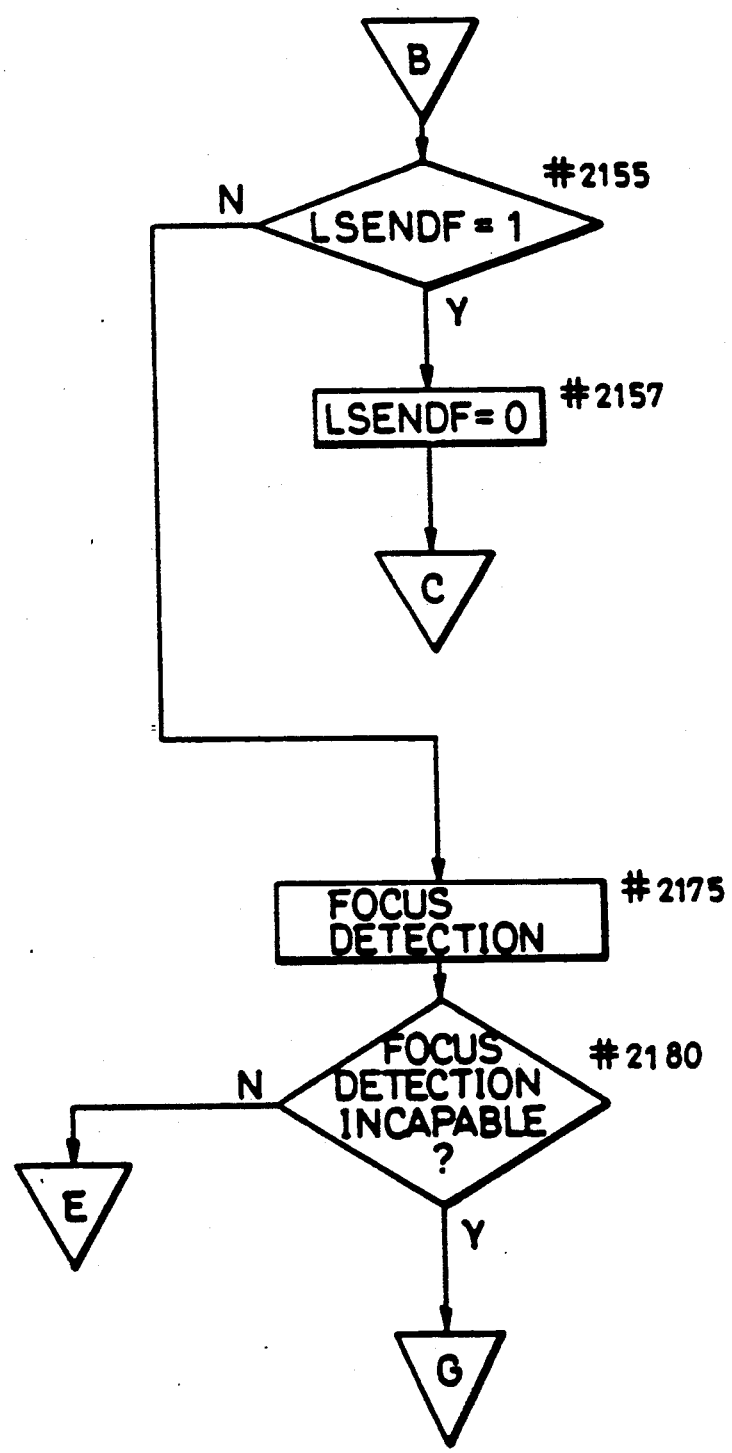

In the step #2145, whether the preparatory switch S1 is ON or not is determined. If the preparatory switch S1 is not ON, then, all displays are turned off in #2040 and the flow returns to #2030. Thereafter, the states of the main switch $S_M$, the AF mode switch $S_{AF}$, the lens attachment signal ICP, the macro zone switch $S_{MZ}$, the reset switch $S_R$ and the preparatory switch S1 are monitored through a loop circulating #2030, #2045, #2080, #2105, #2125 and #2145. If the main switch $S_M$ is turned OFF in this loop, then ∞ rearward movement #2035 is carried out as described above to standby until the main switch $S_M$ is again turned ON #2010. If any one of the switches $S_{AF}$, $S_{MZ}$ and $S_R$ is turned ON or if the lens is attached in the loop, the setting of the lens initial position is carried out (#2065 to #2075) at each time. In this manner, the camera is standing by the turning ON of the preparatory switch S1 and when the preparatory switch S1 is turned ON in #2145, the flow proceeds to #2155 (FIG. 16) to start focus detecting operation.

In the step #2155, whether the low contrast scan end flag LSENDF is 1 or not is checked. Since the LSENDF is 0 at first, the focus detecting operation is carried out in #2175 and the capability of the focus detection is checked in #2180. If the focus detecting operation is incapable in #2180, the low contrast scanning from the step #2190 (see FIG. 17) is carried out. First, in the step #2190, the amount of lens driving $\Delta N$ at scanning in the forward direction is calculated as $\Delta N = N_{max} - N_L - N_A$. This means that the velocity of the forward movement to the maximum forward position $N_{max}$ is not constant but is reduced at a position spaced from the maximum forward position $N_{max}$ by a prescribed distance $N_A$. Thereafter, whether the flag FOWF is 1 or not is determined in #2200 to check the direction of scanning. The flag FOWF indicates that the scanning is carried out in the forward direction.

When the low contrast scanning is carried out at the first time, the flag FOWF has been reset and therefore FOWF is not at 1. Therefore, the flow first proceeds to #2205 in which the FOWF is set at 1, and then the flow proceeds to #2208. In the step #2208, whether $\Delta N$ is a positive value or not is determined. If ΔN is not positive in #2208, it means that the lens is nearer to the maximum forward position $N_{max}$ than the distance $N_A$, so that the flow proceeds to the step #2236 to move the lens forward at a lower velocity V2 from the start.

Figure 18:
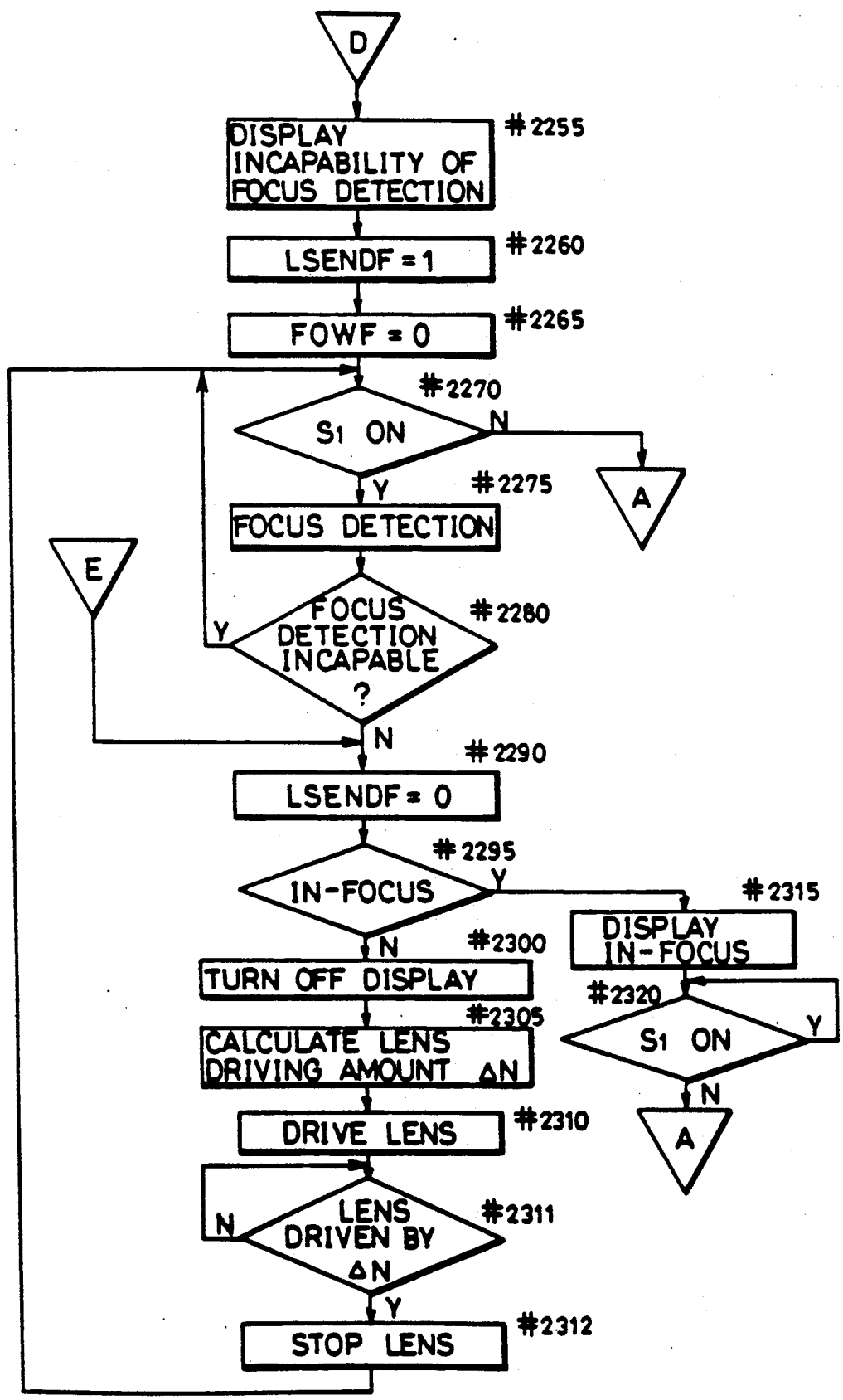

If it is determined that ΔN is a positive value in the step #2208, it means that the lens is out of the range of the prescribed distance $N_A$ from the maximum forward position $N_{max}$, so that the flow proceeds to the step #2218 where the maximum velocity V1 is selected as the lens driving velocity. The lens is driven in the forward direction based on the flag FOWF at the set velocity of V1 in the step #2220, focus detection is carried out with the lens being driven in the step #2225, and whether the focus detection is capable or not is checked in the step #2230. If it is determined that the focus detection is capable in the step #2230, the flag FOWF is reset in the step #2232, and the flow proceeds to the step #2290 (FIG. 18) to determine whether the lens is in in-focus position or not. If it is determined that the focus detection is incapable in the step #2230, whether the amount of lens driving reached ΔN or not is checked in the step #2235. If the lens driving amount has not yet reached ΔN in #2235, the flow returns to #2225 and determines the capability of the focus detection while driving the lens in the forward direction at the maximum velocity V1.

If it is determined that the lens driving amount has reached ΔN in #2235, the velocity V2 which is lower than the velocity V1 is selected in the step #2236, the lens is driven based on the flag FOWF at the velocity of V2 in the step #2238, the focus detection is carried out in #2240 and whether the focus detection is capable or not is determined in #2242. If it is determined that the focus detection was successful in the step #2242, the flag FOWF is reset in the step #2232, and the flow proceeds to the step #2290 (FIG. 18) to determine whether the lens is in in-focus position or not. If it is determined that the focus detection is incapable in #2242, whether the closest focusing position detecting switch $S_N$ or the infinite position detecting switch $S\infty$ is turned ON or not is checked in the steps #2244 and #2245. When neither the switch $S_N$ nor the switch $S\infty$ is turned ON, the flow returns to the step #2240 to carry out focus detection while driving the lens at the lower velocity V2.

When the lens is moved forward to reach the closest position, the closest position detecting switch $S_N$ is turned ON, so that the flow proceeds to #2246 from #2244 to stop the driving of the lens. Thereafter, whether the flag FOWF is 0 or not is determined in the step #250. If the flag FOWF=1 in #2250, it means that the lens position at which focus detection is possible could not be found by the scanning in the forward direction. Therefore, the flow returns to the step #2200 to carry out scanning in the rearward direction. If FOWF=1 in #2200, it means that the scanning in the forward direction has been done. Therefore, the amount of scanning in the rearward direction is calculated as ΔN=$N_A$−$N_L$ in the step #2210. This is to change the velocity of the rearward movement to the infinite focusing position, namely, to reduce the velocity at a position spaced from the infinite position by the prescribed distance $N_A$. In the step #2215, the flag FOWF is set at 0 to indicate that the scanning is in the rearward direction, and the flow proceeds to #2218. In the step #2218, the maximum velocity V1 is selected as the lens driving velocity. The lens is driven in the rearward direction based on the flag FOWF at the velocity of V1 in the step #2220, and the flow again proceeds to the step #2236 through the steps #2225 to #2235. In the step #2236, the velocity V2 which is lower than the velocity V1 is selected, and the driving of the lens is continued based on the flag FOWF at the lower speed.

When the lens is moved rearward to reach the infinite focusing position, the infinite focusing position detecting switch $S\infty$ is turned ON, so that the flow proceeds from the step #2245 to #2246 to stop the driving of the lens, and then whether the flag FOWF is 0 or not is determined in the step #2250. At this time, since the flag FOWF=0, the flow does not return to #2200 but proceeds to #2255 (FIG. 18). Namely, the fact that FOWF is not 1 in #2250 means that the lens position at which the focus detection is possible could not be found out neither by the scanning in the forward direction nor by the scanning in the rearward direction. Therefore, the flow proceeds to #2255 to indicate the incapability of focus detection.

If the focus detection becomes possible in #2230 during the scanning in the rearward direction, then the flag FOWF is reset in #2233 and the flow proceeds to #2290 (FIG. 18) to determine whether the lens is in in-focus position or not.

After the incapability of the focus detection is displayed in #2255 (FIG. 18), the low contrast scanning end flag LSENDF is set at 1 in #2260. This flag indicates that the lens position at which the focus direction is possible could not be found by the low contrast scanning. Thereafter, the flag FOWF indicating the scanning direction is set at 0, in #2265 and whether the preparatory switch S1 is ON or not is determined in #2270. If the preparatory switch S1 is not ON in #2270, then all displays are turned off in #2040 and the flow returns to #2030. If the preparatory switch S1 is ON in #2270, then the focus detection is carried out in #2275, and whether the focus detection is capable or not is determined in #2280. If it is determined that the focus detection is incapable in #2280, the flow returns to #2270. If the focus detection is capable in #2280, the low contrast scanning end flag LSENDF is set at 0 in #2290, and whether the lens is in in-focus position or not is determined in #2295. If it is determined that the lens is out-of-focus position in #2295, then the flow proceeds to #2300 to turn off the in-focus display and the focus detection incapable display, the lens driving amount ΔN=DF×K is calculated based on the defocus amount DF in #2305, and the driving of the lens is started in #2310. In #2311, whether the lens driving amount reached ΔN or not is determined. If the lens driving amount has not yet reached N in #2311, then the checking operation of #2311 is repeated until the lens driving amount reaches ΔN When the lens driving amount reached N in #2311, the driving of the lens is stopped in #2312 and the flow returns to #2270.

If the preparatory switch S1 is ON in #2270, the focus detection is carried out in #2275, the flow proceeds to #2280 and #2290, and whether the lens is in in-focus position or not is again determined in #2295. Since the lens is being driven toward the in focus position in the above described steps #2305 and #2310, there is a high possibility that the lens is brought into in-focus position. If it is determined that the lens is brought into in-focus position in #2295, then the in-focus display is carried out in #2315, and whether the preparatory switch S1 is ON or not is determined in #2320. If the preparatory switch S1 is ON in #2320, then the determining operation of #2320 is repeated until the preparatory switch S1 is turned off, namely, the camera enters the focus-lock state.

Figure 21:
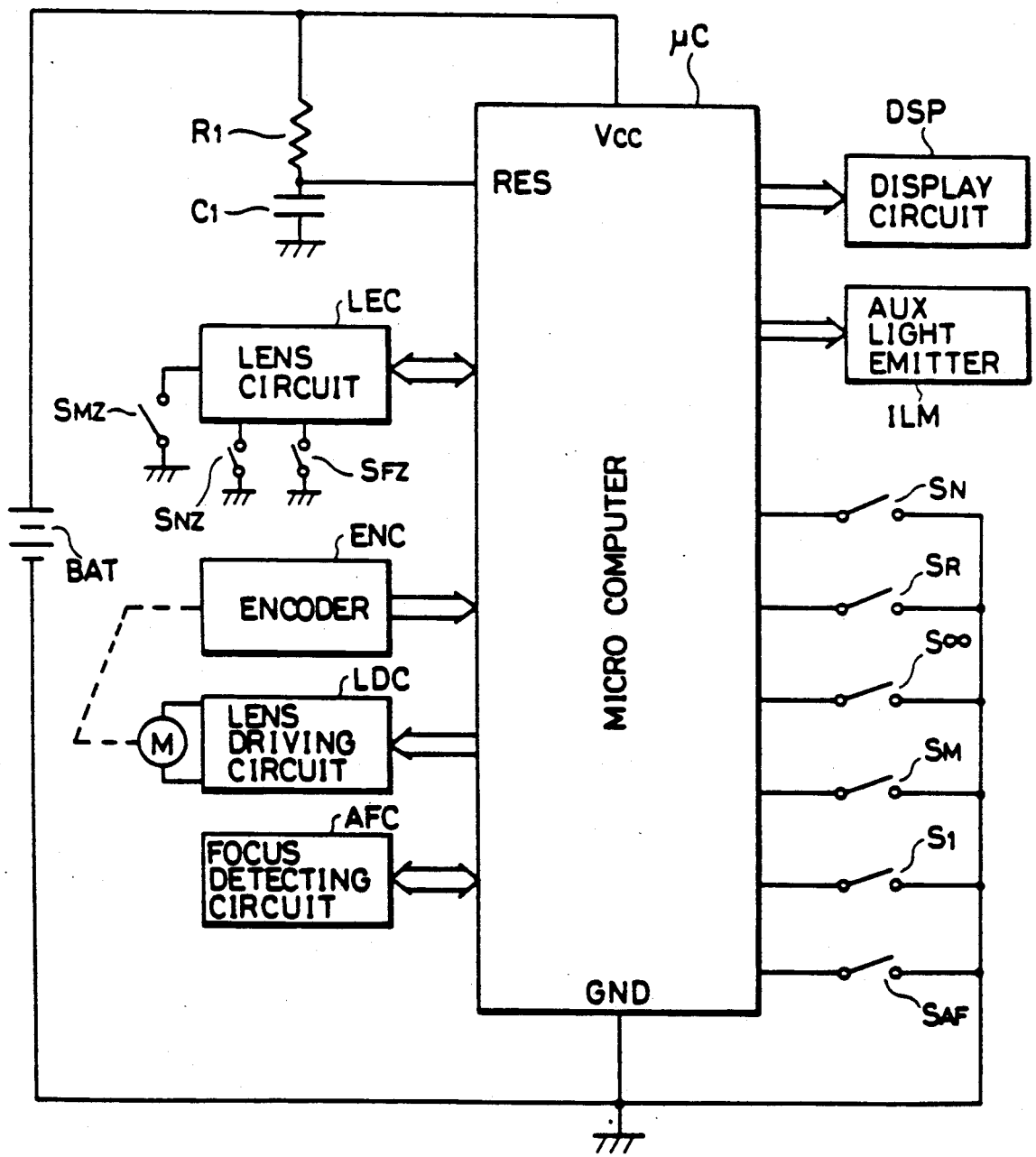
FIG. 21 is a block circuit diagram showing a modification of the second embodiment of the present invention.
Figure 22:
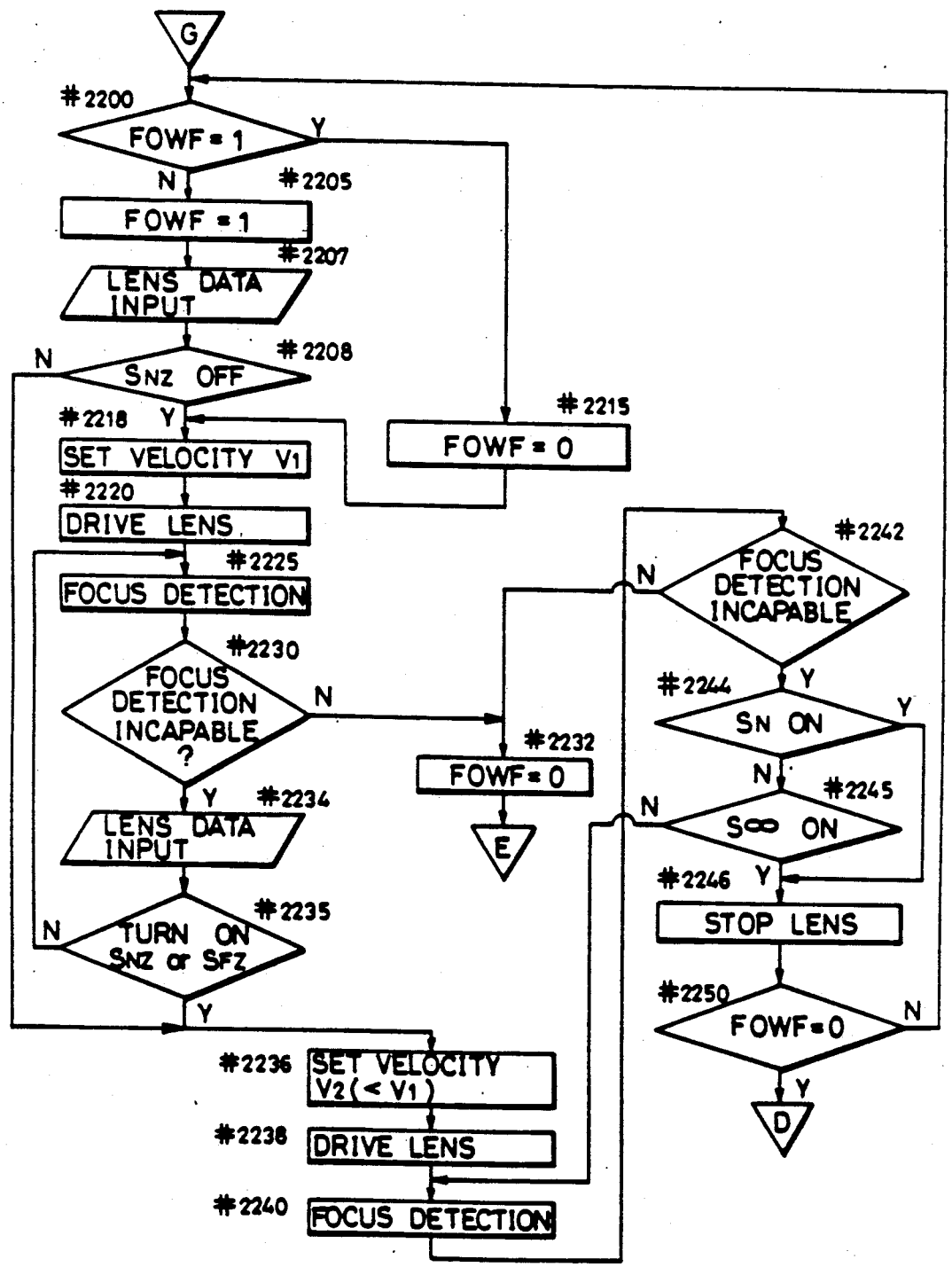
Figure 23:
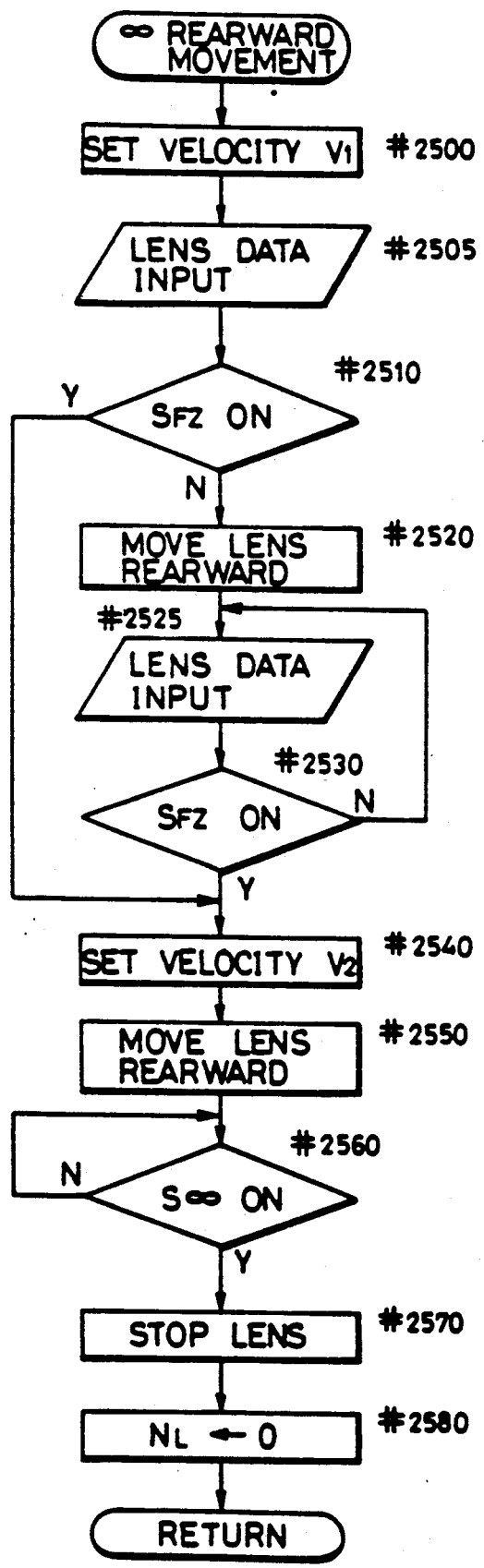

FIGS. 21 to 23 show one modification of the above described second embodiment. As shown in FIG. 21, the lens circuit LEC comprises a far distant zone detecting switch $S_{FZ}$ and a near zone detecting switch $S_{NZ}$. The far distant zone detecting switch $S_{FZ}$ is turned ON when the lens is in the far distant zone near the infinite focusing position. The switch is turned OFF when the switch is out of that zone. The near zone detecting switch $S_{NZ}$ is turned ON when the lens is in the near zone near the closest focusing position. The switch is turned OFF when the lens is out of that zone. The lens circuit LEC outputs signals indicating the states (ON/-OFF) of the respective switches $S_{FZ}$ and $S_{NZ}$ to the microcomputer $\mu$C. The provision of these switches enables the velocity control in the low contrast scanning as will be described in the following. In that case, the lens position counter $N_L$ can be dispensed with.

Figure 17:
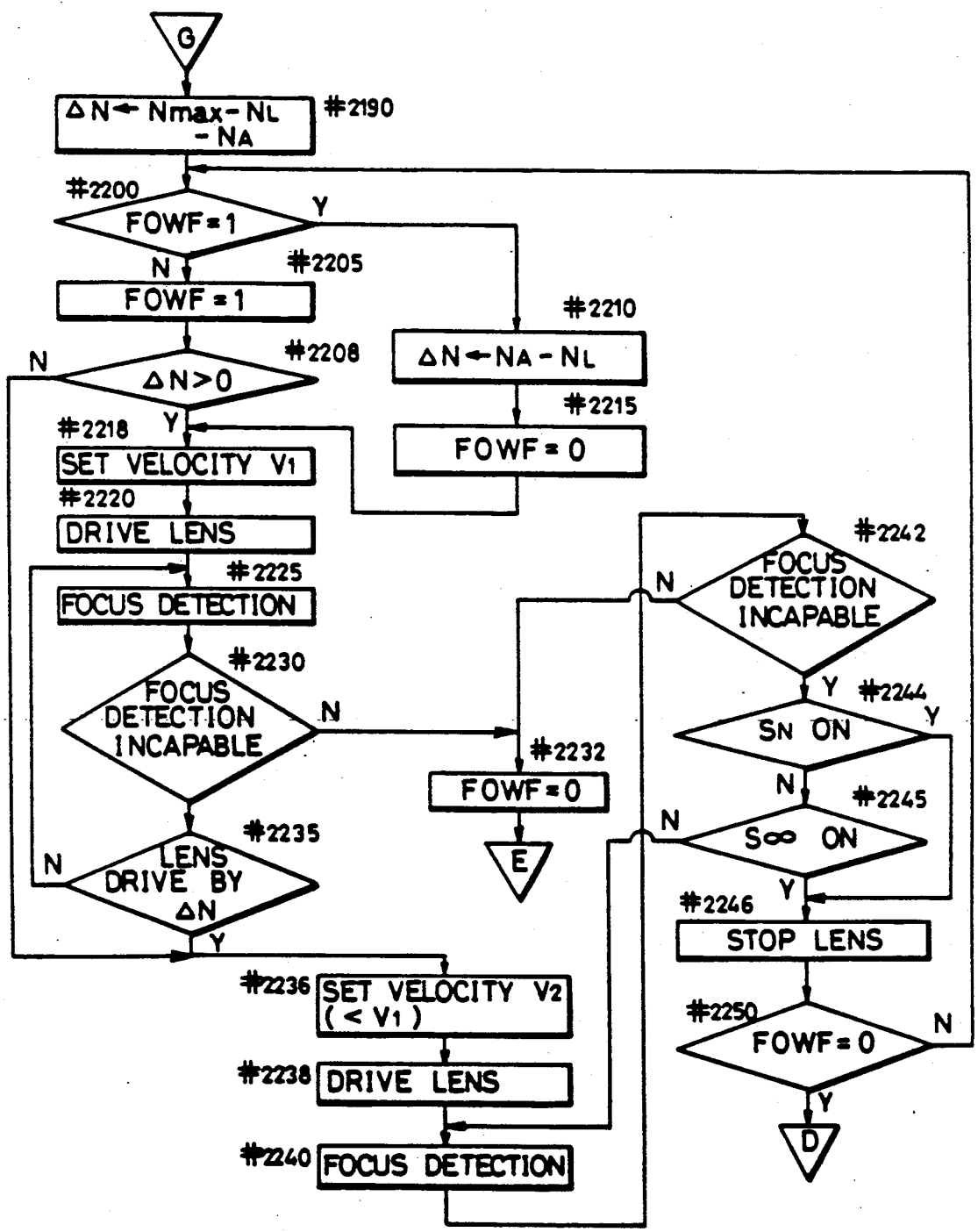

FIG. 22 shows one modification of the program of the low contrast scanning which is employed instead of the program shown in FIG. 17. Since there is no need of calculating the lens driving amount $\Delta N$ at the velocity of V1, the steps #2190 and #2210 shown in FIG. 17 are omitted. Steps #2207, 2208, 2234 and 2235 are added in order to detect that the lens is at a position nearer to the extreme end position. In the steps #2207 and #2234, the lens data are inputted for the detection, and the states (ON/OFF) of the zone detecting switches $S_{FZ}$ and $S_{NZ}$ are checked in the steps #2208 and #2235.

First, in the step #2207, the lens data are inputted to determine the state of the switch $S_{NZ}$, and whether the near zone detecting switch $S_{NZ}$ is OFF or not is checked in the step #2208. If it is determined that the switch $S_{NZ}$ is ON in the step #2208, it means that the lens is stopped near the closest focusing position at the start of the low contrast scanning. Therefore, the flow proceeds to the step #2236 where that lens driving velocity is set at a lower velocity V2, and the lens is gradually moved forward to the closest focusing position. If the switch $S_{NZ}$ is OFF in #2208, the flow proceeds to the step #2218 where the lens driving velocity is set at a higher velocity V1, and the lens is moved forward to the closest focusing position at a higher velocity. Thereafter, in the step #2234, the lens data inputted to determine the states of the switches $S_{NZ}$ and $S_{FZ}$. Whether the switch $S_{NZ}$ is turned ON or not is checked in #2235. If the switch $S_{NZ}$ is OFF #2235, the determination of the step #2235 is continued while moving forward the lens at the velocity of V1. When the switch $S_{NZ}$ is turned ON in the step #2235, the flow proceeds to the step #2236 where the lens driving velocity is set at the lower velocity V2 and the lens is gradually moved forward to the closest focusing position.

The velocity control in the rearward direction is carried out based on the same idea. Namely, the lens is moved rearward at the higher speed V1 until the far distant zone detecting switch $S_{FZ}$ is turned ON. After the far distant zone detecting switch $S_{FZ}$ is turned ON in the step #2235, the flow proceeds to the step #2236 where the lens driving velocity is set at the lower velocity V2 and the lens is gradually moved rearward to the infinite focusing position.

Now, in the program for the $\infty$ rearward movement shown in FIG. 20, the velocity of driving the lens is selected to be the lower velocity V2 in the step #3100 in order to soften the shock when the lens hits a movement restriction mechanism (not shown) provided at the infinite focusing position. At that time, however, the velocity of the rearward movement becomes lower. Meanwhile, when the driving velocity is selected to be the higher velocity V1 in the step #3100, the rearward movement can be carried out at the higher velocity. However, the shock cannot be soften.

In view of the foregoing, the velocity control in the rearward movement by means of the far distant zone detecting switch $S_{FZ}$ has been proposed. FIG. 23 is a program for the velocity control in the $\infty$ rearward movement, which is employed instead of the program shown in FIG. 20. If this subroutine is called, the lens driving velocity is selected to be the higher velocity V1, the lens data are inputted to determine the state of the switch $S_{FZ}$ in the step #2505, and whether the far distant zone detecting switch $S_{FZ}$ is ON or not is checked in the step #2510. If the switch $S_{FZ}$ is ON in #2510, the flow proceeds to the step #2540, where the lens driving velocity is selected to be the lower velocity V2, and the rearward movement of the lens is started in the step #2550. If the switch $S_{FZ}$ is OFF in #2510, the rearward movement of the lens is started in the step #2520 with the lens driving velocity being set at V1, the lens data are inputted to determine the state of the switch $S_{FZ}$ in the step #2525, and whether the switch $S_{FZ}$ is turned ON or not is checked in the step #2530. If the switch $S_{FZ}$ is not ON in #2530, the input of the lens data of the step #2525 and the checking of the step #2530 are repeated while moving the lens rearward at the velocity V1. When the switch $S_{FZ}$ is turned ON in the step #2530, the flow proceeds to #2540 where the lens driving velocity is set at the lower velocity V2, and the rearward movement of the lens is continued in the step #2550. Thereafter the switch $S\infty$ is turned ON or not is determined in the step #3560. If the switch $S\infty$ is OFF in #2560, the determination of the step #2560 is repeated while moving the lens rearward at the lower velocity V2. If the switch $S\infty$ is turned ON in #2560, the flow proceeds to the step #2570 to stop the driving of the lens, the lens position counter $N_L$ is reset in the step #2580, and the flow returns to the step in which the subroutine was called.

(3) Third Embodiment

The focus adjustment operation of the camera according to the third embodiment of the present invention will be described in the following with reference to flow charts. A block diagram showing a focus detecting circuit structure of the camera of the third embodiment is the same a FIG. 1. In response to the power-on-reset by mounting a battery, the microcomputer $\mu$C executes the program following the step #4001 shown in FIG. 24. First, all flags are reset in #4001. However, a lens non-attachment flag LENOF, which will be described later, is set at 1. The lens data are inputted from the lens circuit LEC at the step #4002. A lens attachment signal ICP, the macro zone signal SMZ, a macro lens attachment signal LCPR indicating that a macro lens having a magnification larger than 1, i.e., enabling life-size shot, is attached, the maximum amount of forward movement $N_{max}$, the full aperture value $AV_0$, information of the focal length ZFZ, the conversion coefficient K, AF enabling signal AFE, an AF coupler signal AFCP and so on are inputted to the microcomputer $\mu$C. The information ZFZ of the focal length is the logarithmic conversion of the focal length fmm of the lens, which is represented by the following equation in the present embodiment.

$$ZFZ = 8 \times \{2 \log_2 (f/6.25) + 1\} \quad (3)$$

The AF enable signal AFE indicates that the interchangeable lens mounted is capable of focus detection. The AF coupler signal AFCP means that a lens driving power transmitting mechanism (AF coupler) for automatic focus adjustment is attached to the interchangeable lens.

Figure 25:
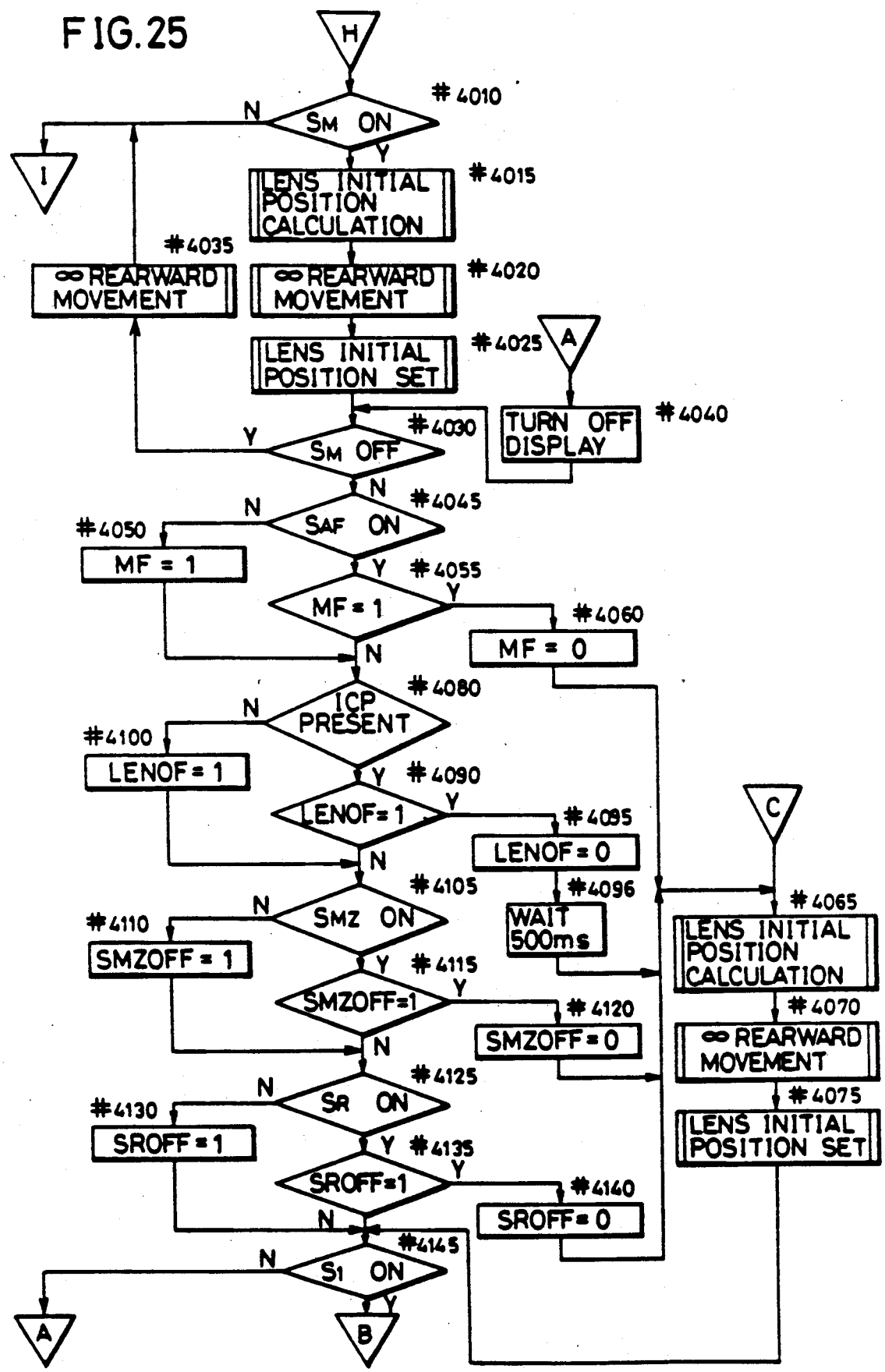
Figure 26:
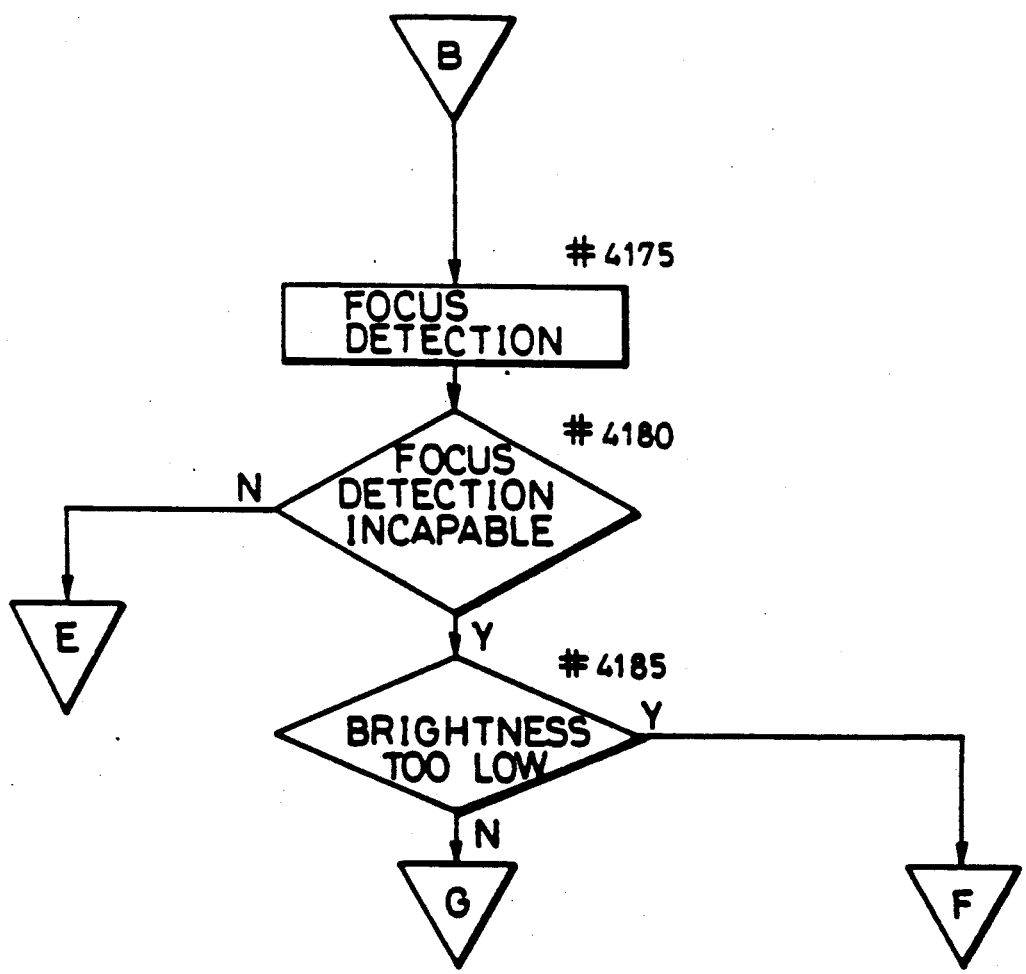

In the step #4003, whether there is the lens attachment signal ICP or not is determined. If the lens is attached, the lens attachment signal ICP is supplied from the lens circuit LEC to the microcomputer μC. If the lens is not attached, the said lens attachment signal ICP is not supplied, so that the microcomputer μC determines whether the lens is attached or not by checking the presence/absence of the lens attachment signal ICP. If there is not the lens attachment signal in #4003, it is determined that the lens is not attached. In #4008, the lens non-attachment flag LENOF is set at 1 and the flow proceeds to the step #4010 (FIG. 25). If there is the lens t signal in #4003, it is determined that the lens is attached, and whether the flag LENOF is 1 or not is determined in #4004. If LENOF=1 in #4004, it is determined that the lens has just attached, so that the lens non-attachment flag LENOF is set at 0 in #4005 and the flow proceeds to #4006. In #4006, the flow stops for a time period of 500 msec, and the ∞ rearward movement subroutine (FIG. 31) is carried out in #4007. Whether the main switch $S_M$ is ON or not is checked in #4010. If the main switch $S_M$ is not ON in #4010, the flow returns to #4002 to determine the presence/absence of the lens attachment signal. Therefore, when the battery is attached and the process is started from the step #4001 and when the lens is attached in the loop from #4002 to #4010, the ∞ rearward movement subroutine is carried out after a time period of 500 msec.

The time period 500 msec is provided from the following reason. Normally, when the battery is attached or the lens is attached, the lens is, in the most case, held in the hand of the user. Therefore, if the rearward movement of the lens is started immediately after the attachment of the battery or the lens, the driving system may be overloaded so that the rearward movement of the lens is stopped, and the driving system of the lens or the camera may be damaged. It is also possible that the user surprised by the movement of the lens and might drop the camera. The time period of 500 msec is provided to prevent these disadvantages, whereby the rearward movement of the lens is started about the time when the lens is left from the hand of the user.

Figure 24:
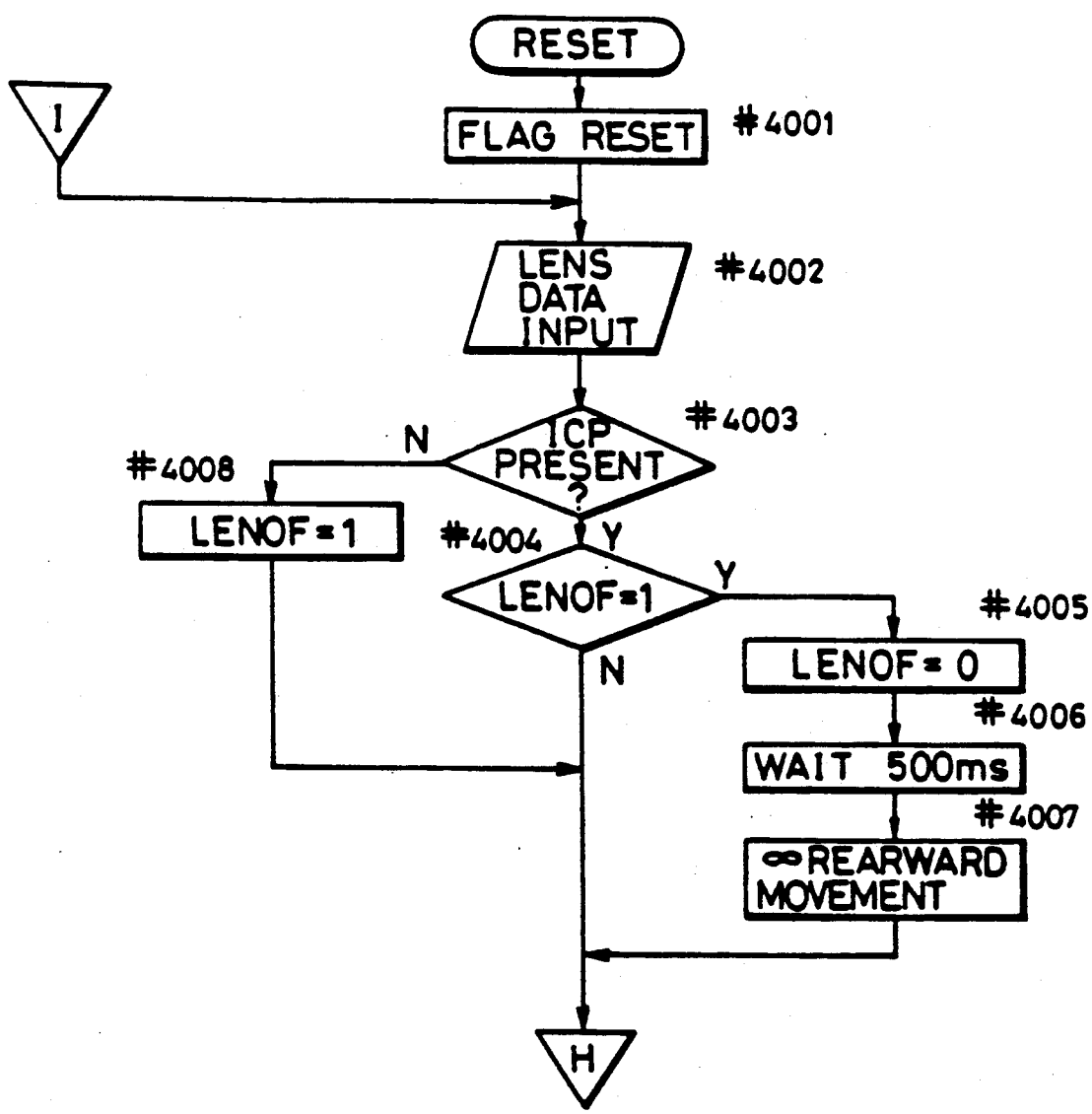
FIG. 24 to 32, 33A, 33B, and 34 are flow charts showing the operation of the third embodiment.

Thereafter, when the main switch $S_M$ is ON in #4010, the subroutine for calculating the lens initial position (FIG. 30) is executed in #4015, the ∞ rearward movement subroutine (FIG. 31) is carried out in #4020, the subroutine for setting the lens initial position (FIG. 32) is carried out in #4025 and whether the main switch $S_M$ is OFF or not is determined in #4030. If the main switch $S_M$ is OFF, then the ∞ rearward movement subroutine is carried out in #4035 and the flow returns to #4002 (FIG. 24). If the main switch $S_M$ is not OFF in #4030, the flow proceeds to #4045.

Figure 30:
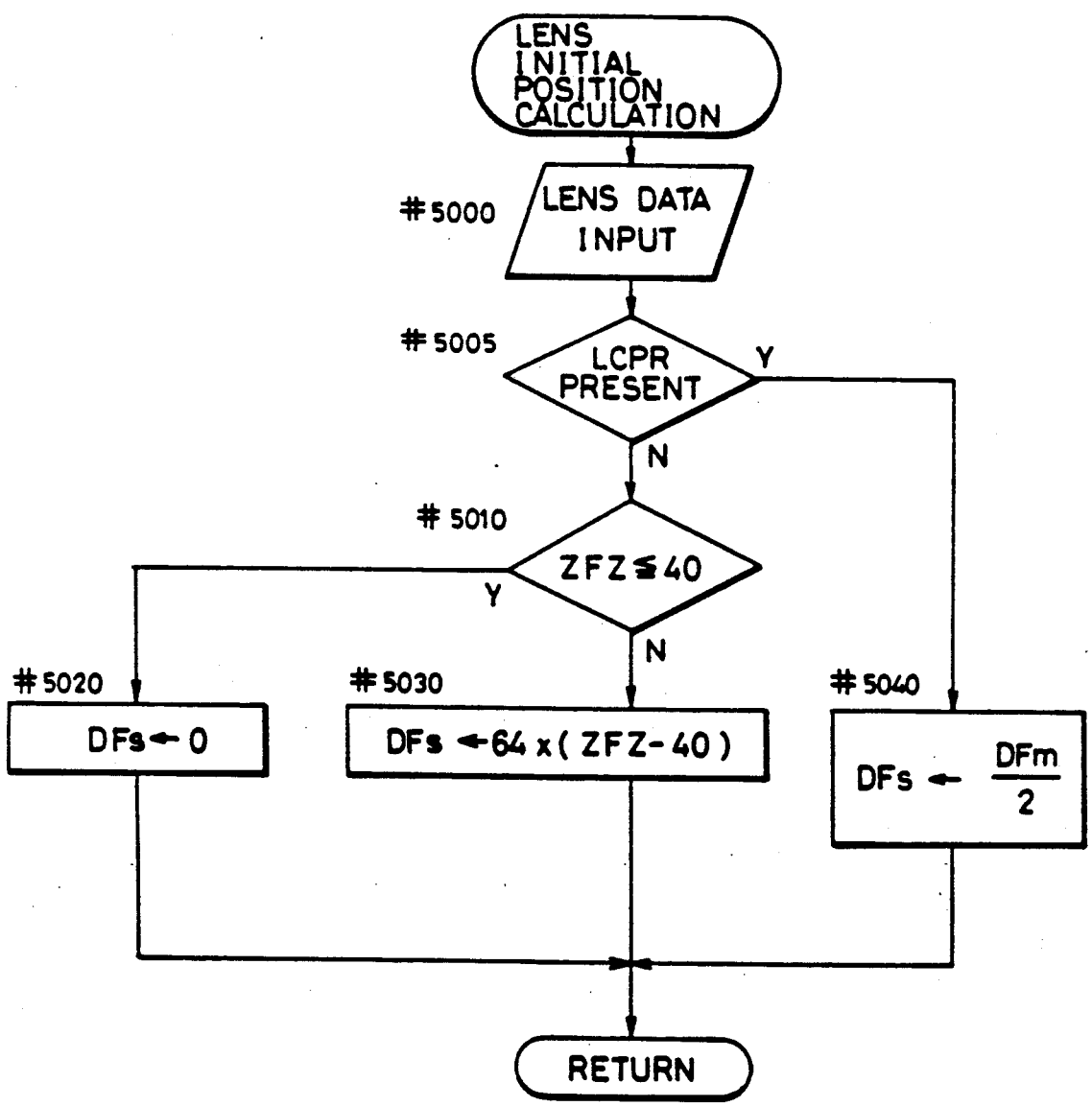

FIG. 30 is a flow chart showing the contents of the subroutine for calculating the lens initial position. When this subroutine is called, lens data are inputted from the lens circuit LEC in #5000. In the step #5005, whether the macro lens attachment signal LCPR is present or not is checked. If the macro lens for the magnification larger than 1 is attached in #5005, the defocus amount $DF_s$ for setting the lens initial position is set at $DF_m/2$, and the flow returns to the step where this subroutine was called. Now, $DF_m$ represents the maximum defocus amount covering the range from the closest focusing position to the infinite focusing position of the lens. If the macro lens for the magnification larger than 1 is not attached in #5005, the defocus amount $DF_s$ is determined in the steps #5010 to #5030. In the step #5010, whether the information ZFZ of the focal length is no more than 40 or not is determined. If ZFZ≦40, then $DF_s$ is set at 0 in #5020 and the flow returns to the main flow. If ZFZ>40 in #5010, the defocus amount $DF_s$ corresponding to the lens initial position $N_S$ is calculated based on the information ZFZ of the focal length in the step #5030, and the flow returns to the main flow.

The meaning of the algorithm for determining the lens initial position shown in the steps #5010 to #5030 will be described in the following. In this algorithm, the defocus amount $DF_s$ μm from the infinite focusing position to the lens initial position $N_s$ is calculated by using the equation $$DF_s = 64 \times (ZFZ - 40) \quad (4)$$

(where ZFZ > 40)

in which it is represented as a linear function of the information ZFZ of the focal length. FIG. 35 shows the calculation of the defocus amount $DF_s$ at the lens initial position $N_s$ for the focal length f of 24 mm to 800 mm by using the above described equation (4) and the calculation of the magnification $\beta = DF_s/f$. As is apparent from FIG. 35, the above described equation (4) determines that the defocus amount $DF_s$ such that the frequently used magnification rate $\beta$(1/80 to 1/40) can be provided for the lens having the frequently used focal length f (35 mm to 300 mm). If the focal length f is treated by the unit of millimeters in the camera body, then the defocus amount $DF_s$ can be simply calculated as $DF_s = \beta \times f \times 1,000$ [μm]. However, actually the focal length f is treated as the information ZFZ logarithmically compressed in accordance with the above described equation (3) in the camera body. Therefore, it is difficult to calculate the defocus amount $DF_s$ μm as the linear function of the information ZFZ of the focal length to satisfy the condition of $1/80 \leq \beta \leq 1/40$. The magnification rate $\beta(f)$ calculated in accordance with the above described equation (4) is $\beta(f) \propto \{\ln(f) - \ln(6.25 \times 4)\}/f$. The largest value calculated based on the condition $d\beta/df = 0$ is $(1/\beta) = 46$, when f=68 mm. $(1/\beta) = 80.5$ when f=33 mm, and $(1/\beta) = 81.7$ when f = 300 mm.

In addition, since the coefficient of multiplication in the above equation (4) is $64 = 2^6$, the defocus amount $DF_s$ at the lens initial position $N_s$ can be calculated by subtracting the constant 40 from the information ZFZ of the focal length and by shifting in the left for six times. Therefore, the defocus amount $DF_s$ at the lens initial position $N_s$ can be easily calculated based on the information ZFZ of the focal length provided from the lens circuit LEC, whereby the time required for the calculation can be reduced and the storage capacity of the program for the calculation can be reduced. Additionally, compared with a method in which the defocus amounts $DF_s$ at the lens initial positions $N_s$ for various focal length f are previously stored, the storage capacity of a ROM can be reduced.

In the Table 1, the maximum defocus amount $DF_m$ of a wide angle lens whose focal length f is smaller than 35 mm is small, so that the focus detection is possible regardless of the lens position. Therefore, the lens may be stopped at the infinite focusing position to obtain the frequently used magnification rate $1/\infty$. In other words, in this embodiment, $DF_s$ is selected to be 0 when $f \leq 24$ mm (ZFZ $\leq 40$). Now, as for the lenses having the frequently used focal length (35 to 300 mm), the magnification rates normally used range from 1/40 to 1/60. The range of magnification rate enabling focus detection is a little wider. Therefore, the possibility of focus detection will be high if the initial stopping position of the lens is determined to provide the magnification ranging from 1/40 to 1/80. Therefore, in the present embodiment, the defocus amount $DF_s$ of the lens initial position $N_s$ which satisfies the condition $1/80 \leq \beta \leq 1/40$ is calculated by using the said equation (4) when $f > 24$ mm (ZFZ $> 40$).

Figure 31:
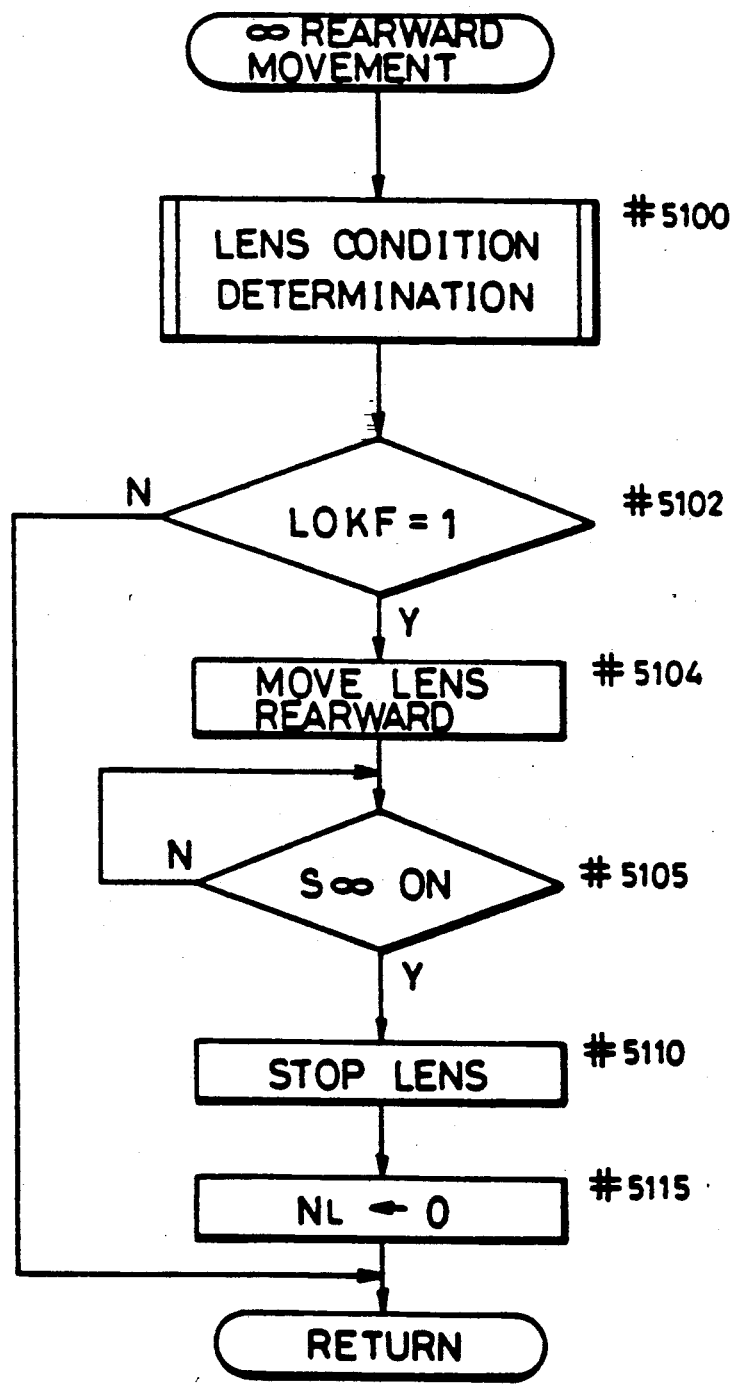

FIG. 31 is a flow chart showing the details of the $\infty$ rearward movement subroutine. When this subroutine is called, the lens condition determining subroutine is carried out in #5100. The subroutine for determining the lens condition will be described with reference to FIGS. 33A and 33B.

Figure 33A:
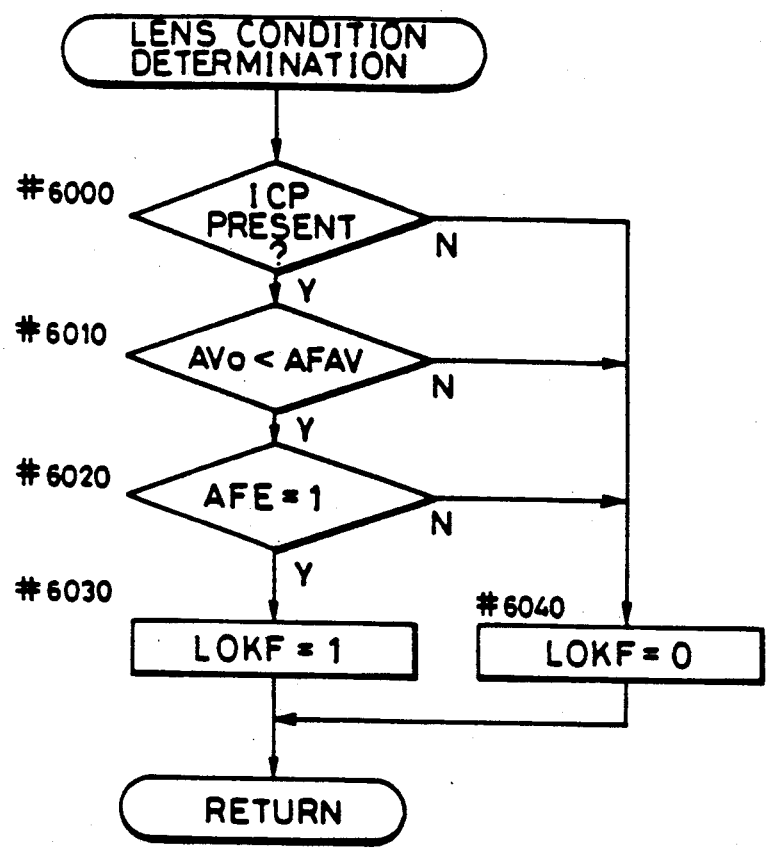

First, in FIG. 33A, presence of the lens attachment signal ICP is determined in #6000. If there is the lens attachment signal in #6000, whether the full aperture value $AV_0$ of the lens is smaller than a prescribed value AFAV or not is determined in the step #6010. Now, the prescribed value AFAV is the size represented as an aperture value of an AF pupil through which the flux for the focus detection passes. If the full aperture value $AV_0$ is smaller than the prescribed value AFAV, there is no possibility of the flux passing through the AF pupil for focus detection being eclipsed by the lens. If $AV_0 > AFAV$ in #6010, presence of an AF enable signal AFE is determined in #6020. If there is the AF enable signal AFE in #6020, it is determined that the lens capable of focus detection is attached, so that the lens condition flag LOKF is set at 1 in #6030 and the flow returns to the main flow. If there is not the attachment signal in #6000, the rearward movement of the lens is impossible. Therefore, the lens condition flag LOKF is set at 0 in #6040 and the flow returns to the main flow. If $AV_0 \geq AFAV$ in #6010, the flux for focus detection passing through the AF pupil is eclipsed by the lens, preventing proper focus detection, so that the lens condition flag LOKF is set at 0 in #6040 and the flow returns to the main flow. If there is not the AF enable signal AF in #6020, it is determined that the lens incapable of focus detection such as a catadioptric telephoto lens or a shift lens capable of shifting an optical axis is attached, so that the lens condition flag LOKF is set at 0 in #6040 and the flow returns to the main flow.

Figure 33B:
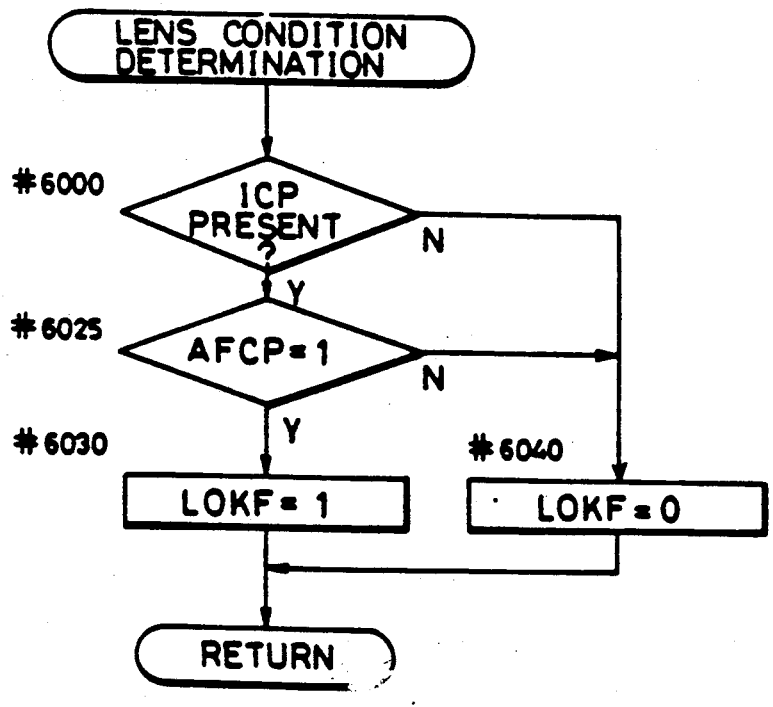

FIG. 33B shows another example of the lens condition determination. In #6000, whether there is the ICP attachment signal or not is determined, and if there is the ICP attachment signal, whether there is the AF coupler signal AFCP or not is determined in #6025. If there is the AF coupler signal AFCP in #6025, then it is determined that a lens having the AF coupler, that is, a lens capable of focusing driving by means of the motor in the camera body is attached, so that the lens condition flag LOKF is set at 1 in #6030 and the flow returns to the main flow. If there is not the AF coupler signal AFCP in #6025, it is determined that a lens without AF coupler is attached, so that the lens condition flag LOKF is set at 0 in #6040 and the flow returns to the main flow.

If the lens conditions such as shown in FIG. 33A or 33B are satisfied, the lens condition flag LOKF is set at 1, and otherwise the lens condition flag LOKF is set at 0. Returning to the flow of FIG. 31, the state of the lens condition flag LOKF is checked in #5102. If LOKF=0 in #5102, the flow skips the steps #5104 to #5115 to return to the main flow. If the LOKF=1 in #5102, then the rearward movement of the lens is started #5104. After the driving of the lens is started in #5104, whether the infinite position detecting switch $S\infty$ is ON or not is determined in #5105. If the switch $S\infty$ is not ON in #5105, the checking operation of #5105 is repeated until the switch $S\infty$ is turned ON. When the lens is moved rearward to reach the infinite focusing position and the switch $S\infty$ is turned ON in #5105, the rearward movement of the lens is stopped in #5110, the contents of the lens position counter $N_L$ is reset in #5115, and the flow returns to the step in which this subroutine was called.

Figure 32:
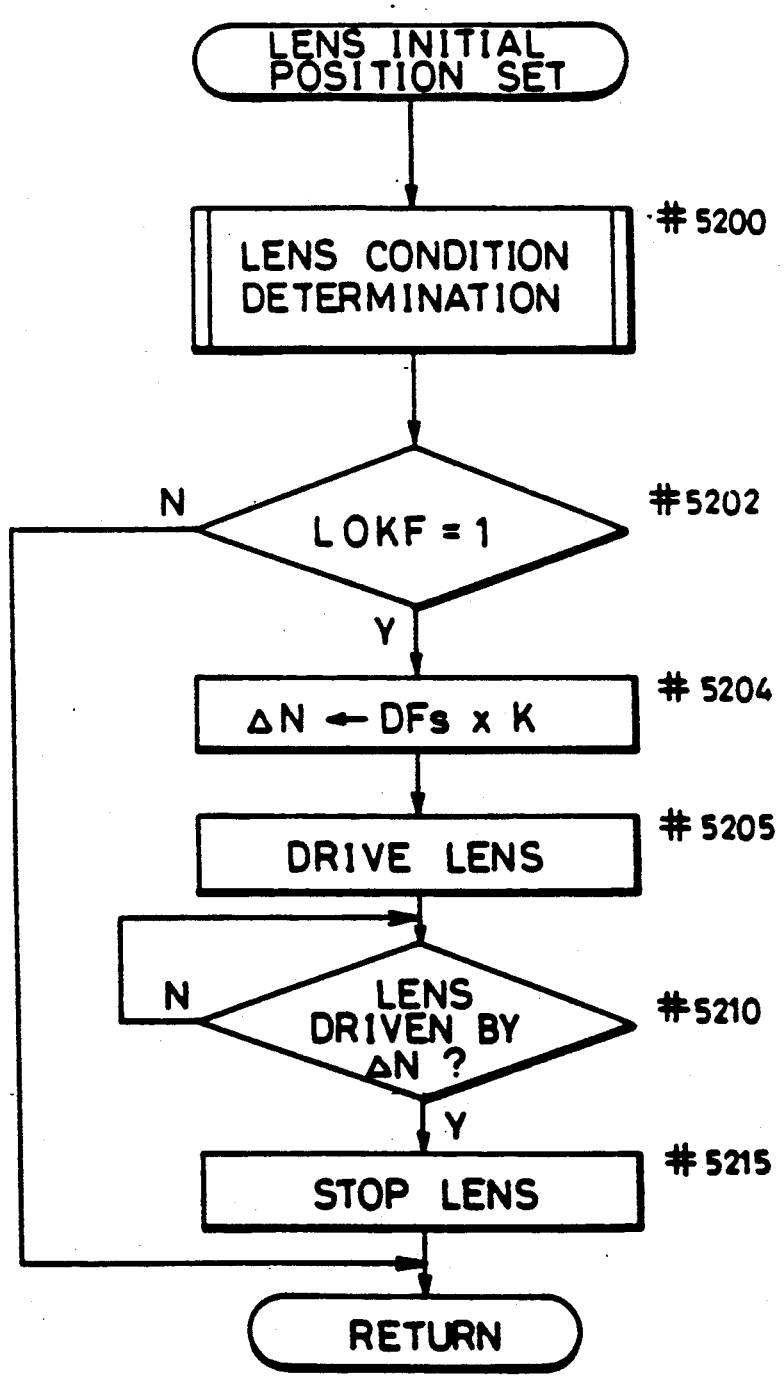

FIG. 32 is a flow chart showing a subroutine of setting the lens initial position. When this subroutine is called, the subroutine for determining lens condition is carried out in #5200, and the lens condition flag LOKF is checked in #5202. If LOKF=0 in #5202, the flow skips the steps #5204 to #5215 and returns to the main flow. If LOKF=1 in #5202, the amount of driving lens $N=DF_s \times K$ from the infinite focusing position is calculated by multiplying the defocus amount $DF_s$ for setting the lens initial position by the coefficient K in #5204, and the forward movement of the lens is started in #5205. Whether the lens driving amount has reached $\Delta N$ or not is checked in #5210. If the lens driving amount has not yet reached $\Delta N$ in #5210, the checking operation of #5210 is repeated until the lens driving amount reaches $\Delta N$. If the lens driving amount reaches $\Delta N$ in #5210, the driving of the lens is stopped in #5215, and the flow returns to the step where this subroutine was called.

Returning to the flow of FIG. 25, whether the AF mode switch $S_{AF}$ is ON or not is determined in #4045. If the AF mode switch $S_{AF}$ is not ON in #4045, then a flag MF indicating a manual focus mode is set at 1 in #4050, and the flow proceeds to #4080. If the AF mode switch $S_{AF}$ is ON in #4045, whether the flag MF is 1 or not is checked in #4055. If MF=1 in #4055, it means that the switch $S_{AF}$ is just turned ON, so that the flag MF is set at 0 in #4060, and the flow proceeds to #4065. In the steps #4065 to #4075, the subroutines of calculating the lens initial position, the $\infty$ rearward movement and of setting the lens initial position are carried out, and thereafter the flow proceeds to #4145. If MF is not 1 in #4055, it means that the switch $S_{AF}$ has been ON, so that the flow proceeds to #4080.

In the step #4080, presence of the lens attachment signal ICP is determined. If it is determined that the lens is not attached in #4080, then the flag LENOF indicating that the lens is not attached is set at 1 in #4100, and the flow proceeds to #4105. When it is determined that the lens is attached in #4080, then whether the flag LENOF is 1 or not is checked in #4090. If LENOF=1 in #4090, it means that the lens is just attached, so that the flag LENOF is set at 0 in #4095, the flow stops for the time period of 500 msec in #4096 and the lens initial position is set in the steps #4065 to #4075 and the flow proceeds to #4145. When LENOF is not 1 in #4090, it means that the lens has been attached, and the flow proceeds to #4105.

In the step #4105, whether the macro zone switch $S_{MZ}$ is ON or not, namely, if the lens for zooming is in the macro zone or not is determined. If the macro zone switch $S_{MZ}$ is not ON in #4105, namely, if the lens for zooming is in the macro zone, then the flag SMZOFF indicating that the macro zone switch $S_{MZ}$ is OFF is set at 1 in #4110, and the flow proceeds to #4125. If the macro zone switch $S_{MZ}$ is ON in #4105, then whether the flag SMZOFF is 1 or not is checked in #4115. If SMZOFF=1 in #4115, it means that the macro zone switch $S_{MZ}$ is just turned ON, so that the flag SMZOFF is set at 0 in #4120, then the lens initial position is set in #4065 to #4075, and the flow proceeds to #4145. If SMZOFF is not 1 in #4115, it means that the macro zone switch $S_{MZ}$ has been ON, and the flow proceeds to #4125.

In the step #4125, whether the reset switch $S_R$ is ON or not is determined. If the reset switch $S_R$ is not ON in #4125, a flag SROFF indicating that the reset switch $S_R$ is OFF is set at 1 in #4130 and the flow proceeds to #4145. If the reset switch $S_R$ is ON in #4125, then, whether the flag SROFF is 1 or not is checked in #4135. If SROFF=1 in #4135, it means that the reset switch $S_R$ is just turned ON, so that the flag SROFF is set at 0 in #4140, then the lens initial position is set in the steps #4065 to #4075, and the flow proceeds to #4145. If SROFF is not 1 in #4135, it means that the reset switch $S_R$ has been ON and the lens has already been set at the initial position, so that the setting of the lens initial position in the steps #4065 to #4075 is not carried out and the flow proceeds to #4145.

Therefore, after the lens initial position is set (#4015 to #4025) immediately after the turning on of the main switch $S_M$, the setting of the lens initial position is carried out only in the following cases, namely, immediately after the turning ON of the AF mode switch $S_{AF}$, immediately after mounting of the lens, immediately after the turning ON of the macro zone switch $S_{MZ}$, immediately after the turning ON of the reset switch $S_R$, or when the focus detection is incapable even by the low contrast scanning, which will be described later in #4252. The setting of the lens initial position is not carried out except the above mentioned cases. Therefore, when there is a high possibility that the lens may be brought into in-focus position with the position of the lens being near the last position, for example, when a similar picture is to be taken, or when a plurality of frames of same picture are to be taken continuously, the setting of the lens initial position is not carried out. Accordingly, compared with the case in which the setting of the lens initial position is carried out at every focus detecting operation, the power consumption can be reduced and the time required for focus adjustment can be reduced.

In the step #4145, whether the preparatory switch S1 is ON or not is determined. If the preparatory switch S1 is not ON, then, all displays are turned off in #4040 and the flow returns to #4030. Thereafter, the states of the main switch $S_M$, the AF mode switch $S_{AF}$, the lens attachment signal ICP, the macro zone switch $S_{MZ}$, the reset switch $S_R$ and the preparatory switch S1 are monitored through a loop circulating #4030, #4045, #4080, #4105, #4125 and #4145. If the main switch $S_M$ is turned OFF in this loop, then ∞ rearward movement (#403`) is carried out as described above to standby until the main switch $S_M$ is again turned ON. If any one of the switches $S_{AF}$, $S_{MZ}$ and $S_R$ is turned ON or if the lens is attached in the loop from #4030 to #4145, the setting of the lens initial position is carried out (#4065 to #4075) at each time. In this manner, the camera is standing-by the turning ON of the preparatory switch S1 and when the preparatory switch S1 is turned ON in #4145, the flow proceeds to #4175 (FIG. 30) to start focus detecting operation.

Figure 27:
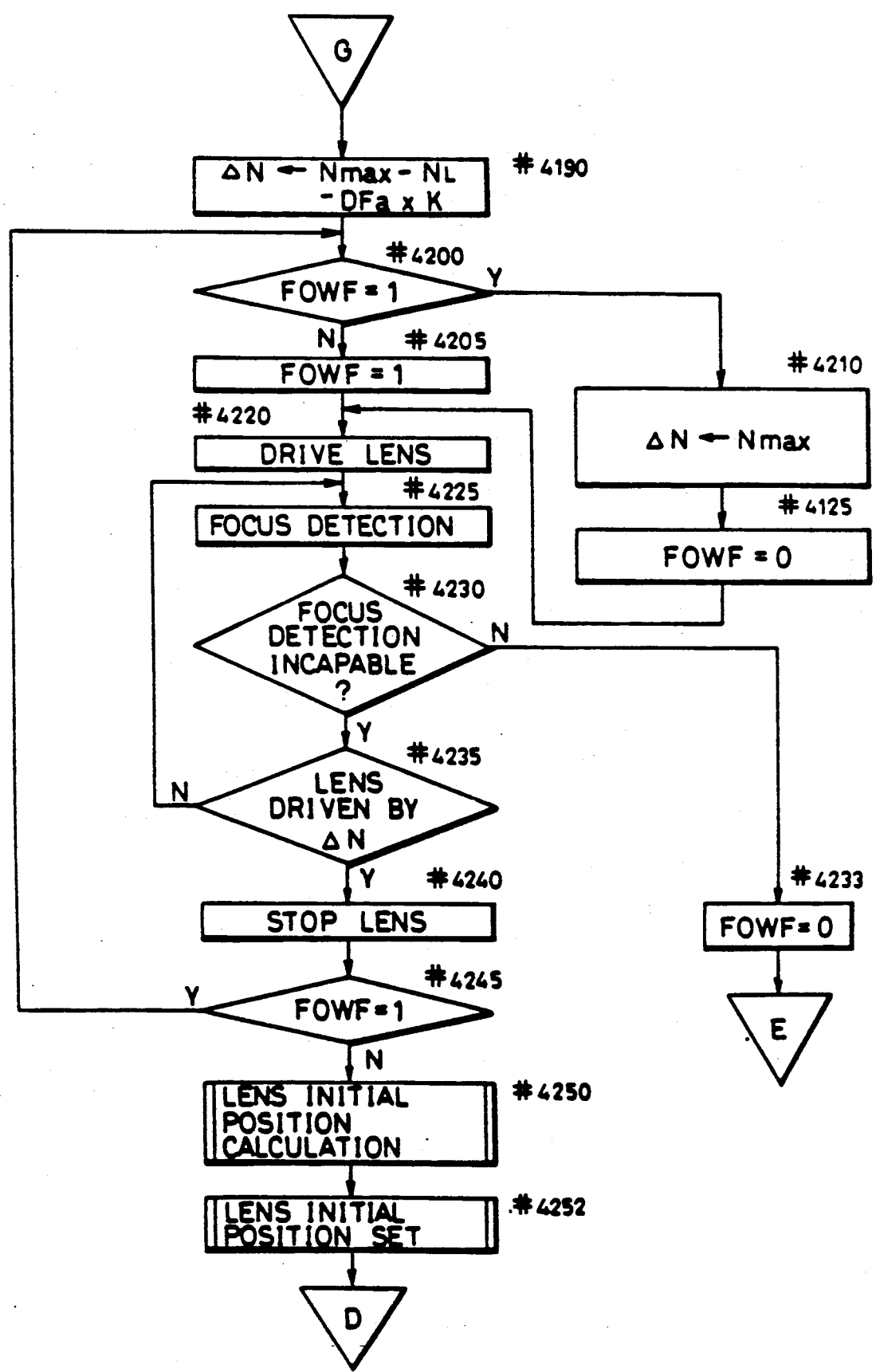

The focus detecting operation is carried out in #4175 and the capability of the focus detection is checked in #4180. If the focus detecting operation is capable in #4180, then, the flow proceeds to #4290 (FIG. 28) to check whether the lens is in in-focus position or not. If the focus detecting operation is incapable in #4180, whether the brightness is too low to enable focus detection or not is determined in #4185. If it is determined that the brightness is low in #4185, then the flow proceeds to #4330 (FIG. 28) to emit an auxiliary light. If it is determined that the brightness is not low in #4185, then the flow proceeds to the step #4190 (FIG. 27) to carry out low contrast scanning in order to find the lens position at which desired contrast can be provided. In that case, the range of the low contrast scanning is made as small as possible to reduce the time required for low contrast scanning. Namely, the focus detecting apparatus has a range in which the focus detection is possible. Assuming that the focus detection is possible in the range of the defocus which is $+DF_a$ in the rear focus side and $-DF_a$ in the front focus side from the present position of the lens, the focus detection is possible without changing the lens position in the range of $\pm DF_a$ from the present lens position. In #4190 (FIG. 27), the amount of a scanning in the forward direction is calculated as $\Delta N = N_{max} - N_L - DF_a \times K$. The reason for this is that the closest focusing position $N_{max}$ can be included in the range $2DF_a$ in which the focus detection is possible only by moving forward the lens by the distance of $DF_a \times K$, and there is no need of moving the lens forward to the closest focusing position $N_{max}$. Thereafter, whether the flag FOWF is 1 or not is determined in #4200 to check the direction of scanning. The flag FOWF indicates that the scanning is carried out in the forward direction.

When the low contrast scanning is carried out at the first time, the flag FOWF has been reset and therefore FOWF is not at 1. Therefore, the flow first proceeds to #4205 in which the FOWF is set at 1, and then the flow proceeds to #4220. In #4220, a signal is outputted to the lens driving circuit LDC for driving the lens in the forward direction, the focus detecting operation is carried out in #4225 and whether the focus detection is capable or not is determined in #4230. If the focus detection is capable in #4230, the flag FOWF is reset in #4233, and the flow proceeds to #4285 (FIG. 28) to determine whether the lens is in in-focus position or not.

If the focus detection is incapable in #4230, then whether the lens driving amount has reached $\Delta N$ or not is checked in #4235. If the lens driving amount has not yet reached $\Delta N$ in #4235, then the flow returns to #4225 and whether the focus detection is capable or not is determined while driving the lens in the forward direction. If it is determined that the lens driving amount has reached $\Delta N$ in #4235, then the driving of the lens is stopped in #4240, and whether the flag FOWF is 1 or not is checked in #4245. If FOWF=1 in #4245, it means that the lens position at which the focus detection is possible cannot be found by the scanning in the forward direction. Therefore, the flow returns to the step #4200 to carry out scanning in the rearward direction.

Figure 28:
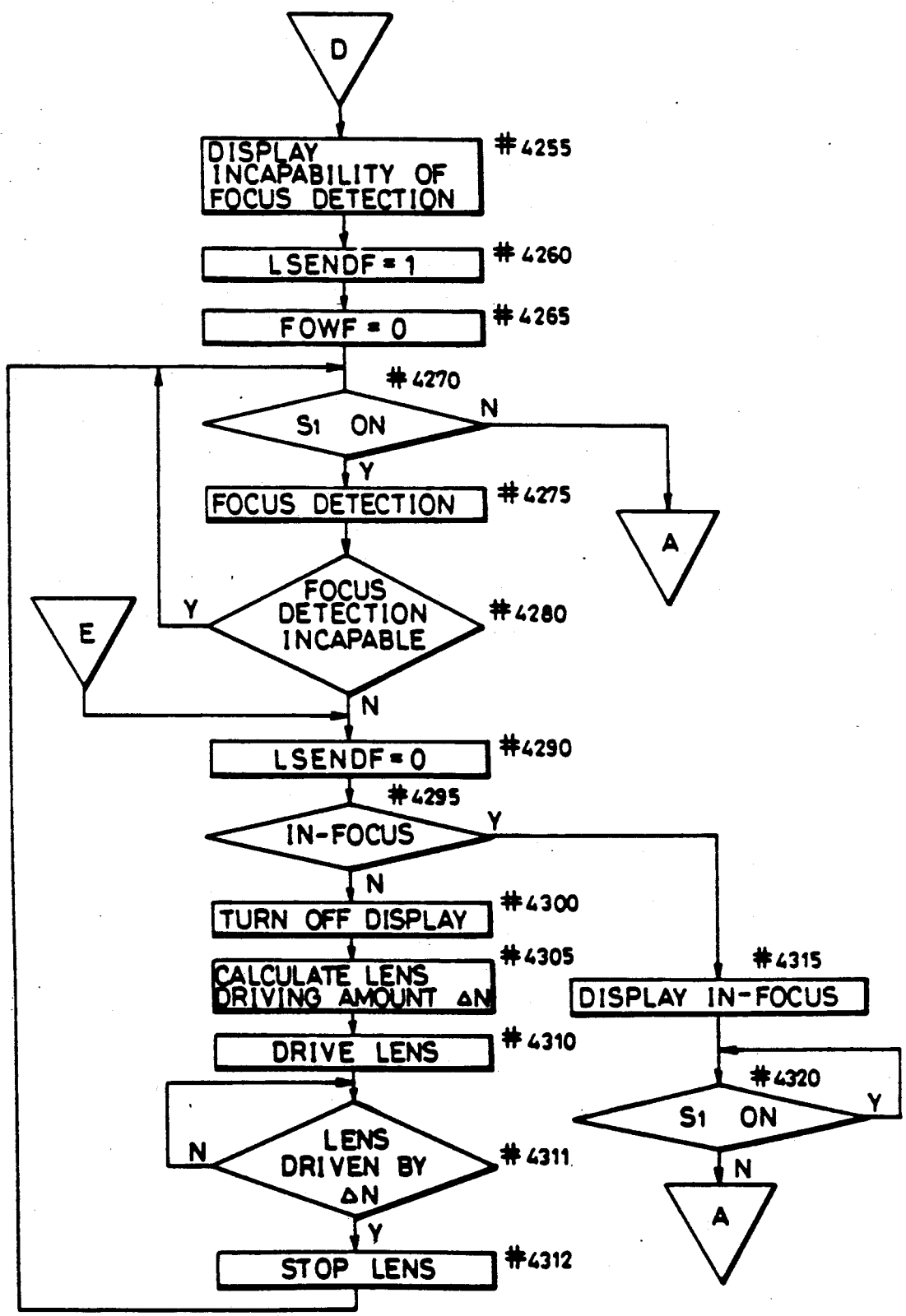

If FOWF=1 in #4200, it means that the scanning in the forward direction has been done. Therefore, the scanning amount in the rearward direction is selected to be $\Delta N=N_{max}$ in the step #4210. This is to remove the lens rearward to reach the other extreme end position to reset the counter. In #4215, the flag FOWF is set at 0 to indicate that the scanning is in the rearward direction, and the flow proceeds to #4220. In #4220, a signal is outputted to the lens driving circuit LDC to drive the lens in the rearward direction, and the flow again proceeds to #4245 through #4225 to #4240. Since FOWF is not 1 at this time, the flow does not return to #4200 but proceeds to #4250. Namely, the fact that FOWF is not 1 in #4245 means that the lens position at which the focus detection is possible could not be found out neither by the scanning in the forward direction nor by the scanning in the rearward direction. Therefore, the subroutine for calculating the lens initial position is carried out in #4250 in order to prepare for the next focus detection, the subroutine setting the lens initial position is carried out in #4252 and the incapability of focus detection is displayed in #4255 (FIG. 28). If the focus detection becomes possible in #4230 during the scanning in the rearward direction, then the flag FOWF is reset in #4233 and the flow proceeds to #4290 (FIG. 28) to determine whether the lens is in in-focus position or not.

After the incapability of the focus detection is displayed in #4255 (FIG. 28), the low contrast scanning end flag LSENDF is set at 1 in #4260. This flag indicates that the lens position at which the focus direction is possible could not be found by the low contrast scanning. Thereafter, the flag FOWF indicating the scanning direction is set at 0, in #4265 and whether the preparatory switch S1 is ON or not is determined in #4270. If the preparatory switch S1 is not ON in #4270, then all displays are turned off in #4040 and the flow returns to #4030. If the preparatory switch S1 is ON in #4270, then the focus detection is carried out in #4275, and whether the focus detection is capable or not is determined in #4280. If it is determined that the focus detection is incapable in #4280, the flow returns to #4270. If the focus detection is capable in #4280, the low contrast scanning end flag LSENDF is set at 0 in #4290, and whether the lens is in in-focus position or not is determined in #4295. If it is determined that the lens is out-of-focus position in #4295, then the flow proceeds to #4300 to turn off the in-focus display and the focus detection incapable display, the lens driving amount $\Delta N=DF \times K$ is calculated based on the defocus amount DF in #4305, and the driving of the lens is started in #4310. In #4311, whether the lens driving amount reached $\Delta N$ or not is determined. If the lens driving amount has not yet reached $\Delta N$ in #4311, then the checking operation of #4311 is repeated until the lens driving amount reaches $\Delta N$. When the lens driving amount reached $\Delta N$ in #4311, the driving of the lens is stopped in #4312 and the flow returns to #4270.

If the preparatory switch S1 is ON in #4270, the focus detection is carried out in #4275, the flow proceeds to #4280 to #4290, and whether the lens is in in-focus position or not is again determined in #4295. Since the lens is being driven toward the in focus position in the above described steps #4305 and #4310, there is a high possibility that the lens is brought into in-focus position. If it is determined that the lens is brought into in-focus position in #4295, then the in-focus display is carried out in #4315, and whether the preparatory switch S1 is ON or not is determined in #4320. If the preparatory switch S1 is ON in #4320, then the determining operation of #4320 is repeated until the preparatory switch S1 is turned off, namely, the camera enters the focus-lock state. If the preparatory switch S1 is turned off in #4320, then the displays are turned off in #4040 and the flow returns to #4030. Namely, if the preparatory switch S1 is turned off, the above described focus-lock state is released.

Figure 29:
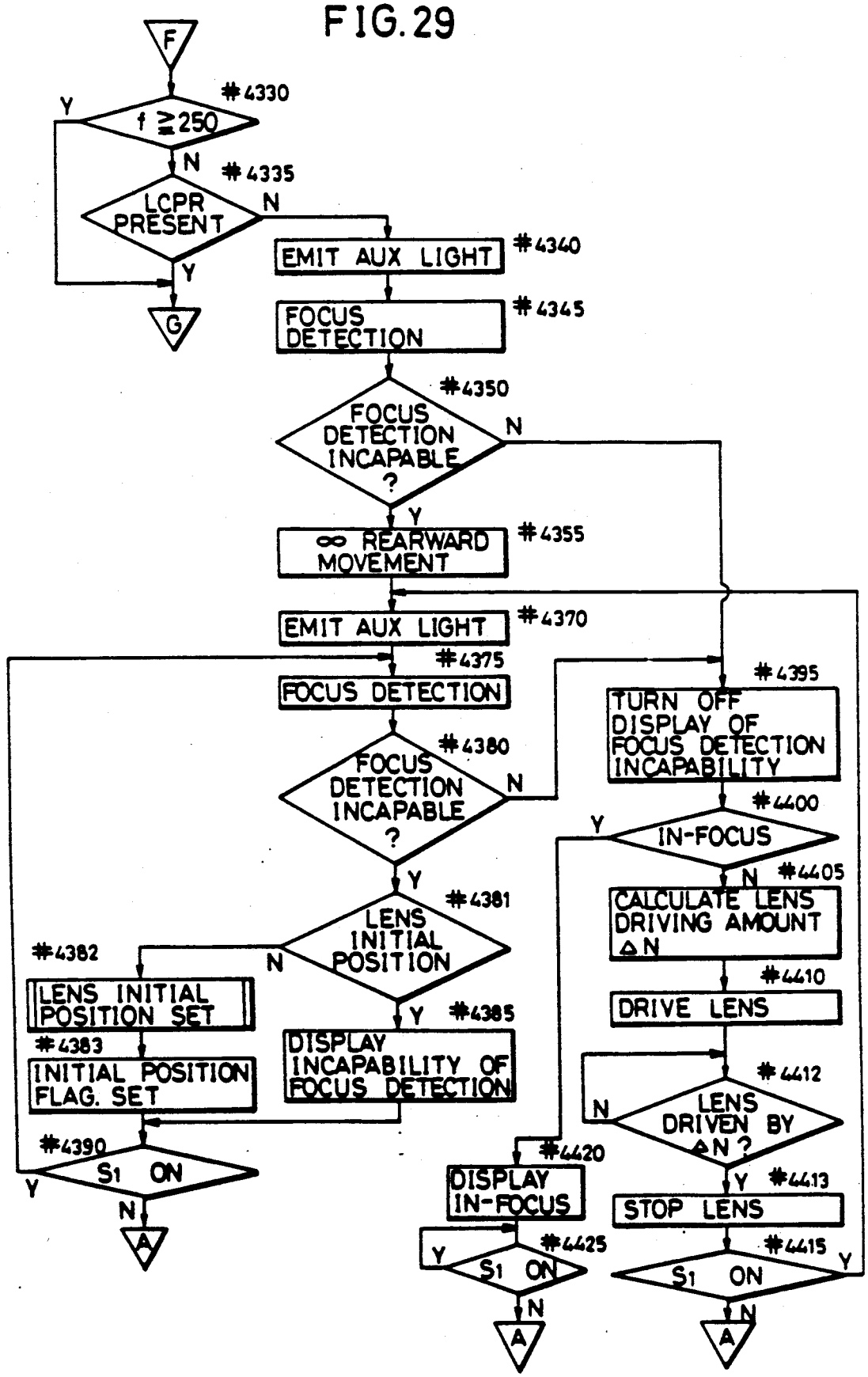

If the flow passes through the step #4330 of FIG. 29, it has been determined that the brightness is low and then focus detection is impossible in the steps #4185 and #4180 (FIG. 25), so that the auxiliary light must be emitted. However, sometimes the auxiliary light is useless, and so whether the auxiliary light should be emitted or not is determined in the steps #4330 and #4335.

Now, the auxiliary light emitting apparatus ILM shown in FIG. 1 usually comprises a light emitting diode externally attached to a camera body above the photographic lens or internally provided in front of the camera body and an optical system for projecting light. Meanwhile, the focus detecting circuit AFC comprises an optical system for detecting focus condition of the TTL phase difference detecting method, with the optical axis thereof being in coincidence with the optical axis of the photographic lens. Therefore, the range of the luminous flux of the optical system for projecting auxiliary light and the range of luminous flux for detecting the focus condition have a parallax and, beyond a prescribed photographic distance which changes dependent on the angle of view, the range of luminous flux for detecting the focus condition is completely included in the range of luminous flux of the optical system for projecting auxiliary light. This distance is the lower border of the range in which the auxiliary light can illuminate the object to enable focus detection. The auxiliary light is useless for an object nearer than the distance. If a tele-photo lens is attached to the camera, sometimes the auxiliary light becomes useless, because the auxiliary light is eclipsed by the lens barrel and the object is not fully illuminated by the auxiliary light. The lower border of the range in which the auxiliary light can illuminate the object to enable focus detection can be made small by employing the auxiliary light system of the TTL method. However, the upper limit of the range in which the illumination of the auxiliary light enables focus detection cannot be made very large, since the reach of the auxiliary light is about 10 m at the most.

Therefore, in #4330, whether the focal length f of the lens is no less than 250 mm or not is determined, and if $f \geq 250$ in #4330, it is determined that the auxiliary light may be eclipsed by the long lens barrel, and therefore the auxiliary light is not emitted. Therefore, the flow proceeds to #4190 (FIG. 27) to carry out the low contrast scanning. When a tele-photo lens is used, the object to be photographed is, in most case, at a distant, so that the prohibition of auxiliary light emission is not a serious problem. If f is smaller than 250 in #4330, then presence of a signal LCPR or not is determined, which signal indicating the attachment of a macro lens for a magnification larger than 1. If it is determined that the macro lens for a magnification larger than 1 is attached in #4335, then it is determined that the object is nearer than the lower border of the range in which the auxiliary light enables focus detection, and therefore the auxiliary light is not emitted and the flow proceeds to #4190 (FIG. 27) to determine whether the low contrast scanning is necessary or not. If it is determined that the macro lens is not attached in #4335, then the auxiliary light is projected in #4340, the focus detection is carried out in #4345 and whether the focus detection is capable or not is determined in #4350. The auxiliary light is emitted for a prescribed time period at each focus detecting operation.

If the focus detection is capable in #4350, then the flow proceeds to #4395. If the focus detection is incapable in #4350, the ∞ rearward movement is carried out in #4355 in order to reset the counter. The auxiliary light is emitted in #4370, focus detecting operation is carried out in #4375, and whether the focus detection is capable or not is determined in #4380. If the focus detection is capable in #4380, then the flow proceeds to #4395. If the focus detection is incapable in #4380, whether the lens is at the initial position or not is checked in #4381, and if the lens is not at the initial position, the lens is set at the initial position in the step #4382. Then the flag indicating that the lens is at the initial position is set in #4383 and the flow proceeds to #4390. If the focus detection is incapable again in the next focus detection, the flow proceeds from the step #4381 to #4385 to display the incapability of focus detection, and whether the preparatory switch Sl is ON or not is determined in #4390. If it is determined that the preparatory switch Sl is ON in #4390, then the flow returns to #4375. If the preparatory switch Sl is not ON in #4390, then the displays are turned off in #4040 and the flow returns to #4030.

In #4395, the display of incapability of focus detection is turned off and whether the lens is brought into in-focus position or not is determined in #4400. If the lens is in in-focus position in #4400, then the in-focus display is carried out in #4420, and whether the preparatory switch Sl is ON or not is determined in #4425. If the preparatory switch Sl is ON in #4425, then the operation of #4425 is repeated until the preparatory switch Sl becomes OFF. If the preparatory switch Sl becomes OFF in #4425, then the displays are turned off in #4040 and the flow returns to #4030. If the lens is in out-of-focus position in #4400, then the lens driving amount $\Delta N = DF \times K$ is calculated based on the defocus amount DF in #4405, and the driving of the lens is started in #4410. In #4412, whether the lens driving amount reached $\Delta N$ or not is determined. If the lens driving amount has not yet reached $\Delta N$ in #4412, then the checking operation of #4412 is repeated until the lens driving amount reaches $\Delta N$. If the lens driving amount reaches $\Delta N$ in #4412, then the driving of the lens is stopped in #4413 and whether the preparatory switch Sl is ON or not is determined in #4415. If the preparatory switch Sl is ON in #4415, then the flow returns to #4370. If it is OFF, then the displays are turned off in #4040 and the flow returns to #4030.

In the algorithm for determining the defocus amount $DF_s$ (#5010 to #5030) in the subroutine (FIG. 30) for calculating the lens position, the defocus amount $DF_s$ of the lens initial position $N_s$ is calculated based on the information ZFZ of the focal length.

Figure 34:
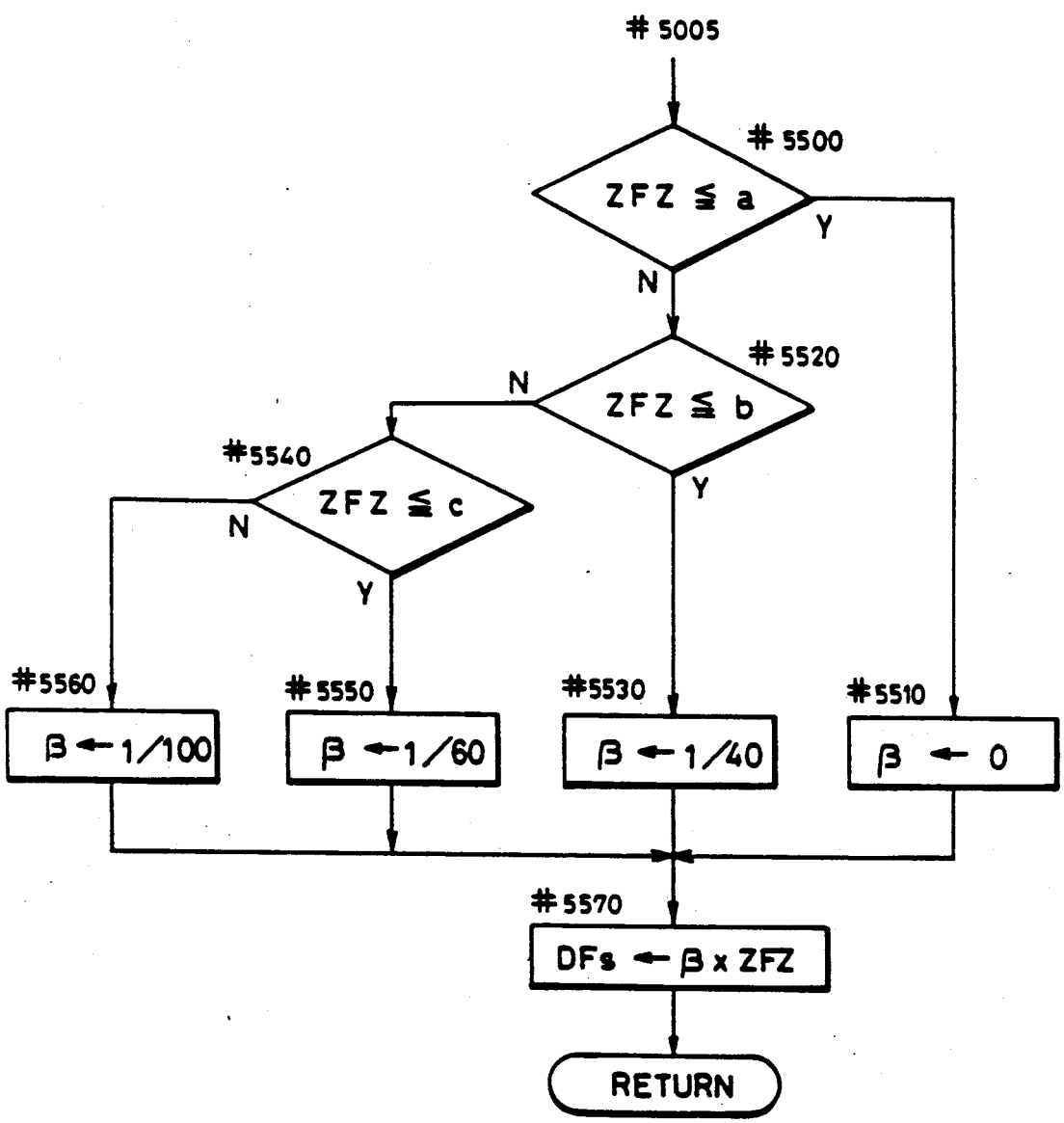

FIG. 34 is a flow chart showing a modification of the algorithm, which can be used instead of the steps #5010 to #5030. In the step #5500, whether the focal length f is no more than 28 mm (ZFZ≦a) or not is determined. If f≦28 mm in #5510, the magnificatio rate $\beta$ is selected to be 0 in #5510 and the flow proceeds to #5570. If f>28 mm in #5500, whether the focal length f is no more than 210 mm (ZFZ≦b) or not is determined in #5520. If f≦210 mm in #5520, the magnification rate $\beta$ is selected to be (1/40) in #5530 and the flow proceeds to the steps #5570. If f>210 mm in #5520, then whether the focal length f is no more than 600 mm (ZFZ≦c) or not is determined in #5540. If f≦600 mm in #5540, the magnification rate $\beta$ is selected to be (1/60) in #5550 and the flow proceeds to #5570. If f>600 mm in #5540, then the magnification rate $\beta$ is selected to be (1/100) in #5560 and the flow proceeds to the step #5570. In #5570, the magnification rate $\beta$ is multiplied by the information ZFZ of the focal length, to provide the amount of the forward movement of the lens $DF_s$ from the infinite focusing position to the lens position $N_b$. In the algorithm shown in FIG. 34, when the focal length f is in the range of 35 mm to 105 mm, for example, a defocus amount $DF_s$ provided by multiplying the focal length f by the magnification rate $\beta = (1/40)$ is selected. More specifically, the lens is initially set at a position at which the magnification rate of (1/40) is always provided.

As described above, according to the present invention, frequently used magnification for respective lenses have been found based on the data of actual use. In the automatic focus detection, the lens is set in advance at the stopping position defined corresponding to the lens before the start of measurement of focus detection. Therefore, the initial stopping position of the lens can be determined so as to enhance the possibility of focus detection in the focus detecting apparatus.

In accordance with a preferred embodiment of the present invention, the relation between the magnification rate and the initial stopping position of the lens is found based on the data of actual use. The initial position of the lens is changed corresponding to the magnification rate based on the fact that the initial stopping position of the lens is closely related to the photographing magnification rate. Consequently, the possibility in focus detection can be enhanced in the focus detecting apparatus, and the time required for focus detection can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus adjusting apparatus comprising:
   (a) a photographic lens;
   (b) focus detecting means for receiving light from an object to be photographed through said photographic lens and detecting a focusing condition of said photographic lens;
   (c) reliability judging means for judging the reliability of the focusing condition detected by said focus detecting means;
   (d) driving means for driving said photographic lens while performing the focus detection with the reliability of the focusing condition being below a predetermined level;
   (e) first data output means for outputting a first data including a fixed focus detection enabling range inherent to said focus detecting means;

(f) second data output means for outputting a second data indicating a movable range for focus adjustment of said photographic lens; and (g) determining means for determining based on the first data and second data whether or not the lens driving operation by said driving means is to be carried out.

2. A focus adjusting apparatus according to claim 1, wherein said photographic lens is selectively attachable to a camera body and generates a lens data peculiar thereto, and said second data output means converts the lens data into the second data.

3. A focus adjusting apparatus comprising:
(a) a photographic lens;
(b) focus detecting means for receiving light from an object to be photographed through said photographic lens and detecting a focusing condition of said photographic lens;
(c) reliability judging means for judging reliability of the focusing condition detected by said focus detecting means;
(d) first driving means for driving said photographic lens while performing the focus detection with the reliability of the focusing condition being below a predetermined level;
(e) second driving means for forcibly driving said photographic lens to a predetermined position; and
(f) control means for controlling said first driving means such that the driving range of said photographic lens to be driven by said first driving means is changed in a case where the lens driving operation by said second driving means has been performed and in a case where the lens driving operation by said second driving means has not been performed.

4. A focus adjusting apparatus comprising:
(a) a photographic lens;
(b) focus detecting means for receiving light from an object to be photographed through said photographic lens and detecting a focusing condition of said photographic lens;
(c) reliability judging means for judging the reliability of the focusing condition detected by said focus detecting means;
(d) driving means for driving said photographic lens while performing the focus detection with the reliability of the focusing condition being below a predetermined level;
(e) data output means for outputting a data indicating a focus detection enabling range of said focus detecting means; and
(f) control means for controlling said driving means such that said photographic lens is driven within a half of the focus detection enabling range.

5. A focus adjusting apparatus comprising:
(a) a photographic lens;
(b) focus detecting means for receiving light from an object to be photographed through said photographic lens and detecting a focusing condition of said photographic lens;
(c) reliability judging means for judging the reliability of the focusing condition detected by said focus detecting means;
(d) driving means for driving said photographic lens while performing the focus detection with the reliability of the focusing condition being below a predetermined level; and
(e) control means for controlling the driving speed by said driving means so as to reduce the driving speed of said photographic lens when an amount of lens movement to be driven to an extreme end position of a focus adjusting range of said photographic lens reaches a predetermined amount, and to stop said photographic lens at the end position.

6. A focus adjusting apparatus according to claim 5, wherein said control means includes switch means which is provided at a predetermined position apart from the end position of said photographic position by the predetermined amount and outputs a signal to reduce the lens driving speed when said photographic lens reaches the predetermined position.

* * * * *